United States Patent [19]

Collom

[11] 4,063,075
[45] Dec. 13, 1977

[54] WELDING AND AUTOMATION CONTROL SYSTEM
[75] Inventor: Donald J. Collom, Clare, Mich.
[73] Assignee: Weltronic Company, Southfield, Mich.
[21] Appl. No.: 691,850
[22] Filed: June 1, 1976

Related U.S. Application Data
[63] Continuation of Ser. No. 553,919, Feb. 28, 1975, abandoned.

[51] Int. Cl.² .............................................. B23K 9/10
[52] U.S. Cl. .................................... 364/119; 328/120; 219/108; 364/107; 364/477
[58] Field of Search ...................... 235/151.1, 153 AK; 328/120; 219/124 X, 125 PL; 340/172.5

[56] References Cited
U.S. PATENT DOCUMENTS

| 3,458,822 | 7/1969 | Hahn, Jr. | 328/120 |
| 3,496,477 | 2/1970 | Page | 328/120 |
| 3,651,484 | 3/1972 | Smeallie | 340/172.5 |
| 3,749,897 | 7/1973 | Hirvela | 235/153 AK |

Primary Examiner—Eugene G. Botz

[57] ABSTRACT

A computerized welding control system which is capable of controlling a large number of welding heads from a single processor, the processor being the timing instrumentality for the various portions of the welding cycle. The system also includes standard welding circuitry to control the percent heat and the control of the first electrical cycle of the welding cycle. The system includes a data entry terminal for a set of welders within the group controlled by a single processor, the terminal being capable of addressing the computer to determine the time stored therein for various functions within the welding cycle for a particular machine within the group controlled by the terminal unit. The terminal unit also includes capability of changing the times associated with each portion of the welding cycle. The system also includes an automation portion which is capable of sensing various functions within an automated line and feeding data relative to the machines on the automated line to the computer and the computer will utilize this data to generate control functions for both the automation and welding portions of the system.

6 Claims, 44 Drawing Figures

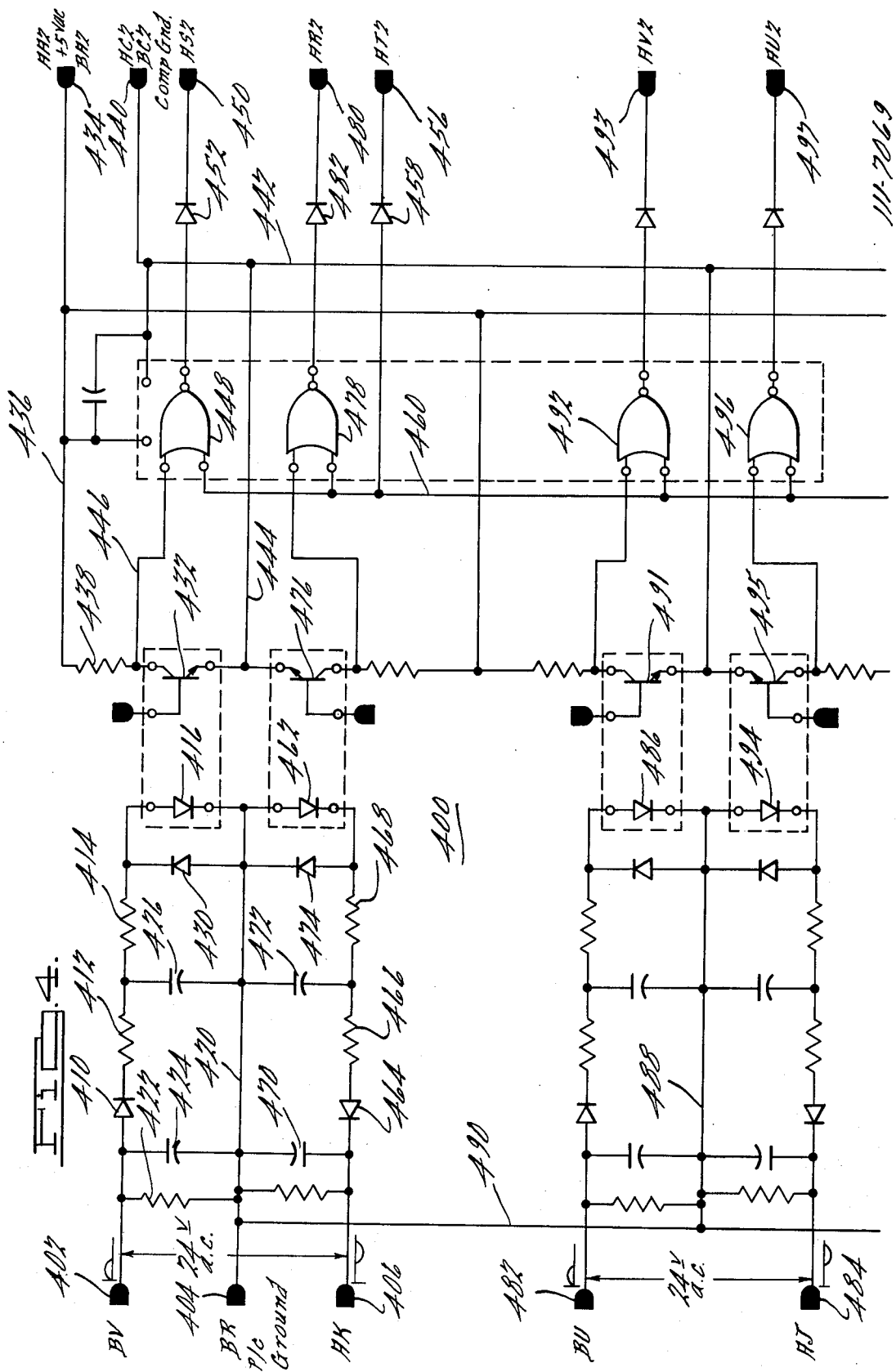

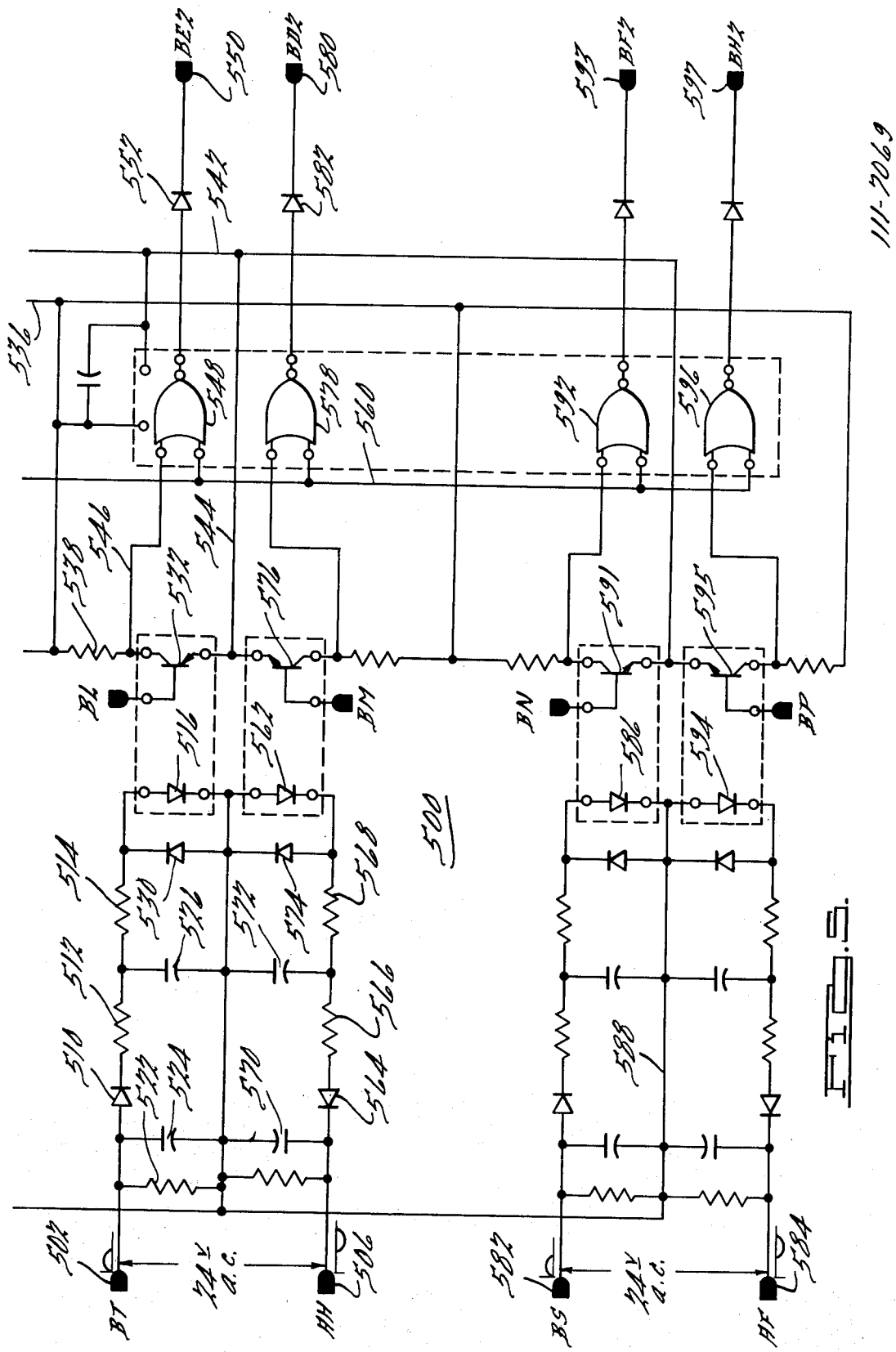

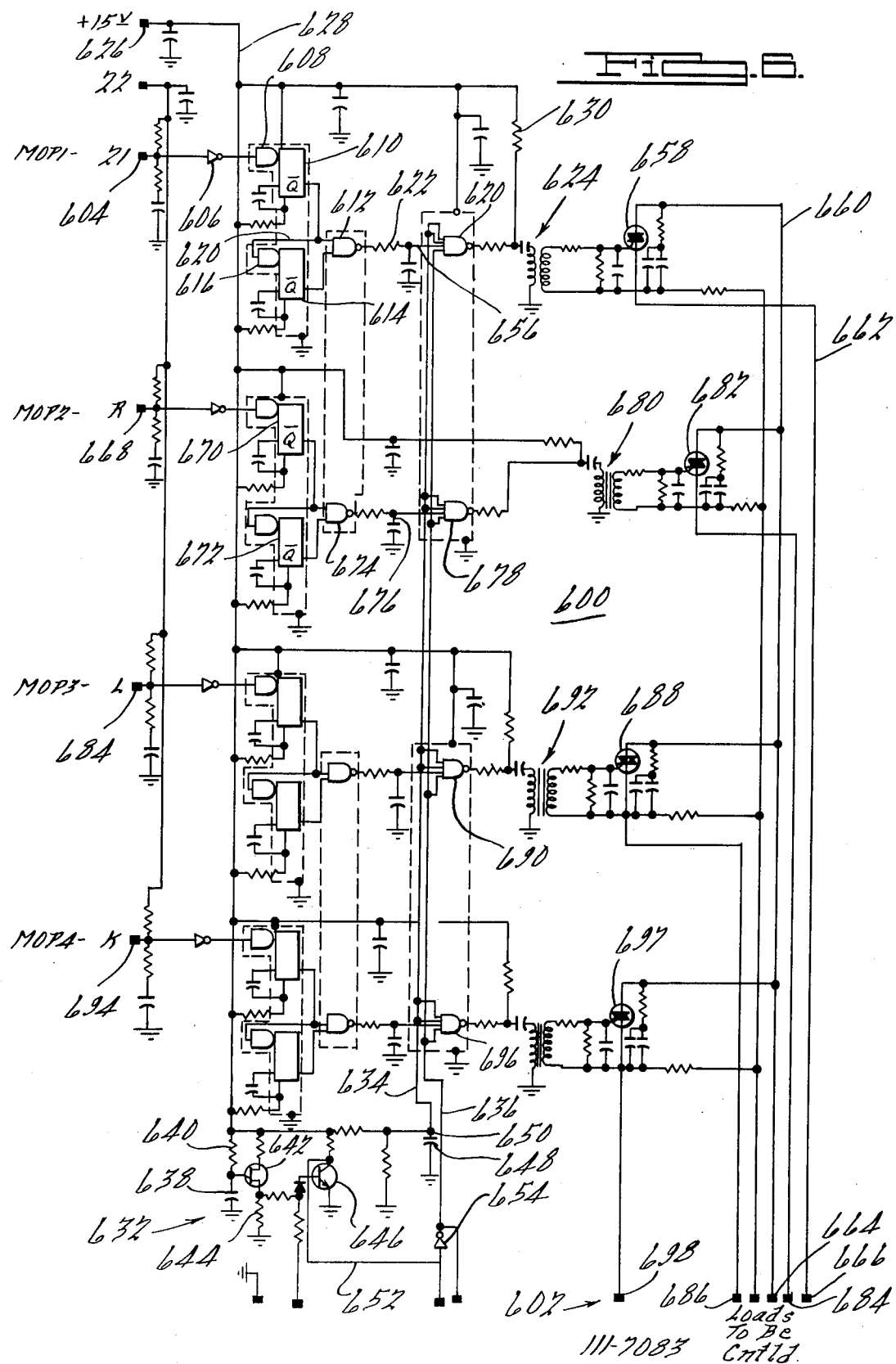

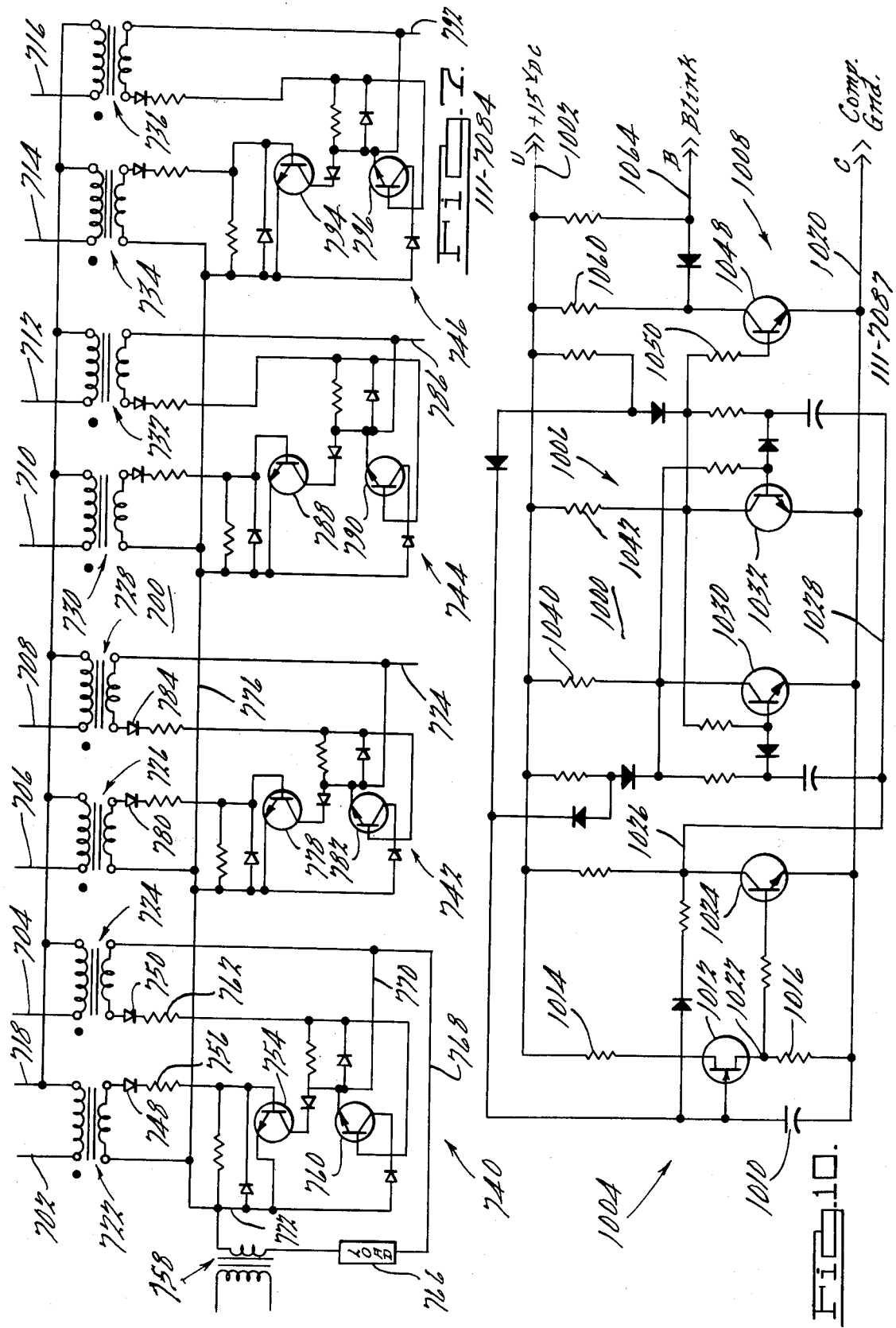

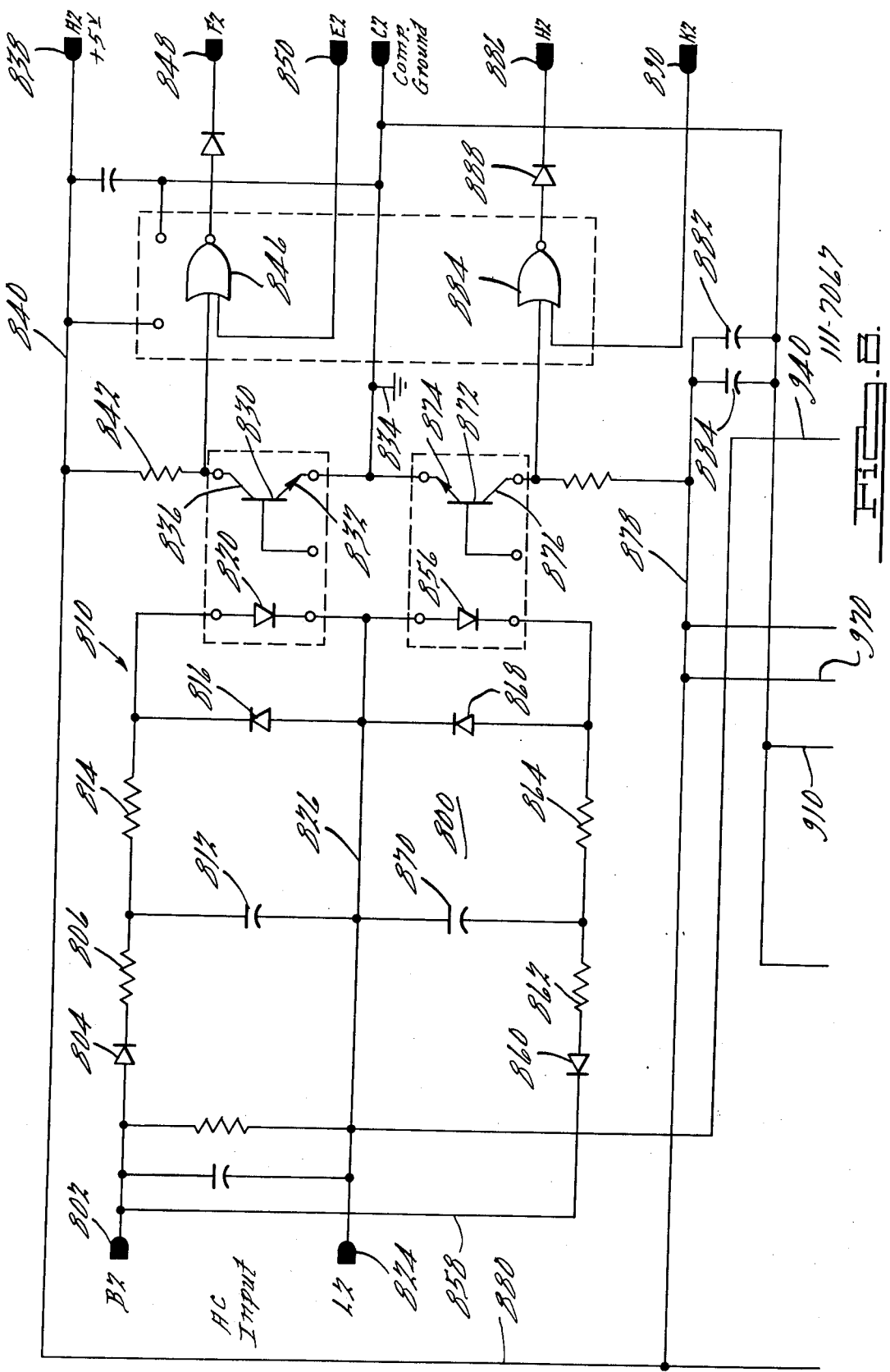

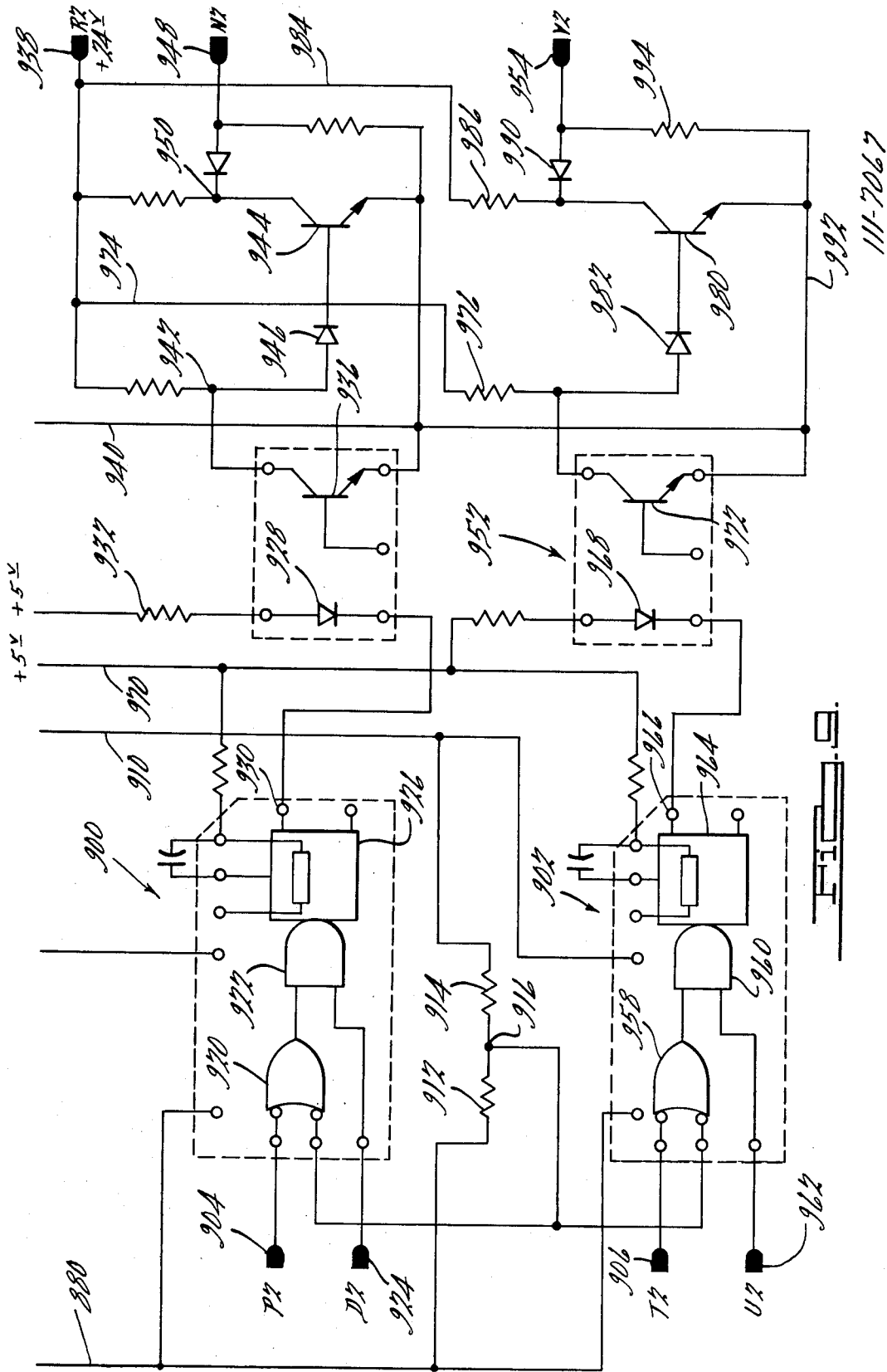

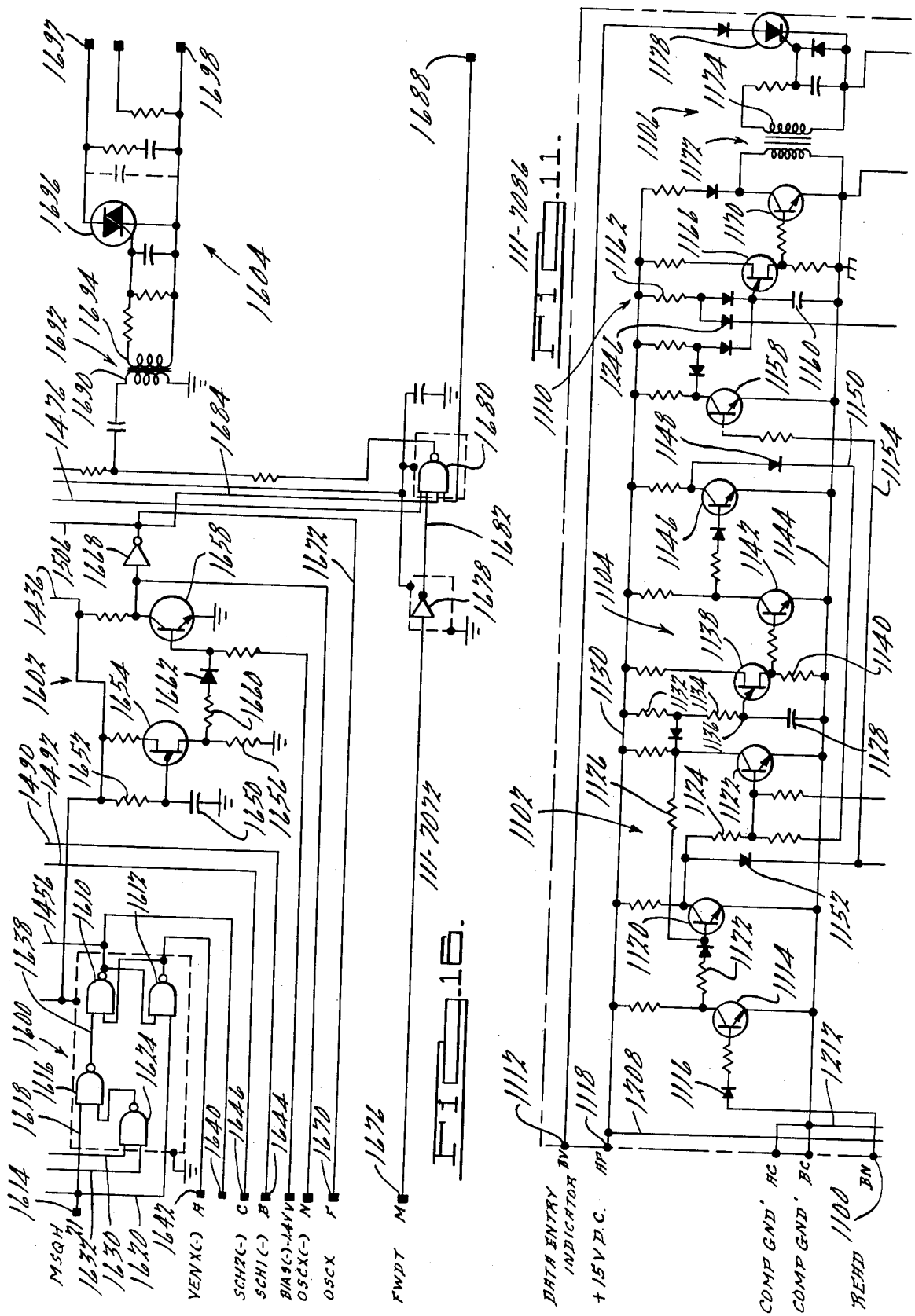

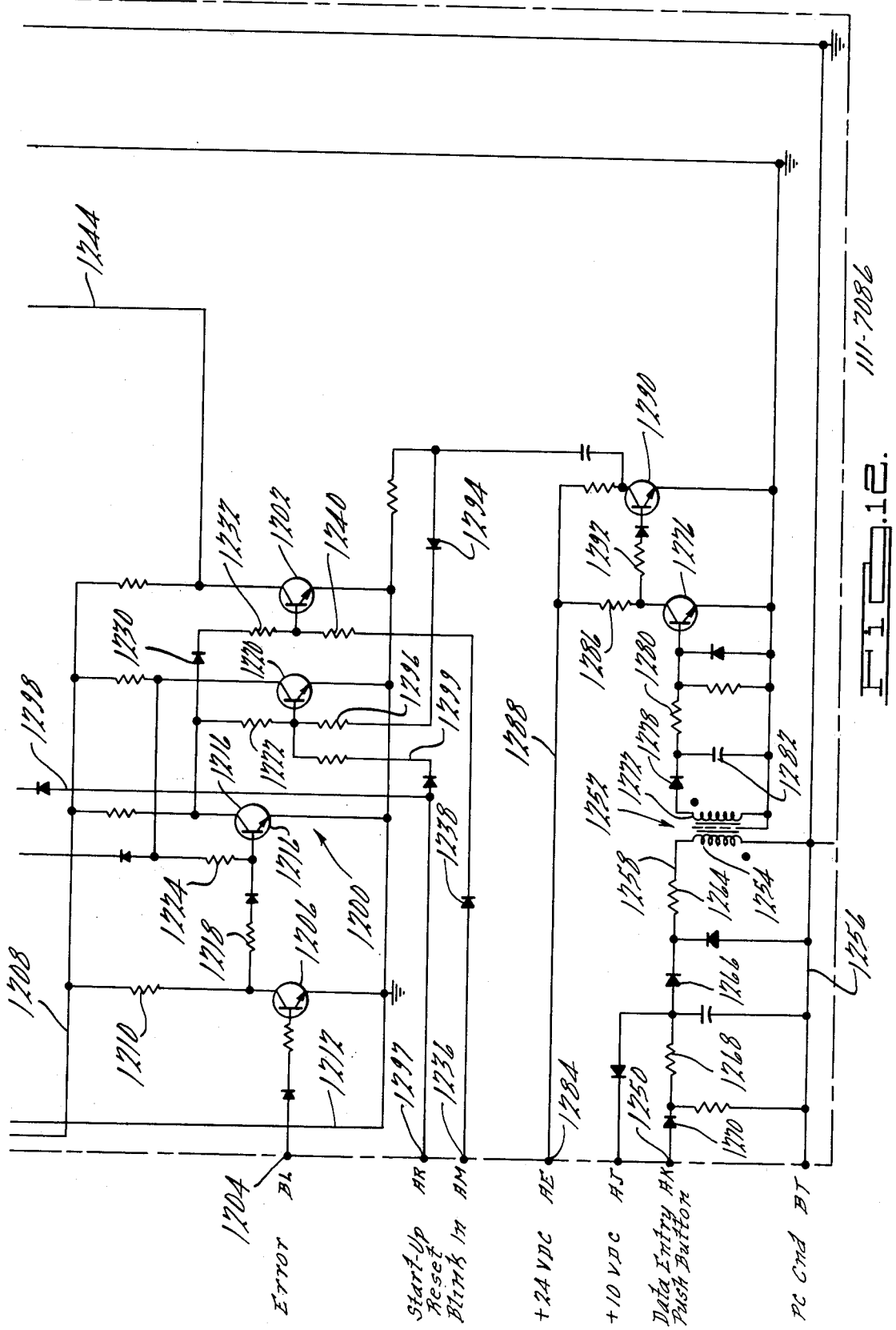

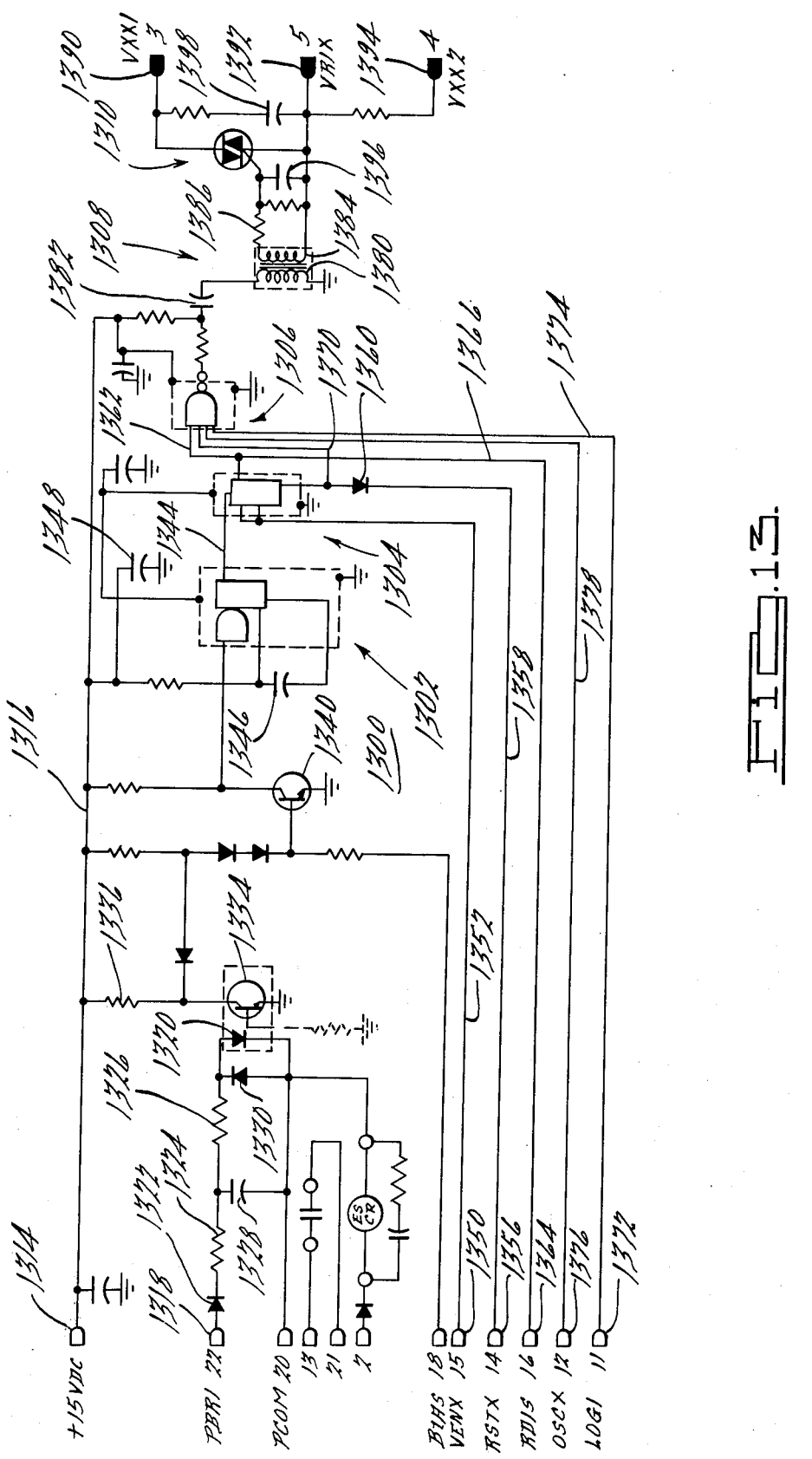

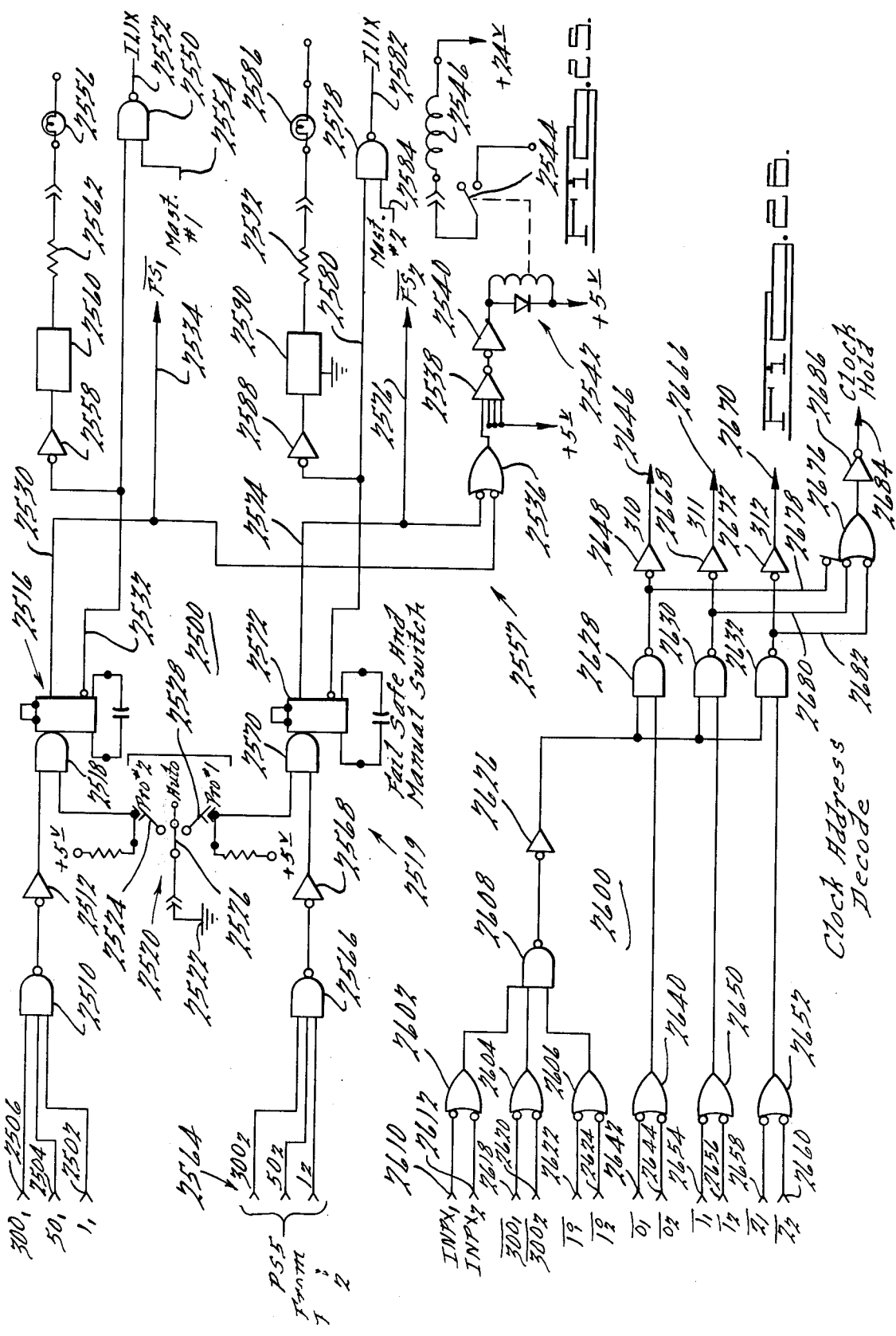

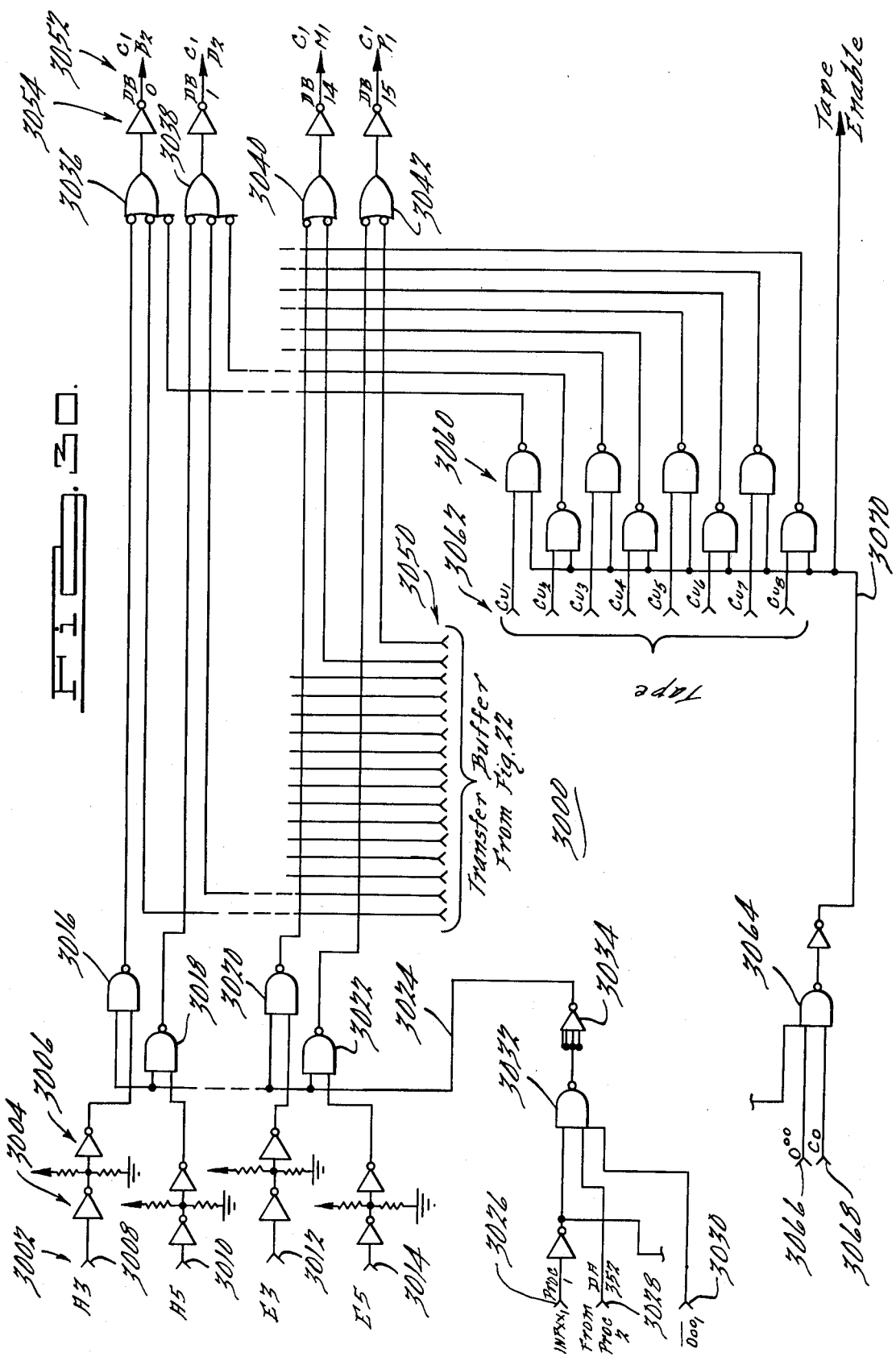

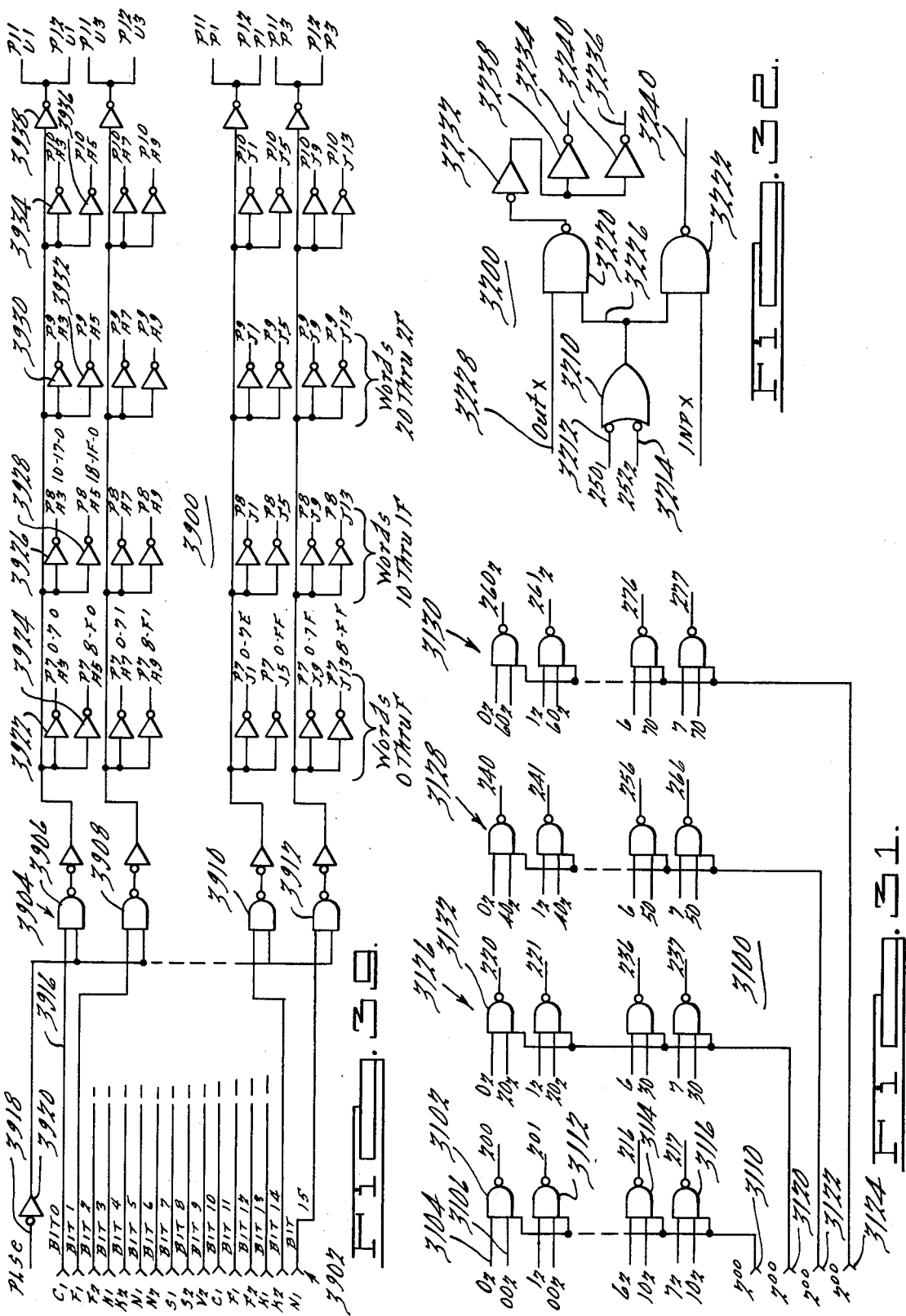

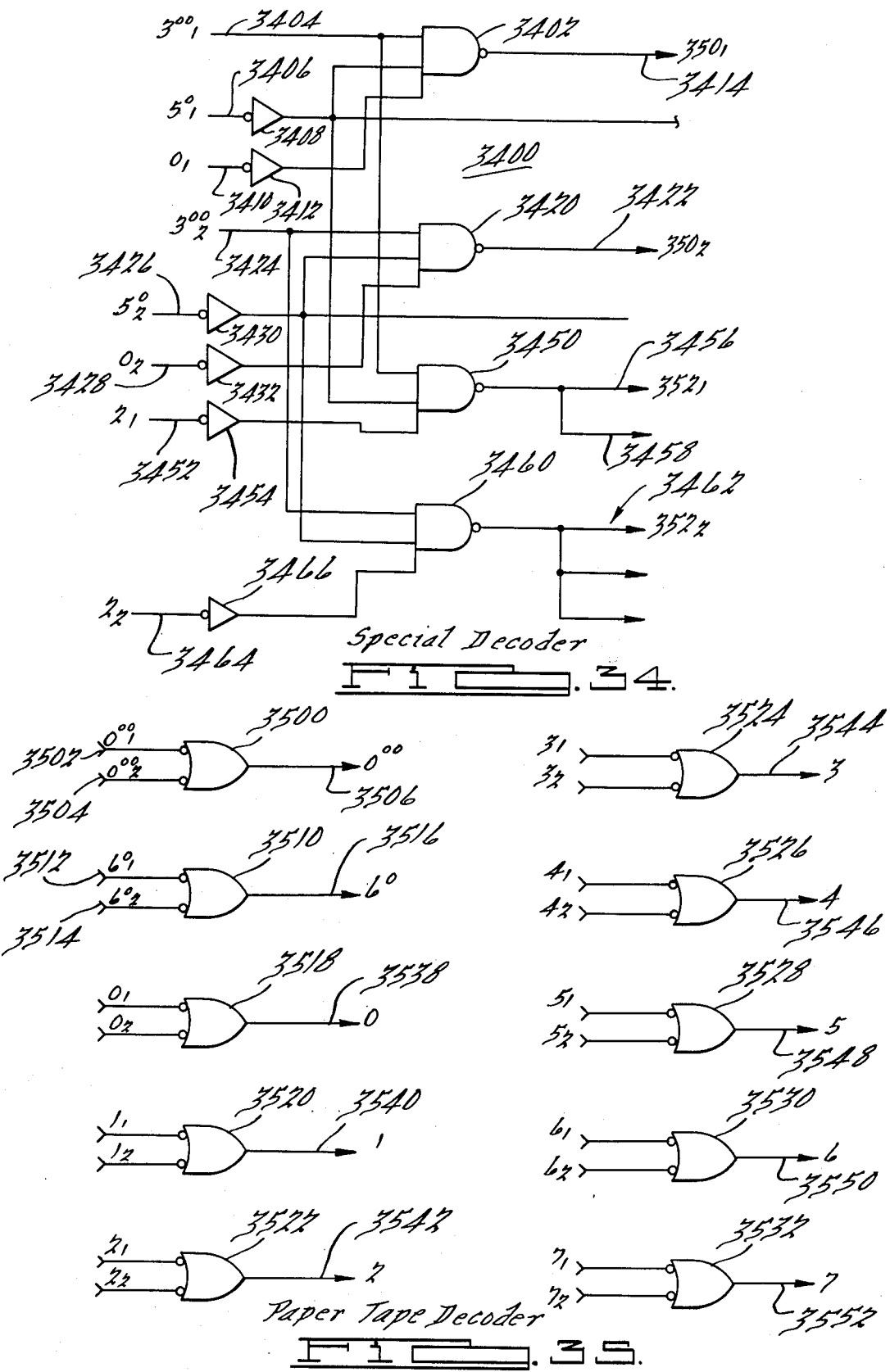

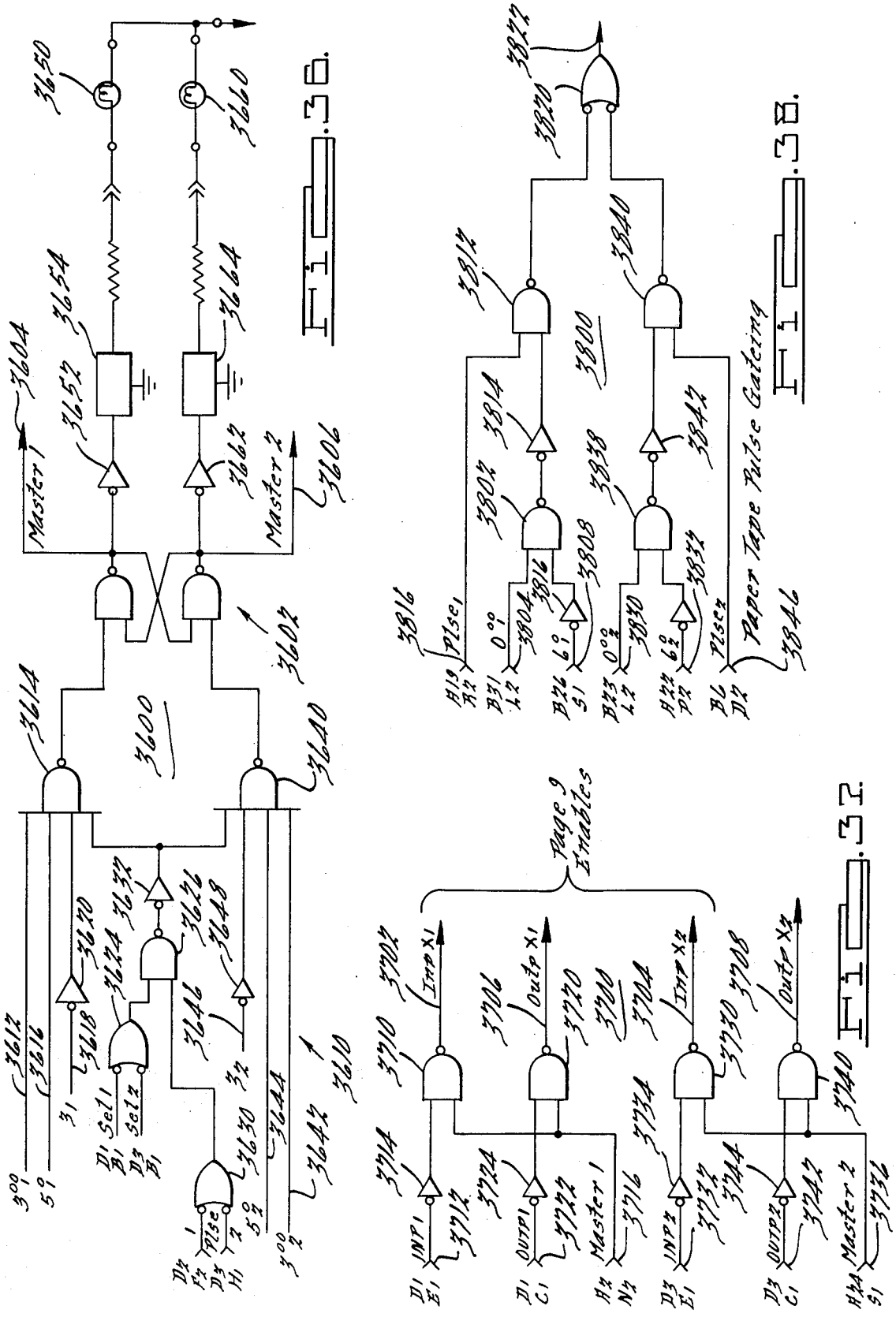

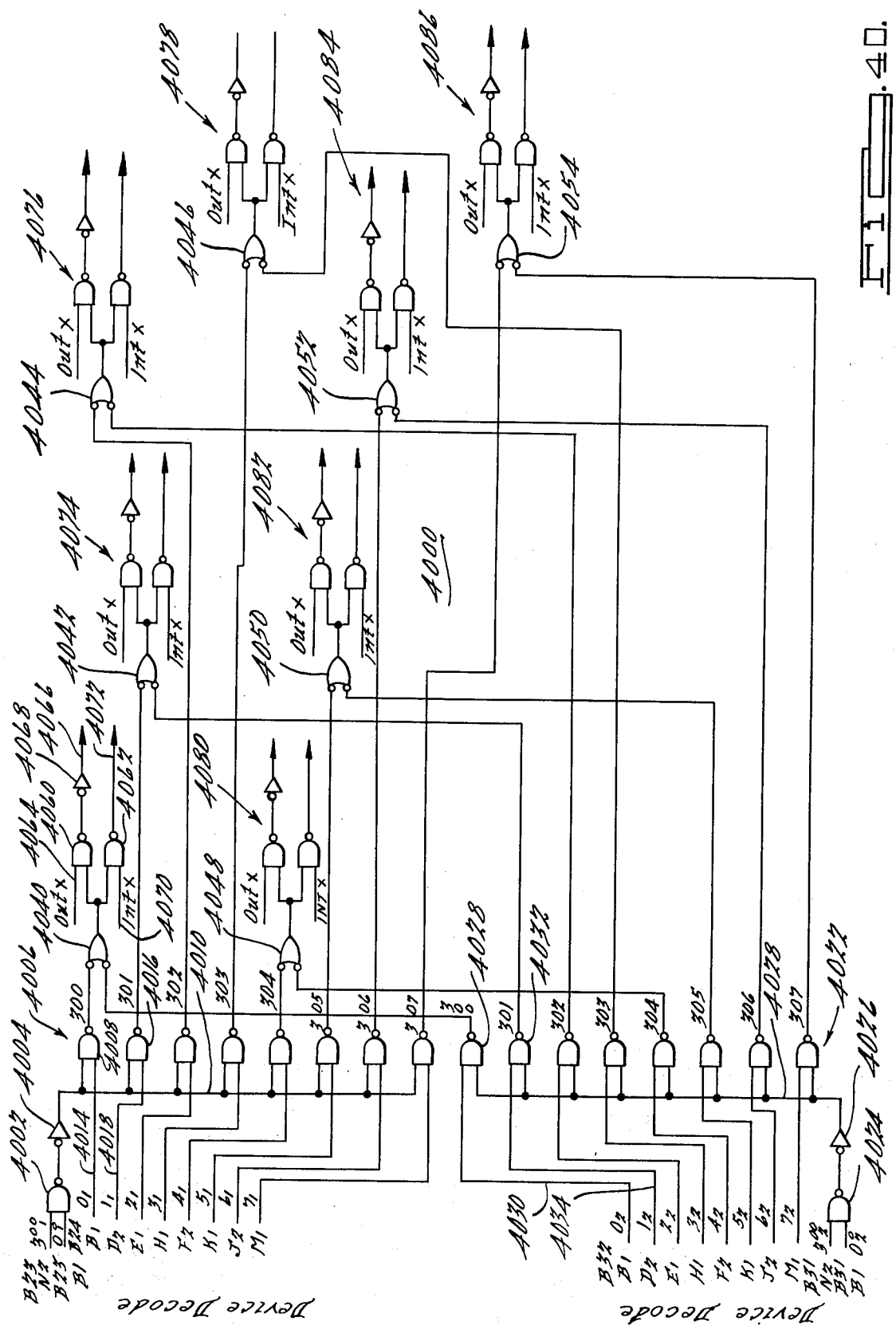

WELDING AND AUTOMATION CONTROL SYSTEM

This is a continuation, of application Ser. No. 553,919, filed Feb. 28, 1975 now abandoned.

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE DEVELOPMENT

This invention relates generally to an automation and welding control system and more particularly to a computerized automation and welding control system wherein the welding control system is capable of controlling a large number of welding heads from a single computer, the computer providing control of the timing for the various portions of the welding cycle.

In prior welding systems, it has been typical to provide a welding control unit for each welding head, the welding control unit being located proximate the welding head. In factories having a low number of welding heads, such a system may be feasible and economical. However, if a manufacturing plant requires a large number of welding heads, for example a hundred heads or more, it has been found that the welding system can be more favorably controlled, maintained and operated by providing a central welding control center which includes a computerized control of the various portions of the welding cycle.

With the system of the present invention, a single control can be provided for many types of welding operations, as for example seam welding, spot welding, arc welding, resistance welding, and other types. Further, the system provides a provision for monitoring the KVA demand on the entire welding system relative to the available KVA and controls the application of welding energy to the various welding heads in accordance with the available KVA so that the KVA being used does not fall below a certain level.

The welding system of the present invention is coordinated with an automation system wherein various functions and operations along an automated line are monitored and the data fed to the computer for storage therein and for use in generating control signals. The automation unit also includes a diagnostic terminal which permits the feeding of information from the floor to the computer and then to the diagnostic terminal for use by the operator of the line.

The details of the system of the present invention include the diagnostic terminal which permits communication with the computer through a hard-wire cable and a small interface. Any number of terminals may be connected to a computer controlled production line on a party line basis. However, this system is contemplated only to service one diagnostic terminal in any given instance.

The automation system comprises an appropriate number of automation satellites that connect to the welding stations and their associated transfer line. These satellites monitor the limit switches and other sensors on the machine and report their status via relatively inexpensive cable to the control master. The control master determines the intent of the inputs and causes outputs to permit the production line to continue the manufacturing process. In evolving the automation system, the various input and output printed circuit boards have been designated to be relatively simple and interchangable one with the other to permit ease in maintaining the facility and permit ready repair of the system without requiring a large number of printed circuit boards to be maintained in stock.

In the system of the present invention, a centralized computer master is mounted in a location which permits ease of monitoring of all of the welding heads and the automation line. The centralized master includes an interface unit for the computer and various input and output printed circuit cards which are utilized to provide data to and from the computer and also to control the flow of data to and from the computer. The master unit also includes the welding control cards, the power supply and a terminal rack to terminate the various connections to the master.

The master terminal also includes various input and output terminal devices such as a teletype writer unit, a cathode ray tube unit, a magnetic tape unit, a paper tape unit and a magnetic storage disk.

The portion of the system mounted on the floor includes, generally, an automation satellite, a power satellite, a weld-data input/output terminal, a diagnostic terminal and the various printed circuit boards required to control the welding operation. The automation satellite includes sensing circuits for sensing the closure of limit switches, contacts and other functions of that type and also provides triac output cards which are capable of controlling unit on the floor. The power satellite includes circuits to balance the load across the three phases feeding the various welding units and the contacts required to protect the power supply from any malfunction in the external circuits.

The controls for the welding guns includes a heat control circuit which is capable of controlling the percent heat between twenty and a hundred percent. Also, the heat control includes a false weld and weld override feature which is utilized to protect the system against malfunctioning in the welding portion of the welding cycle. The welding control circuit also includes a pilot and valve system which is utilized to turn on the valve and close the various pilots associated with a welding machine or gun. The welding control further includes a retract circuit which permits retracting of the welding gun beyond the normal opening of the jaws.

As will be seen from the following description of the invention, the automated system which comprises the basis of the present invention permits the precise control of a large number of welding guns while maintaining the quality of the welds to a degree beyond that which has been heretofore known in welding systems of the type including individual controls. Further, it has been found that, beyond a predetermined number of welding heads, it is more economical to centrally control the welding guns or machines with a central control module mounted in a remote room which may be maintained with ease and may be provided with an environment for the personnel operating the central control which is clean, free of noise and otherwise free of the hazards of a manufacturing operation.

OBJECT OF THE INVENTION AND SHORT DESCRIPTION OF THE DRAWINGS

Accordingly, it is one object of the present invention to provide an improved welding control system.

It is another object of the present invention to provide an improved welding control system which is capable of controlling a multiplicity of heads.

It is another object of the present invention to provide an improved welding control system for controlling a multiplicity of heads wherein the various portions of the welding cycle are computer-controlled.

It is another object of the present invention to provide an improved welding control system which eliminates the conventional timing circuits for the various portions of the welding cycle.

It is a further object of the present invention to provide an improved welding control system which is capable of controlling a large number of welding heads on a per cycle of line frequency basis in response to closure of the pilot switch.

It is still a further object of the present invention to provide an improved interface system between a computer and a welding head or a plurality of welding heads to permit control of the various portions of the welding cycle by the computer.

It is still another object of the present invention to provide an improved load control for controlling the number of heads which may be put on line at any particular time.

It is still a further object of the present invention to provide an improved welding control system for a multiplicity of welding heads which control the application of welding power to each head in response to the number of heads which are in the welding portion of the cycle at the time the particular welding head is to be supplied with welding power.

It is still a further object of the present invention to provide an improved control system for a multiplicity of heads which minimizes the reactive power level being used at any particular instant of time during a welding cycle.

It is another object of the present invention to provide an improved welder control system for a multiplicity of heads which supplies welding power to the heads in response to a preselected KVA capacity of the particular phase being utilized to supply welding energy.

It is still another object of the present invention to provide an improved computerized control system for controlling the application of welding power to a large number of welding heads wherein the computer is supplied with information relating to the available KVA power, wherein the computer will not allow welding energy to be fed to a particular head if the available KVA energy available, as stored in the computer, will be exceeded by supplying energy to that particular head.

It is a further object of the present invention to provide an improved computerized welding system of the type described wherein the computer is supplied with information relating to the total energy being fed to all of the multiple heads in any particular instant of time and makes a decision whether additional energy is available for supply to a particular welding head for which energy is requested by an operator.

It is a further object of the present invention to provide an improved system for altering the various portions of a welding cycle, as for example squeeze, weld, hold and off, by a simplified data entry terminal positioned adjacent several of the heads being controlled by the above described computer.

It is still a further object of the present invention to provide an improved data entry terminal which is capable of adjusting the computer programmed values described above and providing an operator with information relative to the cycles of line frequency which have been programmed for the various portions of a welding cycle for a large number of welding heads.

It is still a further object of the present invention to provide an improved data entry terminal for addressing a computer which is capable of testing whether the data being entered into the computer relative to a particular head is within limits established for that terminal.

It is still another object of the present invention to provide an improved data entry terminal which is operated by merely setting the particular data to be entered and turning a key to enter that data into the computer or merely turning the key to a second position to read data which has been programmed into the computer.

It is a further object of the present invention to provide an improved diagnostic system for use in connection with a computer controlled automatic manufacturing line.

It is still another object of the present invention to provide an improved automation control system which is adapted to be utilized in conjunction with the welding system described above.

It is still a further object of the present invention to provide an improved master control system for both an automation and welding control of a manufacturing line.

It is still another object of the present invention to provide an improved output control circuit for transferring data from equipment on a welding floor to the interface associated with a computer.

It is still another object of the present invention to provide an improved input control circuit for transferring data from a welding floor to an interface associated with a computer.

It is still a further object of the present invention to provide an improved triac control output circuit.

It is still another object of the present invention to provide an improved switch condition sensing circuit of the transformer type for sensing the condition of various switches along an automated line.

It is a further object of the present invention to provide an improved valve and weld input/output circuit for use in conjunction with a welding system such as described above.

It is still a further object of the present invention to provide an improved control circuit for data entry to a computer.

It is still another object of the present invention to provide an improved blinker light circuit for providing an indication of the acceptability of data from a data entry terminal to a computer.

It is still a further object of the present invention to provide an improved single memory retract and emergency stop circuit for utilization in connection with a computerized welding control system such as described above.

It is still a further object of the present invention to provide an improved pilot and valve driver circuit for use in conjunction with the welding system described above, the pilot and valve driver circuit including a dual schedule.

It is still a further object of the present invention to provide an improved heat control circuit for use in conjunction with a computerized control system for a multiple head welding system such as described above.

It is still another object of the present invention to provide an improved heat control circuit with false weld and weld override features for use in conjunction with a computerized welding system such as described above.

It is still a further object of the present invention to provide an improved data entry circuit with an improved display for entering data to a computer indicating when that data is acceptable to the computer.

It is another object of the present invention to provide an improved interface circuit for use in conjunction with transferring data between a manufacturing line, including multiple welding heads, and a computer for controlling and sensing conditions of the line.

It is still a further object of the present invention to provide an improved input and buffer circuit for use in conjunction with the interface circuit described above.

It is still another object of the present invention to provide an improved function code and device address decode circuit for use in conjunction with the interface circuit described above.

It is still a further object of the present invention to provide an improved failure indicator circuit with an automatic switch-over to a backup computer in the event of computer failure.

It is still a further object of the present invention to provide an improved control circuit for a digital clock with a disabling feature.

It is still a further object of the present invention to provide an improved change-over circuit for switching a teletype unit from a first processor to a second processor.

It is a further object of the present invention to provide an improved interface output circuit with associated gating circuit for use in conjunction with the interface of the present invention.

It is a further object of the present invention to provide an improved paper tape reader interface circuit for use in conjunction with the system of the present invention.

It is still another object of the present invention to provide an improved decoder circuit to generate enable signals to permit the buffer to be loaded or read in accordance with the desired direction of data travel.

It is still a further object of the present invention to provide an improved decoder circuit for generating particular digits of an address as utilized in connection with the system of the present invention.

It is still a further object of the present invention to provide an improved control signal generator circuit which is capable of designating a particular processor as the master processor, thus designating the other processor as the standby processor.

It is a further object of the present invention to provide an improved select generator circuit for designating certain signals as either input or output signals depending on the characteristic of the signal.

It is still a further object of the present invention to provide an improved logic gating circuit for the computer data buss system.

It is still another object of the present invention to provide an improved automation address gating circuit for use in conjunction with the automation portion of the system of the present invention.

It is still a further object of the present invention to provide an improved automatic welding system of the type described which is relatively inexpensive to manufacture, easily maintained and reliable in operation.

It is still a further object of the present invention to provide an improved automatic welding system for computer controlling a multiplicity of welding heads, the system being easily adapted to replace present systems being utilized.

It is still another object of the present invention to provide an improved automation system for use in connection in sensing and controlling an automated line which is relatively inexpensive to manufacture, reliable in operation and easily installed.

It is still a further object of the present invention to provide an improved automation and welding system of the type described which overcomes certain disadvantages present in systems being utilized.

Other objects, features and advantages of the present invention will become apparent from a review of the specification, appended claims and attached drawings in which:

FIG. 4 is a schematic diagram illustrating a portion of an input circuit which is utilized for voltage conversion and isolation and is particularly adapted to transfer data from the welding floor to the interface associated with the computer;

FIG. 5 is a schematic diagram illustrating the remaining portion of the circuit of FIG. 4;

FIG. 6 is a schematic diagram illustrating a triac control output circuit;

FIG. 7 is a schematic diagram illustrating a transformer type of switch condition sensing circuit which is utilized to sense the open or closed condition of certain switches associated with the automated line;

FIG. 8 is a schematic diagram illustrating a portion of the valve and weld input/output circuit associated with the welding portion of the system of the present invention;

FIG. 9 is a schematic diagram illustrating the remaining circuitry of the schematic of FIG. 8;

FIG. 10 is a schematic diagram illustrating a blinker light control circuit which is utilized in connection with the data entry terminal associated with the computer;

FIG. 11 is a schematic diagram illustrating a portion of the control circuit for the data entry terminal;

FIG. 12 is a schematic diagram illustrating the remaining circuitry of the system of FIG. 11;

FIG. 13 is a schematic diagram illustrating a single memory retract and emergency stop circuit associated with the welding system of the present invention;

FIG. 14 is a schematic diagram illustrating a portion of the pilot and valve drive circuit with a dual schedule;

FIG. 25 is a schematic diagram illustrating the details of the failsafe indicator and automatic switch-over circuit forming a portion of the interface of FIG. 21;

FIG. 26 is a schematic diagram illustrating the details of a digital clock control circuit with a disable feature during certain portions of the computer cycle;

FIG. 30 is a schematic diagram illustrating the details of one of two interface output circuits, the circuit for processor one being particularly illustrated, it being noted that there is a circuit for processor two;

FIG. 31 is a schematic diagram illustrating the details of an address gating circuit associated with processor two, there being a similar circuit in the system for processor one;

FIG. 32 is a schematic diagram illustrating the details of an input/output address driver circuit;

FIG. 34 is a schematic diagram illustrating a decode circuit which is adapted to generate enable signals to load the buffer associated with the interface of the present invention and also generate enable signals to read the buffer;

FIG. 35 is a schematic diagram illustrating the details of a paper tape decode circuit to generate certain digits of an address, in this particular case the third digit of the paper tape address;

FIG. 36 is a schematic diagram illustrating the details of a control signal generator circuit which is adapted to generate a control signal to designate a particular processor as the master processor;

FIG. 37 is a schematic diagram illustrating the details of an input/output select circuit which is adapted to be utilized with either processor one or processor two as the master;

FIG. 38 is a schematic diagram illustrating the details of a paper tape pulse gating circuit which is adapted to be utilized in conjunction with both processors when either processor is a master;

FIG. 39 is a schematic diagram illustrating the details of a multiplex gating circuit for the computer data buss;

FIG. 40 is a schematic diagram illustrating the details of an automation address gating circuit forming a portion of the interface of the present system and particularly utilized in conjunction with the automation portion of the system.

DETAILED DESCRIPTION OF THE DRAWINGS

Figure 1:
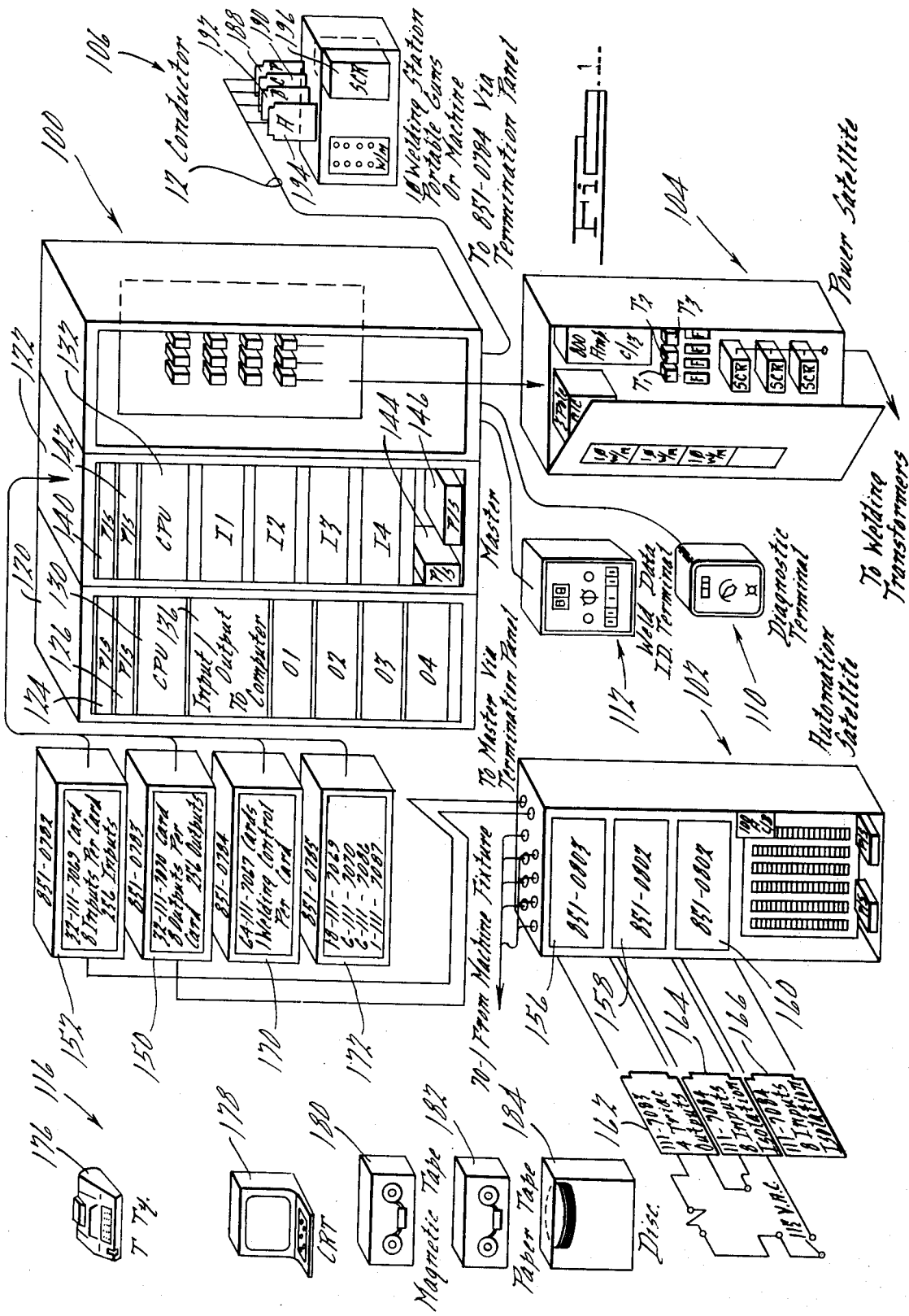
FIG. 1 is a perspective view and block diagram of the overall system incorporating the features of the present invention.

Referring now to FIG. 1, there is illustrated, in perspective, the overall system incorporating the features of the present invention. The system basically consists of a master unit 100 which is capable of controlling approximately a hundred and sixty welding heads, this limit being primarily due to the cycle time limitation of the computer being used in this particular system. It is to be understood that additional machines may be controlled as computers with faster cycle times are utilized. The master unit 100 is preferably located in a central maintenance area location to aid in the monitoring and maintenance of the welding and automation operations being controlled by the master unit. This system also includes an automation satellite 102 which is located on the floor adjacent the automation equipment being controlled and also a power satellite 104 which is adjacent the welding guns being controlled. The power satellite 104 is utilized to sense the power load on each phase of the power supply to enable the computer to balance and limit power.

The system further includes the control circuit 106 for the welding guns being controlled by the computer, the control circuit 106 including the ultimate output control device, for example an SCR. The control circuit also includes the heat control, the power supply, the pilot valve circuit, and the retract circuit which permits retracting of the jaws of the welding unit beyond the normal opening position. The system further includes a diagnostic terminal 110 and a welded data terminal 112, which are utilized to address the computer to determine which data is in the computer for a particular machine or welding head and also to control or input new data to the computer to change certain parameters for the welding system. The system further includes certain peripheral equipment 116 which are located adjacent the master terminal to address the computer to provide input data to the computer or to permit the outputting of data within the computer to the operator.

In referring specifically to the details of the system illustrated in FIG. 1, it will be noted that the master unit 100 is divided into an output side 120 and an input side 122, the output side being determined by data being fed from the computer to the floor and the input side 122 being determined by data flowing from the floor to the computer. Specifically, the input side includes a pair of power supply units 124, 126 which supply power to the unit 120. The heart of the entire master unit is contained in a "mini-computer" 130 which may be of any type suitable for controlling the automation and welding loads to be described. Also, a backup computer 132 has been provided, the backup computer being capable of storing and controlling all flow of data into and out of the computer from the interface if the backup computer is selected. It is to be understood that the backup computer, and the backup computer may be designated either computer 130 or 132, always maintains the same storage of data as the master computer during the operation of the master computer. Thus, the backup computer may be selected at any time to control the welding and automation load.

The unit 120 also includes an input/output unit 136 which will be described as the interface unit in connection with the specific description of FIGS. 21–40 of the drawings. The details of the interface unit are specifically contained in these figures. The interface unit provides the necessary buffering and control functions to permit input of data to the computer from the floor and also from its control of the units on the floor by the computer.

For example, the interface unit contains the buffer circuits for both the first and second processor units 130, 132 to permit the gating of data from the master processor to the standby processor, data from either processor to the floor, to the standby computer from the master computer and other similar type buffer functions. The interface further includes certain encoding and decoding for the address functions to permit the computer to address certain circuits within the system and to identify certain circuits within the system in computer language. The interface further includes circuits to permit gating of data from certain terminal units as for example the reader and teletype writer and also provides driver current for certain high use circuits within the system. Other functions of the interface unit will become apparent from a description of FIGS. 21–40 as described above.

The units 120, 122 include a plurality of modular units designated 01, 02, 03 and 04 in the case of unit 120 and I1, I2, I3 and I4 in the case of unit 122. As was the case with unit 120, a pair of power supplies 140, 142 have been provided at the top of the unit 122 and a second pair of power supplied 144, 146 are provided in the lower portion of unit 122. The modules 01, 02, 03, 04 and I1, I2, I3, I4 are utilized to mount the card unit illustrated to the left of units 120, 122 and designated 851–0782, 851–0783, 851–0784 851–0785. These units are utilized to mount the input and output cards as designated within the face plates thereof and also include the welding controls and miscellaneous controls. These controls will be described in great detail in connection with the description of the figures representing the details thereof and a brief description will be given hereafter.

For example, unit 851–0783, given reference numeral 150, contains thirty-two cards having the designation 111–7070 which will be described in greater detail in conjunction with the description of FIGS. 2 and 3. However, for the present, it is sufficient to state that the card contains eight output boards which are utilized to flow data from the interface to the units on the floor, to isolate the floor from the computer, and to convert the computer voltage at a five volt level to the floor voltage at 24 volt level. This card is utilized to transfer data from the computer to the floor.

The unit designated 851–0782, given reference numeral 152, contains 32 cards which contain eight inputs per card to provide the 256 inputs from the floor to the computer for transferring data from units on the floor to the computer. The unit 152 is mounted in the section 122 and provides isolation between the floor and the computer and it converts from the 24 volt half wave level at the floor to the five volt level required by the computer. The circuits within this unit 152 will be described more particularly in conjunction with the description of FIGS. 4 and 5. This unit generally provides a path for the flow of data from the floor to the computer.

Referring now to the automation satellite which is mounted on the floor adjacent the area being controlled, it is seen that the unit 102 contains three modules designated 851–0803, and given reference numeral 156, unit 851–0802, reference numeral 158, and unit 851–0801, reference numeral 160. Referring specifically to unit 156, it is seen that the unit is utilized to control a plurality of automation units, as for example solenoid switches etc. by means of a plurality of four triac output circuit boards 162, the boards being designated 111-7083 and described more particularly in conjunction with the description of FIG. 6. The input to the triac boards 162 is provided from board 7070 described in conjunction with unit 150 above and the output thereof are connected to the loads to be controlled. The loads are selected by the computer and selectively controlled by an address generated within the computer.

A pair of correlative boards 111-7084 are provided and given reference numerals 164, 166 which boards are utilized to sense the closure of various switches in the form of limit switches, micro switches, etc.. The closure of these switches generates a signal which is fed to board 111-7069 described above in connection with block 152 and more particularly to be described in conjunction with FIGS. 4 and 5. The board 111-7084 will be described in greater detail in conjunction with the description of FIG. 7.

From the description above of unit 102, it is seen that certain automation features along the welding line may be controlled by means of the triac output circuit 162, which control is selected and addressed by the computer. The address is fed through the input/output circuit 136 and fed to circuit boards 111-7070 described in conjunction with block 150. From the block 150, signals are fed to the triac circuit boards 162. The operation of the circuit, as to whether the circuit has reacted or not to the control signal generated in boards 162, will be sensed by means of board 164 and fed back to the computer through circuit boards 111-7069 described in conjunction with block 152, through the output circuit described in conjunction with block 136 to the computer. Also, other micro switches, limit switches, etc. may be sensed by means of boards 166 and fed back to the computer through the circuits described in conjunction with block 152 and the interface circuit 136.

In conjunction with the welding portion of the system, a welding control unit 170 has been provided which includes 64 circuit boards designated 111-7067 and more particularly described in conjunction with FIGS. 8 and 9. These welding controls are utilized to control the valve and weld input/output circuits, the circuit being utilized to isolate the input signal from the welding floor to the computer and also provide a voltage level change from the 24 volts half wave present at the welding floor to the five volt signal level utilized by the logic of the system. The circuit basically indicates whether the first or second pilot button has been actuated by the operator, these indicator signals being provided at the output circuit board 7067, and provides the MSQ and ITW output signals.

The system further includes certain auxillary functions for the welding and automation system which are mounted within unit 172. As is seen from the face of unit 172, this includes a plurality of different types of circuits, the first 18 of which are duplicates of the 111-7069 cards described in conjunction with block 152 and six cards designated 111-7070 described in conjunction with unit 150. Further, the unit includes six circuit boards which are designated 111-7086 and one circuit board which is designated 111-7087.

Referring first to circuit board 111-7087, the system includes a weld data terminal 112 which is utilized to interrogate the computer to extract welding data within the computer storage and also to input new data to the computer, which will change times or functions within the computer. It is necessary to determine if this data is acceptable. Particularly, the operator of the welding system is capable of entering new data into the computer to change the various times of certain portions of the welding cycle whether that change be the lengthening or shortening of the various portions thereof. However, it has been found desirable to provide indication to the operator when the proposed times be set into the computer are out of limit for that particular machine. Accordingly, a blink light is provided which will indicate to the operator that the particular welding machine in connection with which he is trying to effect a change is not within the group of machines assigned to that data terminal or that the parameters which he has selected are not within the limit of parameters within which the machine will operate. To accomplish the blinking, an oscillator is provide to control the light contained within the weld data terminal 112. This oscillator is contained in board 111-7087 and will be described in greater detail in conjunction with the description of FIG. 10.

As described above, the oscillator of board 111-7087 is utilized to control a light within the weld data terminal 112. The blink circuit is utilized to control a read indicator circuit, designated 111-7086, the details of which are described particularly in conjunction with the description of FIGS. 11 and 12. It will be noted that the system includes six such read indicator circuits which are utilized to control six remote weld data terminals associated with the master unit 100. Particularly, there is a read indicator circuit which is adapted to provide an output signal in response to the entry of data into the computer by the weld data terminal and the acceptance of that data by the computer. If the data is accepted by the computer, the circuit of board 111-7086 will energize an output light mounted on the weld data terminal 112 for a preselected period of time and subsequently turn off that light after the indicator circuit has timed out. However, as will be explained more specifically in conjunction with FIGS. 11 and 12, if the computer does not accept the data being entered, the blink light mounted on the weld data terminal will provide a fairly rapid series of pulses to the indicator lamp to cause the lamp to blink at a rapid rate. This control is provided by card 111-7086.

The maintenance room, as stated above, also includes terminal units which are utilized to communicate with the computer and these take the form of any type that are available and designed to be used by systems of this type. The typical examples are illustrated on the left side of FIG. 1 and include a teletype unit 176, a cathode ray tube unit 178, a magnetic tape unit 180, a taper-tape unit 182 and a storage disk unit 184. The peripheral units are utilized for functions which are typical in installations incorporating a computer. For example, the teletype unit may be utilized to input data to the computer or provide diagnostic or trouble data from the computer on a hard copy to be preserved as a record of the production period. The cathode ray tube may be utilized as a display when a hard copy is not desired. The magnetic tape may be utilized to enter programs into the computer at a highspeed or to provide a reference storage copy of the program from the computer. The paper tape unit is used for a similar function to input the software to the computer. The magnetic disk unit 184 is utilized for storage purposes as is common. Also the diagnostic terminal 110 has been provided on the floor to provide terminal communication through hardwire cable and a small interface. Any number of terminals may be connected to the computer controlled production line on a party line arrangement.

In welding systems of this type wherein a large number of welding heads are to be controlled from a single three phase power source, it is necessary not only to balance the load on each phase of the source but also to maintain the KVA demand at any particular time relatively constant relative to other times during the welding day. The reason for this latter requirement is that charges made to a factory for power is greatly related to the maximum KVA requirement of that manufacturing plant. If a large number of welding loads are placed on the power supply at any particular time to raise the KVA demand, the charge for that power for any given month will be based on the maximum demand made on the power supply. Due to the fact that welding loads are highly inductive, this KVA requirement could become excessive if a large number of loads are placed on the power supply at any given time. Due to the fact that the processor has a capability of high speed and arithmetic capacity to assign each welding station of the power satellite of value based upon its specific power requirements, it is possible to utilize the power available in a most economical manner.

With the system of the present invention, the power load for each cycle is sensed and permitted to proceed through a weld cycle if the power demand does not exceed a preselected limit. However, if the limit is exceeded, certain welding guns are not permitted to weld for the requisite number of electrical cycles to permit the load requirements to come within limits. In order to accomplish this, the power satellite 104 is utilized to sense the welding load being supplied to the welding guns for each phase. This information is fed to the computer to determine if certain welding loads are permitted to proceed through the welding cycle.

The final module illustrated in FIG. 1 is the welding station portable guns or welding machines which are controlled from the computer. The module 106 includes a retract circuit 188, a pilot and valve circuit 190, a power supply circuit 192 and a heat control circuit 194.

The SCR's controlling the particular welding heads are illustrated at 196.

The circuit 188 is designated as circuit board 111-7074 which is more particularly to be described in conjunction with the description of FIG. 13. The circuit includes means for closing and opening the welding jaws beyond the normal opening point of the jaws and also includes an output of the and gates 202 are utilized to control an eight to ten millisecond monostable multivibrator circuit 204 which is utilized as a pulse stretcher circuit. The output from the monostable multivibrator circuit 204 provides an output signal at a plurality of output terminals 206. These ten millisecond pulses are generated as a safety measure to insure that, in the case of accidental disruption of hardware, all machine functions will cease. It is the repetitive feature of the pulses that performs this function.

Figure 2:
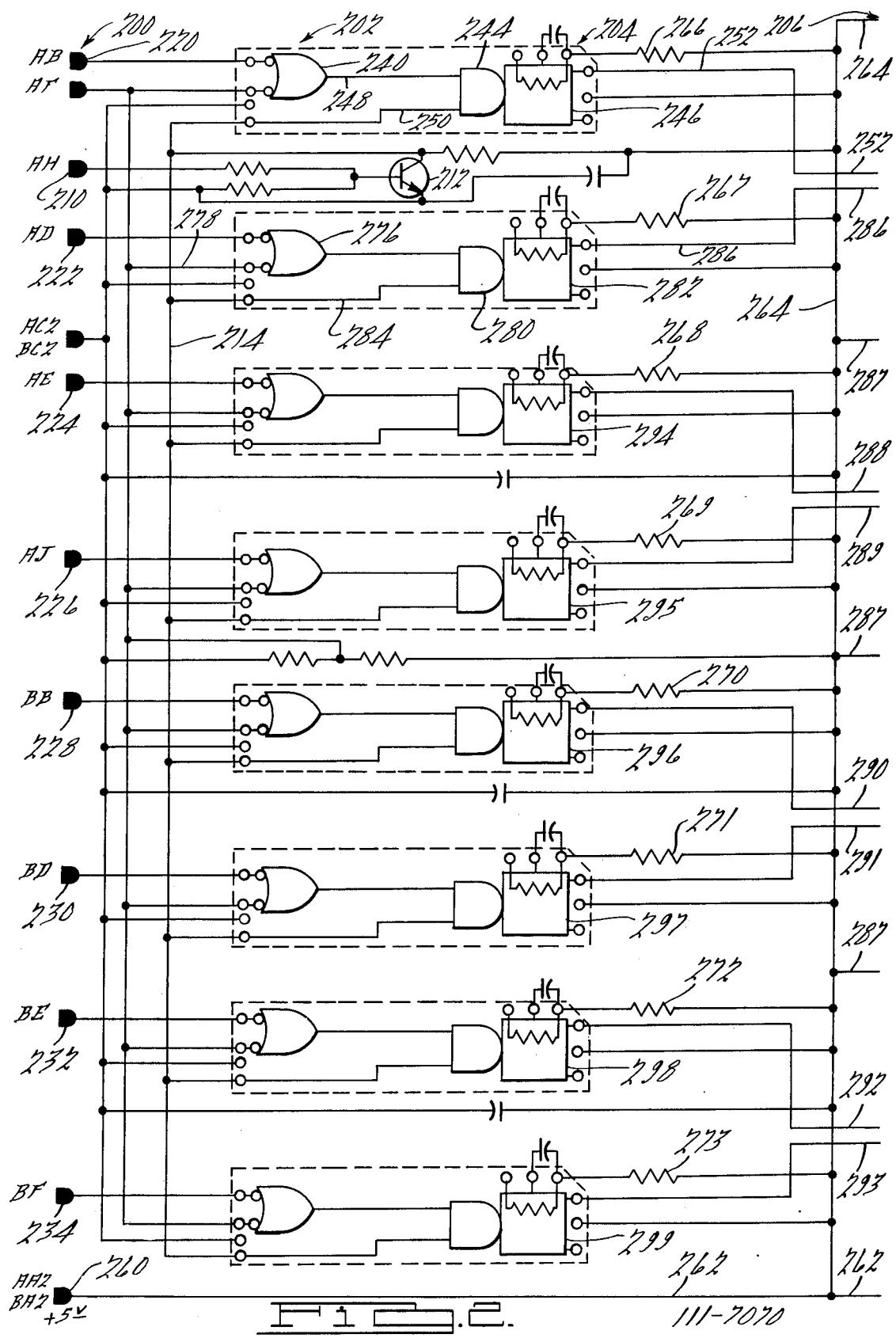
FIG. 2 is a schematic diagram illustrating a portion of the output circuit utilized for voltage conversion, isolation and for the transfer of data from the interface to the welding floor.
Figure 3:
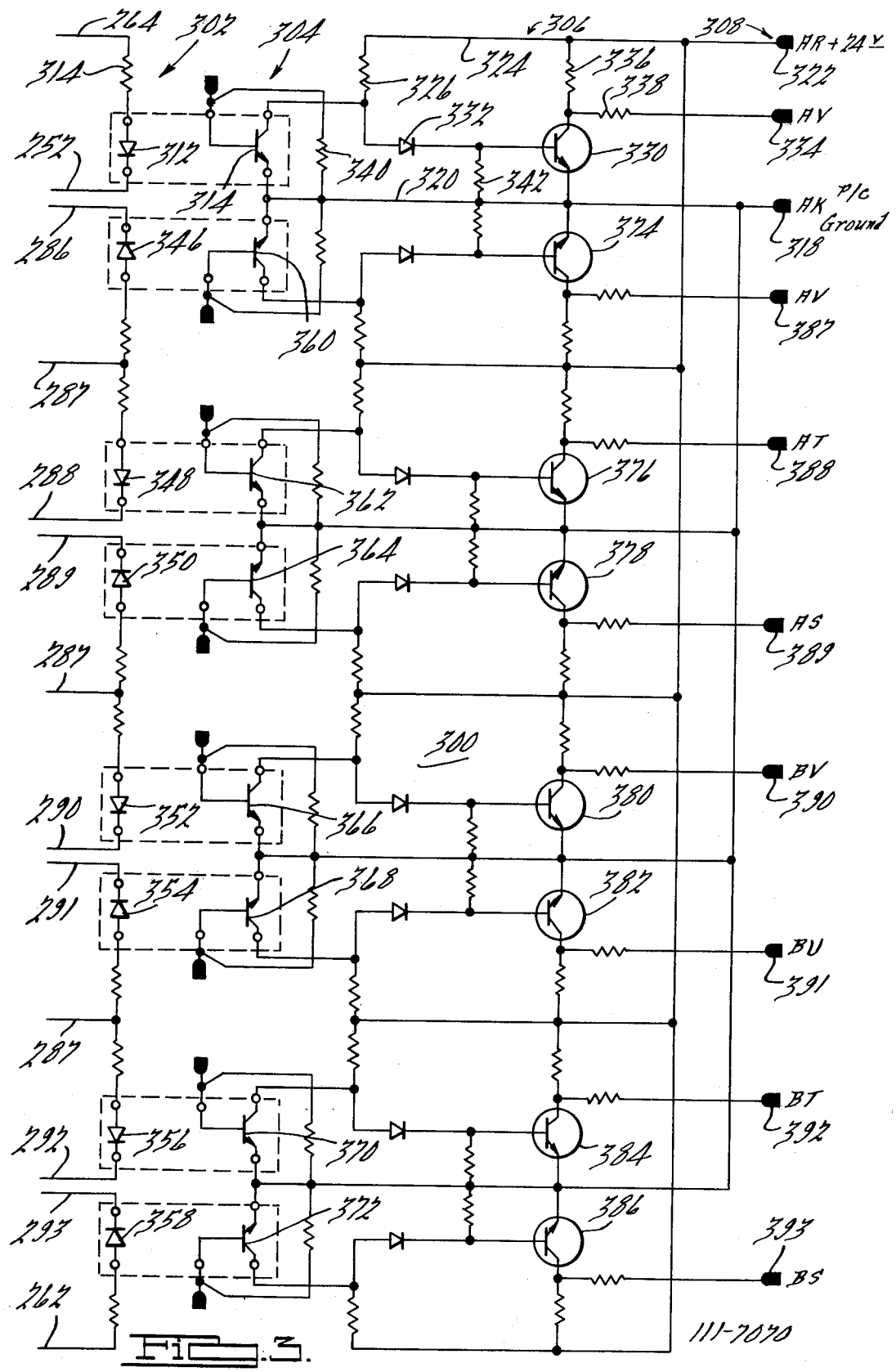
FIG. 3 is a schematic diagram illustrating the remaining portion of the output circuit of FIG. 2.

Referring to the specifics of the circuit, input terminal 200 includes an address input terminal 210 which is provided a logical zero signal when the particular circuit of FIGS. 2 and 3 is to be energized and the computer signifies that it is an output signal. When these two conditions are present, a momentary logical zero level signal is present at input terminal 210. This signal causes a normally conductive transistor 212 to become non-conductive, thereby providing an enable signal on a conductor 214. This enable signal takes the form of a logical one signal and is fed to the input circuit of each of the plurality of monostable multivibrator circuits 204 as will be explained hereinafter.

The set of terminals 200 includes a set of specific data terminals 220 thru 234 which are interconnected with the input circuits of each of the gates 202 on a one-for-one basis. The circuit of FIG. 2 also includes an enabling terminal 238 which is also connected to the input circuit of each of the gates 202.

Referring to the specific details of the upper portion of FIG. 2, it is seen that the terminals 220 and 238 are connected to the input circuit of an and gate 240. When the and gate 240 is to be selected by the emergency stop circuit in the event that an emergency is encountered during the course of a weld.

The pilot and valve circuit 190 is utilized to control the pressure being applied to the weld and includes a first and second sequence. The first sequence applies a certain pressure to the load and the second sequence supplies a higher pressure to the welding jaws. These schedules are controlled by means of a pair of pilot buttons which select which schedule the operator desires to be used. The circuit of board 111-7072 will be described more particularly in conjunction with the description of FIGS. 14–16. The board 192 is a typical power supply board and the board 194, designated board 111-7073, is a welding control circuit which is to be described more particularly in conjunction with FIGS. 17-19. Particularly the board includes a heat control dual schedule which permits a 20 to 100 percent heat adjust with false weld and weld override provisions.

Referring now to FIGS. 2 and 3, there is illustrated the specific details of the output board 111-7070. This printed circuit board provides isolation of the computer from the floor and also provides a conversion from the five volt level utilized by the computer to the twenty four volt level utilized at the floor. This circuit is ultimately utilized to control the output triac board 111-7083, described in conjunction with the description of FIG. 1 and FIG. 6.

Specifically, the circuit of FIG. 2 includes a plurality of input terminals 200 which are utilized to control an and gate or a set of and gates 202 depending on the particular address energized. The computer, terminal 220 will go from a logical one to a logical zero level signal. This will provide an output from gate 240 which rises from a logical zero to a logical one level. This signal is fed to the input circuit 244 of a monostable multivibrator circuit 246 by means of a conductor 248. The input circuit 244 also includes an enabling input signal from the conductor 214, this signal being connected thereto by means of a conductor 250.

When the board has been selected by a logical zero level signal on input terminal 210 and a specific address signal has been impressed on terminal 220, the output from gate 240 will cause monostable multivibrator circuit 246 to start its timing cycle. The output of the monostable multivibrator circuit on an output conductor 252 is normally at a logical zero level. However, during the time that the monostable multivibrator circuit 246 is timing out, the signal level on conductor 252 will rise to a logical one level. This will provide an output logical one level signal on conductor 252. The conductor 252 is connected to a light emitting diode to be described in conjunction with FIG. 3.

The monostable multivibrator circuit 246 is provided with a source of five volt potential at an input terminal 260 by means of a conductor 262, a conductor 264, and a resistor 266. Each of the plurality of single-shot multivibrators 204 is similarly provided with the same five volt potential through a plurality of resistors 267 to 273.

Referring to the second module, it is seen that the input terminal 222 is connected to a second gate 276 and the input terminal 238 is also connected to the input circuit of the and gate 276 by means of a conductor 278. Again, when the signal levels are proper on input terminals 220, 238, the output of the gate 276 will rise to a logical one level to provide a logical one level signal to an input circuit 280 of a monostable multivibrator circuit 282. Further, the input circuit 280 is provided with an enabling signal from the transistor 212 by means of a conductor 284. It will be recalled that the enabling signal is present on conductor 214, and thus conductor 284, when the board address signal has been generated by the computer and the address signal is designated on output signal. In this way, an enable signal is present on input terminal 210.

With the proper signal level at input circuit 280, monostable multivibrator circuit 282 will start its timing cycle. Prior to being energized, the output terminal, and particularly an output conductor 286, is at a logical zero level. During the period that the single-shot multivibrator circuit 282 is timing out, the signal level on conductor 286 will rise to a logical one level. Thus, the circuit immediately described above operates substantially identically to the circuit described in conjunction with the description of single-shot multivibrator 246. The output of conductor 286 is utilized, in conjunction with a conductor 287, to control a light emitting diode to be described in conjunction with FIG. 3.

The remaining circuits in FIG. 2 operate substantially identically and provide output signals on output conductors 288 and 293 corresponding to the upper output terminal of each of the monostable multivibrator circuits 294 to 299, respectively. As was the case above, each of these monostable multivibrator circuits is utilized to control a light emitting diode to be described in conjunction with FIG. 3.

Referring now to FIG. 3, there is illustrated the output circuit 300 corresponding to the output board for signal levels from the computer which are utilized to control certain elements on the floor. Particularly, the output signals from FIG. 3 are utilized to control the triac boards (printed circuit board 111-7083). The circuit 300 includes an input portion consisting of a series of light emitting diodes 302 which are utilized to control the conductive condition of a plurality of phototransistors 304. The output of the phototransistors are utilized to control the conductive condition of output transistors 306, the collector electrodes thereof being connected to a plurality of output terminals 308.

Referring to the specific details of the modules described above, the conductors 264, 252 are connected across a light emitting diode 312 which is connected in series circuit therewith, the series circuit including a current limiting resistor 314. As was stated above, the output circuit of the monostable multivibrators is normally at a zero level and the anode of the light emitting diode 312, and thus conductor 264, is connected to a source of positive five volt potential. The light emitting diode is normally conductive when the monostable multivibrator circuit is not in its timing cycle.

Thus, the light being emitted from the light emitting diode 312 will cause a phototransistor 314 to become normally conductive. When the monostable multivibrator circuit of FIG. 2 is in its timing cycle, the light emitting diode 312 has substantially a zero voltage impressed across the anode-cathode circuit thereof to cause the light emitting diode 312 to become non-conductive. Under these conditions, the phototransistor 314 is rendered non-conductive.

The phototransistor 314 includes an emitter electrode which is connected to ground at terminal 318 through a conductor 320. The collector electrode of the phototransistor 314 is connected to a source of 24 volt potential at input terminal 322 through a conductor 324 and a resistor 326. Thus, a conductive path is provided from the source of 24 volt potential at terminal 322 to the ground terminal at 318 through conductor 324, resistor 326, the collector-emitter circuit of transistor 314, and through conductor 320.

The collector electrode of transistor 314 is also connected to an output transistor 330 by means of a diode 332, the normally conductive condition of transistor 314 rendering transistor 330 normally non-conductive. This renders an output terminal 334 connected to the collector electrode of transistor 330 at a positive 24 volts except for the drop through resistors 336, 338. When the transistor 330 becomes conductive, the voltage level at output terminal 334 will drop to approximately ground potential due to the shunting of the left end of resistor 338 to ground through the collector-emitter circuit of transistor 330.

In operation, under normal conditions conductor 264 is at a positive voltage level and conductor 252 is approximately at zero potential. This causes light emitting diode 312 to emit and transistor 314 will be conductive. The conductive condition of transistor 314 will cause transistor 330 to become non-conductive to maintain the output terminal 334 at a positive level. Upon selection of the particular address, including light emitting diode 312 the light emitting diode 312 and transistor 314 will become non-conductive to cause transistor 330 to conduct. This will drop the voltage level at terminal 334 to approximately zero volts. Suitable base-emitter biasing resistors 342 have been provided across the base-emitter circuit of transistors 314, 330, respectively.

Similarly, a plurality of light emitting diodes 346, 348, 350, 352, 354, 356, and 358 are connected across pairs of output conductors 286–287, 287–288, 289–287, 287–290, 291–287, 287–292, and 293–262, respectively. If similar voltage conditions exist at these pairs of conductors as existed at conductors 264, 252, the light emitting diodes 348–358 will be caused to become non-conductive from their normally conductive state.

The diodes 346–358 are associated, in a light sense, with a plurality of phototransistors 360 and 373 respectively, these transistors being again normally conductive and being rendered non-conductive in response to the selection of that particular module by the computer. The collector electrodes of the transistors 360–372 are connected to a plurality of output transistors 374 to 386 through the diodes illustrated. The transistors 374 to 386 are also normally non-conductive and become conductive in response to the non-conduction state of the light emitting diodes 346 to 358. The collector electrodes of the transistors 374–386 are connected to a plurality of output terminals 387 to 393 respectively to control these signal levels at these output terminals.

As was the case with the module described at the top of FIG. 3, the light emitting diodes 346 to 358 will cease emission of light when the proper address is sensed at input terminal 210 described in conjunction with FIG. 2. Further, if the proper address signal is present at input terminal 238 and the particular terminal associated with one of the and gates 202, the particular light emitting diodes 346 to 358 will cease conduction. This will cause one of transistors 360 to 372 to cease conduction to cause a selected output transistor 374 to 386 to commence conduction. This will raise the voltage level of the corresponding output terminal 387 to 393 associated with the collector electrode of the particular non-conducting output transistor 374–386 to rise to approximately a 24 volt level. This signal will be fed to the triac board to be described in conjunction with the detailed description of FIG. 6.

Referring now to FIGS. 4 and 5, there is illustrated a voltage conversion and isolation circuit 400 and 500 which is utilized to accept data from the transformer board (board 111-7083) to be described in conjunction with FIG. 7 for transfer of data to the computer through the interface. The circuit is adapted to electrically isolate the floor from the computer and also to convert the 24 volt potential utilized at the floor to the five volt potential which is adapted to be utilized by the computer and interface systems.

Referring particularly to FIG. 4, it is seen that an alternating voltage potential is developed across pairs of terminals including a first pair of terminals 402, 404, the terminal 404 being the ground terminal, and a second pair of terminals 406 and the ground terminal 404. From the following description of the sensing circuit, it will be seen that the upper portion of the circuit is adapted to sense positive going pulses and the lower portion of the circuit is adapted to sense negative going pulses.

Referring first to the positive going circuit, it is seen that the input terminal is connected through a diode 410, a pair of resistors 412, 414 to a light emitting diode 416. The light emitting diode is poled such that current will flow from terminal 402 to terminal 404 through the above mentioned circuit element and a common conductor 420. Suitable filter elements, including resistor 422 and capacitors 424, 426 have been provided to reduce electrical noise signals. Also, a diode 430 has been provided to insure that the reverse voltage across light emitting diode 416 does not exceed that which is capable of being handled by light emitting diode 416.

The light emitting diode 416 is coupled to a phototransistor 432, the light emitting diode 415 and the phototransistor 432 being normally non-conductive. The collector electrode of the phototransistor 432 is connected to a source of five volt potential at input terminal 434 by means of a conductor 436 and a resistor 438. The emitter electrode of phototransistor 432 is connected to ground potential at terminal 440 by means of conductors 442 and 444.

Thus, when a positive going pulse is sensed across terminals 402, 404, the light emitting diode will emit light to cause transistor 432 to conduct. This will drop the voltage at the collector electrode thereof to provide a logical zero level signal at conductor 446.

The conductor 446 is connected to the input circuit of an and gate 448, the output of which is connected to an output terminal 450 through a diode 452. The gate 448 also includes an input signal from a common address terminal 456, the address terminal being connected to the computer wherein an address signal is generated to signify the particular circuit board of FIGS. 4 and 5. Also, the signal at terminal 456 also includes the fact that the resulting signal on terminal 450 is to be an input signal, the address and input signal being combined to form the enabling signal impressed on terminal 456. This signal is fed to the input circuit of gate 448 through a diode 458 and a common conductor 460.

In operation, if a positive going signal is fed to input terminals 402, 404, the light emitting diode 416 will cause phototransistor 432 to conduct. This will present the proper input signal to gate 448, which signal will be passed through gate 448 when the address signal is impressed on input terminal 456. When the conduction of transistor 432 and the address signal on terminal 456 coincide, an output signal will be impressed on output terminal 452.

Referring now to the negative half cycle, the negative half wave is impressed on terminal 406 and thereby impressing the signal on a light emitting diode 462 through diode 464 and resistors 466, 468. A return path is provided through the conductor 420. Again, suitable filter elements such as capacitors 470, 472 have been provided as diode 474 to limit the reverse voltage fed to the light emitting diode 462.

When light emitting diode 462 is energized, a normally non-conductive phototransistor 476 is energized to provide a ground input signal to one input terminal of an and gate 478. The other input terminal of gate 478 is connected to the address terminal 456 by means of the conductor 460. Again, the gate 478 is connected to an output terminal 480 through a diode 482.

Accordingly, when a negative going pulse is impressed on input terminal 406, the light emitting diode 462 will conduct to provide an output signal at output terminal 480.

The lower half of FIG. 4 includes a circuit which is identical to that described above wherein a pair of input terminals 482, 484 are fed an alternating current input signal. The terminal 482 is utilized to control the conduction of a light emitting diode 486, the return path for the diode 486 being formed by a conductor 488 and a conductor 490 connected to the terminal 404. The light emitting diode controls the conduction of a phototransistor 491, the conductive condition of which controls the state of an and gate 492. The gate 492 also includes the address input signal from terminal 456 by means of the conductor 460. In the event the proper signal conditions exists at terminal 482 and 456, an output signal will be provided to output terminal 493.

The lower half of the circuit is identical with that described in conjunction with terminal 406 wherein a negative going signal is fed to terminal 484. This signal causes a light emitting diode 494 to become conductive which, in turn, will cause phototransistor 495 to conduct. This conduction will present the proper signal to an and gate 496 which will be combined with the address signal on the conductor 460. This coincidence of a negative going signal at terminal 484 and the proper address signal at terminal 456 will provide an output signal at an output terminal 497.

Each of the terminals 450, 480, 492, and 497 are connected back to the computer to signify that certain micro switches, limit switches, etc. have been closed or open depending on the signal which the computer is looking for. In this way, the computer may monitor the welding line and provide certain control functions for the system.

Referring particularly to FIG. 5, it is seen that an alternating voltage potential is developed across pairs of terminals including a first pair of terminals 502, 504, the terminal 504 being the ground terminal, and a second pair of terminals 506 and the ground terminal 504. From the following description of the sensing circuit, it will be seen that the upper portion of the circuit is adapted to sense negative going pulses.

Referring first to the positive going circuit, it is seen that the input terminal is connected through a diode 510, a pair of resistors 512, 514 to a light emitting diode 516. The light emitting diode is poled such that current will flow from terminal 502 to terminal 504 through the above mentioned circuit element and a common conductor 520. Suitable filter elements, including resistor 522 and capacitors 524, 526 have been provided to filter any noise signals. Also, a diode 530 has been provided to insure that the reverse voltage across light emitting diode 516 does not exceed that which is capable of being handled by light emitting diode 516.

The light emitting diode 516 is coupled to a phototransistor 532, the light emitting diode 516 and the phototransistor 532 being normally non-conductive. The collector electrode of the phototransistor 532 is connected to a source of five volt potential at input terminal 534 by means of a conductor 536 and a resistor 438. The emitter electrode of phototransistor 532 is connected to ground potential at terminal 540 by means of conductors 542, 544. Thus, when a positive going pulse is sensed across terminals 502, 504, the light emitting diode will be caused to emit light to cause transistor 532 to conduct. This will drop the voltage at the collector electrode thereof to provide a logical zero level signal at conductor 546.

The conductor 546 is connected to the input circuit of an and gate 548, the output of which is connected to an output terminal 550 through a diode 552. The gate 548 also includes an input signal from a common address terminal 456, the address terminal being connected to the computer wherein an address signal is generated to signify the particular circuit board of FIGS. 4 and 5. Also, the signal at terminal 556 includes the fact that the resulting signal on terminal 550 is to be an input signal, the address and input signal being combined to form the enabling signal impressed on terminal 456. This signal is fed to the input circuit of gate 548 through a diode 558 and a common conductor 560.

In operation, if a positive going signal is fed to input terminals 502, 504, the light emitting diode 516 will cause phototransistor 532 to conduct. This will present the proper input signal to gate 548, which signal will be passed through gate 548 when the address signal is impressed on input terminal 456. When the conduction of transistor 532 and the address signal on terminal 456 coincide, an output signal will be impressed on output terminal 550.

Referring now to the negative half cycle, the negative half wave is impressed on terminal 506 and thereby impressing the signal on a light emitting diode 562 through diode 564 and resistors 566, 568. A return path is provided through the conductor 520. Again, suitable filter elements such as capacitors 570, 572 have been provided as diode 574 to limit the reverse voltage fed to the light emitting diode 562. When light emitting diode 562 is energized, a normally non-conductive phototransistor 576 is energized to provide a ground input signal to one input terminal of an and gate 578. The other input terminal of gate 578 is connected to the address terminal 556 by means of the conductor 560. Again, the gate 578 is connected to an output terminal 580 through a diode 582. Accordingly, when a negative going pulse is impressed on input terminal 506, the light emitting diode 562 will conduct to provide an output signal at output terminal 580.

The lower half of FIG. 5 includes a circuit which is identical to that described above wherein a pair of input terminals 582, 584 are fed an alternating current input signal. The terminal 582 is utilized to control the conduction of a light emitting diode 586, the return path for the diode 586 being formed by a conductor 588 and a conductor 590 connected to the terminal 504. The light emitting diode controls the conduction of a phototransistor 591, the conductive condition of which controls the state of an and gate 592. The gate 592 also includes the address input signal from terminal 556 by means of the conductor 560. In the event the signal condition existing at terminal 582 and 556 is proper, an output signal will be provided to output terminal 593.

The lower half of the circuit is identical with that described in conjunction with terminal 506 wherein a negative going signal is fed to terminal 584. This signal causes a light emitting diode 594 to become conductive which, in turn, will cause phototransistor 595 to conduct. This conduction will present the proper signal to an and gate 596 which will be combined with the address signal on the conductor 560. This coincidence of a negative going signal at terminal 584 and the proper address signal at terminal 556 will provide an output signal at an output terminal 597.

Each of the terminals 550, 580, 593, 597 are connected back to the computer to signify that certain micro switches, limit switches, etc. have been closed or open depending on the signal which the computer is looking for. In this way, the computer may monitor the welding line and provide certain control functions for the automatic transfer and function performing machines on the line.

Referring now to FIG. 6, there is illustrated a circuit which receives the output from board 111-7070 (described in conjunction with the description of the details of FIGS. 2 and 3) and controls a certain load connected to output terminals 602. The circuit 600 basically converts a digital voltage to an alternating current voltage to control the loads and also provide electrical isolation between the input and output circuit of FIG. 6.

Referring now to the details thereof, a normally logical one signal is fed to an input terminal 604, the signal falling to a logical zero level when it is desired to select the particular module to be described. This signal is inverted by means of an inverter circuit 606 and fed to the input circuit 608 of a first single shot multivibrator 610. The output of single shot multivibrator circuit 610 is fed to a nand gate 612, the second input to the nand gate 612 being fed from a second single shot multivibrator circuit 614. The single shot multivibrator circuit 614 includes an input circuit 616 which is fed a signal from the $\overline{Q}$ output of the single shot multivibrator 610 by means of a conductor 620. The single shot multivibrator circuit 610, and particularly the $\overline{Q}$ output thereof, is normally at a high level and drops to a logical zero level during the period that it is timing out.

The same situation occurs with the lower or second single shot multivibrator circuit 614 with the exception that the output pulses from single shot multivibrator circuit 610 and the single shot multivibrator circuit 614 are offset, one from the other, by one pulse width. Accordingly, it is the positive going edge of the pulse from the single shot multivibrator circuit 610 which triggers the single shot multivibrator circuit 614. Thus, a DC level will be present at the output circuit of nand gate 612 as long as input pulses are provided input terminal 604 due to the complimentary action of the two single shot multivibrator circuits 610, 614. It is to be understood that any logical zero level at an input terminal to nand gate 612 will produce a logical one level signal at the output terminal thereof.

This output signal is fed to the input circuit of a gate 620 by means of a resistor 622. The output circuit of gate 620 is fed to the primary winding of a pulse transformer 624, the upper end of the primary winding of pulse transformer 624 being connected to a source of fifteen volt potential at input terminal 626 by means of a conductor 628 and a resistor 630. The gate 620 also includes input signals from an oscillator circuit 632, and particularly by means of an output conductor 634 and a second output conductor 636 connected thereto. From the following description, it will be seen that conductor 634 normally has a positive DC level impressed thereon while the conductor 636 has a signal level which varies between zero and some positive level.

Referring particularly to the details of the oscillator, it is seen that a capacitor 638 is connected to the source of direct current potential at input terminal 626 through the conductor 628 and a resistor 640. The charge on cpacitor 638 causes the voltage level of the emitter electrode of a unijunction transistor 642 to rise until such time as the unijunction transistor 642 breaks over. This causes a base one to base two conductive path to be created in unijunction transistor 642 which, in turn, creates a voltage differential across a resistor 644. This voltage differential is fed to a normally non-conductive transistor 646 to cause the transistor 646 to conduct.

A DC level is fed to the input circuit of the nand gate 620 by means of the conductor 634. The collector electrode of transistor 646 is connected to the conductor 636 by means of a conductor 652 and an inverter circuit 654. Thus, the signal level on conductor 636 will follow the signal level at the upper end of resistor 644. Accordingly, an oscillating signal will be impressed on conductor 636.

Returning to the input circuit to gate 620, it will be seen that a relatively level DC potential is fed to the input conductor 656 as long as the pulses are fed to input terminal 604. As was described above, a constant DC level is impressed on conductor 634 which enables the gate 620. Accordingly, the voltage swings due to the oscillator circuit 632, as impressed on conductor 636, will be fed through gate 620, it being remembered that when gate 620 is provided all logical one input signals, the output thereof will drop to a logical zero level.

Accordingly, these pulses at the output of gate 620 are fed through the pulse transformer to energize the gate electrode of a triac circuit 658, the triac circuirt 658 controlling the flow of current between a pair of output conductor 660, 662. Thus, any load connected to output terminals 664, 666 will be controlled by the conduction of triac 658.

A similar condition exists in connection with the next module wherein an input pulse is fed to an input terminal 668. This pulse controls a pair of single shot miltivibrator circuits 670, 672 which operate in identical manner to the operation described in conjunction with single shot multivibrator circuits 610 and 614. With pulses impressed at input terminal 668, a series of logical zero input pulses will be fed to alternate input terminals of nand gate 674 to provide a relatively constant DC level at node 676. Again, the oscillator 632 will provide a pulsating signal on conductor 636. These latter signals are fed to the input circuit of nand gate 678, along with the signal at node 676.

The output of gate 678 is, as was the case above, fed to the primary circuit of a pulse transformer 680, the secondary of which is utilized to control the conductive condition of a triac 682. The triac is utilized to control the flow of current between the terminal 664 and a terminal 684.

In operation, the signal impressed on input terminal 668 will cause the monostable multivibrator circuits 670, 672 to trigger and thereby produce a constant DC voltage at the node 676. The voltage at conductor 650, a constant DC voltage, is fed to the input circuit of gate 678 by means of the conductor 634. Thus, the output of gate 678 will follow the pulses fed to conductor 636 as long as pulses continue to appear on input terminal 668 and with sufficient regularity to cause the trigger circuits 670, 672 to continue producing.

The next two modules operate in identical manner to those described above wherein an input signal on input terminal 684 will provide control of a load connected between terminals 686 and 664 by means of the triac 688. As was the case above, the input pulses on input terminal 684 will provide a suitable bias signal for nand gate 690 which will generate firing pulses for the triac through pulse transformer 692. The lowermost unit also includes an input terminal 694 which biases a nand gate 696 to fire triac 697. The firing of triac 697 controls any load connected to terminal 698.

Referring now to FIG. 7, there is illustrated a transformer type sensing circuit 700 which is utilized to sense certain switch conditions at machines located on the production line and evolve output signals for use by circuit board 111-7069 described above. These signals are then utilized to feed data to the computer relative to the open or closed condition of the various switches. The circuit also provides isolation between the floor and the computer.

Particularly, a plurality of input conductors 702, 704, 706, 708, 710, 712, 714 and 716 are connected to one side of the switch, the condition of which is to be sensed. The other side is connected to a common conductor which is, in turn, connected to input conductor 718. These signals are fed through a plurality of individual pulse transformers 722 to 736, the output of which are connected to a plurality of transistor circuits 740 to 746.

Referring to the particular details of the first transistor circuit 740, it is seen that an input signal fed to the pairs of input conductors 702, 718 or 704, 718 are fed though to the transistor circuit through pulse transformer 722, 724. It will be noted that the pulse transformers 722, 724 are connected such that the transformer 722 will pass a negative pulse while the transformer 724 will pass a positive pulse. This is due to a pair of diodes 748, 750 connected in circuit with the secondary windings of the transformers 722, 724.

Referring first to the negative pulse, the right side of the secondary winding of transformer 722 is connected to a transistor 754 through the diode 748 and a resistor 756. This pulse will cause normally non-conductive transistor 754 to conduct to the feeding of a 24 volt pulse to the base electrode thereof. The transistor 754 is provided with energy through a power transformer 758 which is connected to a source of 115 volt alternating current supply. On the other hand, if the switch connected to terminal 704 is closed, a positive pulse will be fed to second trasistor 760 by means of the diode 750 and a resistor 762. This will cause transistor 760 to conduct.

The conduction of transistor 754, 760 is sensed by a load circuit 766, which in this case is the printed circuit board 111-7069, the load 766 being able to differentiate between a positive going and negative going pulse from transformer 722, 724. The conduction of either transistor 754 or 760 will permit current to flow from transformer 758 through the load 766, through a conductor 768, through a second conductor 770, through the collector-emitter circuit of either transistor 754, 760, depending on which one is conducting, back to the other side of the transformer 758 by means of a conductor 772. Thus, depending on the direction of current flow which is determined by the conductor condition of one or the other of transistors 754, 760, the load circuit 766 will be able to determine which switch was closed, the switches being those connected to conductors 702, 704.

The next three units operate identically with the exception that the load circuit and the connection to the power supply is not shown. However, it is to be understood that the power supply 758 would be connected to a conductor 774 and a conductor 776. Accordingly, if the switch connected to input conductor 706 is closed, the transformer 726 will have alternating current flowing therethrough and a negative pulse will be fed to a transistor 778 through the diode 780. On the other hand, if a positive pulse is fed to a transistor 782 by means of the diode 784, the normally non-conductive transistor 782 will conduct. Depending on which transistor is conductive, current will flow in one direction or the other through conductor 774 connected to the particular load on board 111-7069.

The units 744, 746 operate identically in that the direction of current flowing through a conductor 786 is controlled by the conductive condition of a pair of transistors 788, 790. Again, the conductive condition of transistor 788 is controlled by current flowing through transformer 730 and the conductive condition of transistor 790 is controlled by current flowing through the transformer 732. The last unit 746 includes an output conductor 792, the current through which is controlled by means of a pair of transistors 794, 796, depending on which transformer 734, 736 is conducting current.

Referring now to FIGS. 8 and 9 there is illustrated the valve and weld input-output circuits, designated PC Board 111-7067, which are utilized to isolate the input signals from the welding floor to the computer and also provides a voltage level change from the twenty-four volts present at the floor to the five volt signal level utilized by the logic of the system. The circuit basically indicates whether the first or second pilot button has been acutated by the operator, these signals appearing at different output points on the circuit.

Referring specifically to FIG. 8, there is illustrated a portion 800 of the valve and weld input-output circuit which is provided with an input signal at input terminal 802, the input signal taking the form of an alternating current signal having a positive and a negative half wave depending on which button has been actuated by the operator. For example, if pilot number one is actuated, a positive half wave signal would appear at input terminal 802. On the other hand, if pilot button number two is pushed, a negative half wave will appear at input terminal 802. Assuming for example, that a positive signal appears, thus signifying the actuation of button number one, the positive half wave will be fed through a diode 804 and a resistor 806 to a parallel circuit 810 which includes a filter capacitor 812, a resistor 814, a parallel diode 816, and a light emitting diode 820. The diode 816 shunts any negative going pulse from the light emitting diode 820 to insure that the back voltage across the diode 820 does not become excessive. Current flowing through the light emitting diode 820 causes the diode to generate light energy which is transmitted to a phototransistor 822 to cause the phototransistor to conduct in response to that emitted light. Current is returned to a system ground terminal 824 by means of a conductor 826, the ground 824 being a common ground for both the positive and negative half wave circuits.

The emission of energy from the light emitting diode 820 is fed to a phototransistor 830 as is common in the art, the emitter electrode 832 of the phototransistor 830 being connected to ground potential by means of a connection 834. The collector electrode 836 is connected to a source of five volt potential at input terminal 838 by means of a conductor 840 and a resistor 842. Accordingly, when the phototransistor 830 is in the non-conductive state, the collector electrode 836 will rise to the five volt potential present at input terminal 838. On the other hand, when the transistor 830 is caused to conduct, the collector electrode 836 will drop to a potential very nearly the potential at ground conductor 834 except for the collector to emitter drop.

This collector potential at electrode 836 is fed to an output and gate 846, the output of the gate 846 being fed to an output terminal 848 which is interconnected with the interface circuit to be described in conjunction with FIGS. 21 to 40. The gate 846 also includes an input from an input terminal 850 which is interconnected with the interface to be described hereinafter. The signal fed to input terminal 850 includes a signal designated "input" to signify that the system is feeding a signal to the input of the interface unit. Also, the signal at input terminal 850 includes a specific address to energize the portion of the circuit of FIG. 8 described above. When this signal appears at input terminal 850, the gate 846 is enabled to provide an output signal to terminal 848 from the transistor 830.

The negative half cycle signifying that button two has been actuated is fed from the input terminal 802 to a second light emitting diode 856 by means of a conductor 858, a diode 860, and a pair of resistors 862, 864. It will be noted that the circuit to be described for the negative half cycle is substantially identical to that described in conjunction with the description of the positive half cycle. Accordingly, a protective diode 868 is provided to insure that the voltage levels do not exceed a voltage level tolerable by light emitting diode 856. Also, a filter capacitor 870 is provided.

The geneation of the negative half cycle causes the light emitting diode 856 to be illuminated, illumination being transmitted to a phototransistor 872, the emitter electrode thereof 874 being connected to the common ground 834 and the collector electrode 876 thereof being connected to the source of five volt potential at terminal 838 by means of a conductor 878 and a conductor 880. The source of potential at conductor 878 is grounded in an alternating current sense by means of a pair of capacitors 882, 884. When the light emitting diode is energized, the transistor 872 is caused to conduct to provide a low signal at one input terminal at a nand gate 884, the output terminal thereof being connected to an output terminal 886 by means of a diode 888. Thus, when the transistor 872 is caused to conduct, a signal is fed to the gate 884 which will cause the gate 884 to provide an output signal at terminal 886 if the proper signal is present at an input terminal 890 corresponding to the terminal 850. However, the terminal 890 is provided with a different address signal to that fed to the terminal 850. The address signal is peculiar to the circuit described in conjunction with the lower half of the circuit and particularly to the negative half cycle.

Thus, if the button one or button two is energized, a corresponding signal will be provided at output terminals 888 or 886 depending on which button has been depressed. The computer controls the feeding of the signal by means of the signals fed at input terminals 850 or 890.

Referring now to FIG. 9 which corresponds to the lower half of circuit board 111-7067, the upper half of which was described in conjunction with FIG. 8, there is illustrated a circuit for generating an output signal corresponding to the weld cycle signal, hereinafter referred to as the MSQ signal, and an initiate the weld signal, hereinafter referred to as the ITW signal. The MSQ signal is present when it is desired to go through the weld cycle and the MSQ signal is present for all portions of the weld cycle including, at least, squeeze, weld, hold, and off. The MSQ signal is utilized to control the operation of the air valve and also to control a module on the floor similar to the weld triac module, the control module to be described hereinafter. The ITW signal is the actual weld signal which comprises two pulses, the first pulse being the start weld signal and the second pulse being the stop weld signal. Thus, unless the MSQ signal is present and the start weld signal has been sensed, the machine being controlled on the floor will not initiate the weld portion of the cycle. Also, the circuit of FIG. 9 is utilized to isolate the computer from the floor and to provide a voltage conversion from computer voltage to floor voltage.

Referring now to the details of FIG. 9, there is illustrated first and second pulse stretcher circuits 900, 902 which are utilized to increase the duration of the MSQ input pulse at input terminal 904 and the ITW input pulse at input terminal 906. The computer generates both the MSQ and the ITW pulses, these pulses being of insufficient duration to drive the long transmission lines to the floor. The system is supplied with a positive five volt potential at conductor 880, the potential at conductor 880 being connected to ground at a conductor 910 by means of a pair of voltage divider resistors 912, 914. Thus, current flowing through the resistors 912, 914 will create a potential at node 916, this potential being utilized to provide a fixed bias for pulse stretcher circuits 900, 902.

Referring first to the MSQ circuit, the input terminal 904 is provided with a computer generated MSQ pulse which is fed to the input circuit of an and gate 920, the and gate 920 also including a fixed voltage from the node 916. Accordingly, when the MSQ pulse is present, the output conductor of the gate 912 will feed an MSQ pulse to an input terminal of a second gate 922. The gate 922 is also fed an address signal from an input terminal 924. As with the case of FIG. 8, the signal input to terminal 924 includes an address which is specific to the circuitry to be energized, namely the MSQ circuit, and, in view of the fact that the signal is to generate an output signal from the output circuit, the address signal at terminal 924 is combined with the output terminal signal. The signal level at terminal 924 is fed to the gate 922, the gate 922 forming a part of a single shot multivibrator 926. Thus, the pulse at input terminal 904 is stretched to approximately ten milliseconds, which pulse is sufficient to drive the long transmission line. It will be noted that the single shot multivibrator 926 is of the integrated circuit type and typical connection to that circuit 926 have been illustrated. The output from the single shot multivibrator at output terminal 930 is normally high to back-bias the diode 928. During the time that the pulse is being generated, the output terminal 930 drops low to forward-bias diode 928 to permit current to flow through a resistor 932 and the diode 928.

The MSQ pulse occurs every machine cycle, a machine cycle being that period which is required for the computer to complete one cycle. However, as long as MSQ pulses are received at output terminal 904, the single shot multivibrator 926 will continue to maintain the ten millisecond pulses at the output terminal 930 to permit current to flow through the light emitting diode 928. Thus, during the welding cycle, the MSQ pulses will be continuously present.

The illumination of the light emitting diode 928 causes a phototransistor 936 to conduct, the collector electrode of the transistor 936 being connected to a source of 24 volt potential at input terminal 938 and the emitter electrode thereof being connected to factory ground at conductor 940. The conduction of transistor 936 causes a node 942 to drop in potential to remove the forward-bias from an output transistor 944, the collector electrode of transistor 936 being connected to the base electrode of transistor 944 through a diode 946. The collector electrode of transistor 944 is connected to the terminal 938, the transistor 944 being normally conductive to provide a low output at the MSQ output terminal 948. When the transistor 944 ceases to conduct, the node 950 rises in potential to provide a positive output signal at terminal 948.

As stated above, these pulses will remain at output terminal 948 as long as MSQ input pulses are provided in input terminal 904 for each machine cycle. Thus, it is seen that the input pulses at input terminal 904 are stretched by means of the single shot multivibrator circuit 900, and the stretched pulses are transmitted through the light emitting diode 928-phototransistor 936 combination, this latter combination providing isolation between the computer and the factory floor. The conduction of transistor 936 provides an output signal at terminal 948, the output signal at terminal 948 being 24 volt ten millisecond pulses which is the voltage adapted to be transmitted on the factory floor. Thus, a conversion from the computer voltage of five volts to the floor of 24 volts is accomplished.

The lower half of the circuit of FIG. 9 is substantially identical to that described above in that the ITW pulse is provided at input terminal 906, this pulse being stretched by means of the single shot multivibrator circuit 902. Again, this single shot multivibrator circuit produces output pulses of approximately ten millisecond duration. The operation of the single shot multivibrator circuit causes a light emitting diode phototransistor combination 952 to operate which produces an output pulse at the ITW output terminal 954. It is to be noted that the ITW pulses are different from the MSQ pulses in that the ITW signal comprises two pulses, the first being the weld start signal and the second being the weld stop signal. Again, the circuit of the lower half of FIG. 9 provides isolation between the computer and the floor and provides a voltage conversion from the five volt computer level to 24 volts utilized at the floor.

Specifically, the input signal at terminal 906 is fed to a gate 958, the gate also including an input signal from the anode 916 to provided a fixed signal level for the other input terminal to the gate 958. The weld start ITW pulse is then fed through the gate 958 to a gate 960, the gate 960 also including an input pulse from an address and output input terminal 962. Again, this address signal is peculiar to the circuit being described, and the output portion of the signal signifies that the information being processed is output data.

When proper signal conditions exist at the input terminal to gate 960, the single shot multivobrator circuit 964 will produce an output pulse of a low signal level at output terminal 966. This forward-biases a light emitting diode 968, the anode of the diode being connected to a source of five volt potential at input conductor 970.

The illumination of diode 968 causes a phototransistor 972 to conduct, the collector electrode of phototransistor 972 being connected to the source of 24 volt potential at terminal 938 by means of a conductor 974 and a resistor 976. The conduction of transistor 972 causes a normally conductive transistor 980 to become non-conductive, the conduction of transistor 972 removing the base-emitter bias from the transistor 980 by means of a diode 982. As was the case above, the collector electrode of transistor 980 is connected to the source of 24 volt potential at terminal 938 by means of a conductor 984 and a resistor 986. The collector electrode is connected to the output terminal 954 by means of a diode 990, the diode being forward-biased to conduct current from the factory ground at conductor 940 and a conductor 992 through a resistor 994, the diode 990, the resistor 986, and the conductor 984. Thus, the output terminal 954 will produce an output pulse of approximately 10 millisecond duration to signify the start of the weld portion of the weld cycle.

On the hand, when the weld cycle is to be stopped, another pulse, the weld stop signal, is impressed on input terminal 906, this signal being fed through the circuit described above in a manner identical to the weld start signal. Again, the single shot multivibrator 964 will produce an output pulse of approximately ten millisecond duration to cause the light emitting diode to illuminate the phototransistor 972. The conduction of the phototransistor 972 will produce a weld stop signal at output terminal 954 by causing the normally conductive transistor 980 to cease conduction.

Referring now to FIG. 10, there is illustrated a free running oscillator circuit which is utilized to control a blinking light indicator circuit to be described in conjunction with FIGS. 11 and 12. In the system of the present invention, the operator of the welding system is capable of entering new data into the computer to change the various timed of certain portions of the welding cycle whether that change be legthening or shortening of the various portions. However, it has been found desirable to provide an indication to the operator when the proposed data to be set into the computer are out of limits for that particular machine. Accordingly, a blink light is provided which will indicate to the operator that the particular welding machine with which he is dealing is not within his capability of changing or that the parameters which he has selected are not within the limits of parameters within which that machine will operate.

Specifically referring to the details of FIG. 10, there is illustrated an oscillator circuit 1000 which is fed a positive 15 volt source of electrical energy from an input conductor 1002. The energy on conductor 1002 is fed to a unijunction transistor circuit 1004, a flip-flop circuit 1006 and an output circuit 1008. Specifically, the energy is fed to a capacitor 1010 to charge the capacitor until the break over or avalanche point of a unijunction transistor 1012 is reached. At this time, the unijunction transistor will conduct between the base one and base two circuits thereof, energy flowing from conductor 1002 through a resistor 1014, the base one, base two electrodes of transistor 1012, and the resistor 1016 to a computer ground conductor 1020. The conduction of unijunction transistor 1012 raises the voltage at a node 1022 to cause an output transistor 1024 to conduct.

The conduction of transistor 1024 causes a signal to be fed to the flip-flop 1006 by means of conductors 1026, 1028. The flip-flop 1006 is of the typical steering network type wherein each pulse produced on conductor 1026 will cause the flip-flop to switch to its opposite state. Thus, if a transistor 1030 is conducting, and transistor 1032 is nonconductive, the first pulse on conductor 1026 will cause transistor 1030 to become non-conductive and transistor 1032 to become conductive. The energy from the fifteen volt source of power at conductor 1002 are fed to the collector electrodes of transistor 1030, 1032 by means of resistors 1040, 1042 respectively. The conductive state of the flip-flop circuit is sensed by means of an output transistor 1048, the base electrode of the transistor 1048 being connected to the collector electrode of transistor 1032 by means of a resistor 1050. Again, the collector circuit of transistor 1048 is connected to the source of fifteen volt potential at conductor 1002 by means of a resistor 1060. Each time the transistor 1048 conducts, a low signal is fed to an output conductor 1064, this signal being fed to FIGS. 11 and 12 to control the blink indicator circuit to be described therein.

Referring now to FIGS. 11 and 12, board 111-7086, there is illustrated a read indicator circuit which is adapted to provide an output signal in response to the entry of data into the computer by a terminal box and the acceptance of that data by the computer. If the data is accepted by the computer, the output light will be illuminated for a preselected period of time and subsequently will turn off after the indicator circuit has timed out. However, as will be explained more specifically in conjunction with FIG. 12, if the computer does not accept the data being entered, the blink light circuit described in conjunction with FIG. 10 will provide a high frequency series of pulses to the indicator lamp to cause the lamp to blink at a rapid rate.

Referring now to the details of FIG. 11, there is illustrated a read-input terminal 1100 which is provided with a read-input signal, the input signal dropping from a logical one to a logical zero level in response to the computer reading the data being entered at the input terminal. This read-data is adapted to set a flip-flop circuit 1102, the output of the flip-flop circuit controlling a timing circuit 1104. The timing circuit 1104 is utilized to control an output circuit 1106 through a second fast timing circuit 1110. The output 1106 is utilized to control the illumination of a lamp connected to an input terminal 1112.

Referring now to the specific details of FIG. 11, it is seen that the read-input signal, which is normally a logical one level and drops to a logical zero in response to entering data into the computer, provides an input signal to an input normally conductive transistor 1114 by means of a diode 1116. The collector electrode of the transistor 1114 is connected to a source of positive potential at input terminal 1118 and also to the base electrode of a transistor 1120 by means of a resistor 1122. The transistor 1120 forms a flip-flop circuit with a second transistor 1122, the collector electrode of transistor 1120 being cross-coupled to the base electrode of transistor 1122 by means of a resistor 1124 and the collector electrode of transistor 1122 being cross-coupled to the base electrode of transistor 1120 by means of a resistor 1126. Thus, the transistor 1120 is normally non-conductive and the transistor 1122 is normally conductive.

In response to the input read signal, the transistor 1114 is caused to become non-conductive, thereby raising the potential of the collector electrode of transistor 1114 to a voltage very nearly equal to the voltage at input terminal 1118. This causes transistor 1120 to become conductive and thus switch the transistor 1122 to the non-conductive state.

The non-conduction of transistor 1122 permits a capacitor 1128 to commence conduction through a path including a conductor 1130 connected to the positive source of potential at terminal 1118, a resistor 1132 and a second resistor 1134. This is due to the fact that the transistor 1122 is normally conductive to present substantially a zero voltage potential across the capacitor 1128. When the flip-flop is switched to its set state, the capacitor 1128 will commence charging. When the capacitor reaches a sufficient charge to cause the voltage at a node 1136 to reach the avalanche potential for a unijunction transistor 1138, the unijunction 1138 will commence conduction. The time constant for the circuit including resistors 1132 and 1134 and capacitor 1128 is set to be approximately four seconds.

Upon the conduction of unijunction transistor 1138, a voltage will be developed across a resistor 1140 to cause a transistor 1142 to commence conduction. The conduction of transistor 1142 pulls the collector electrode thereof down to ground potential at conductor 1144 thereby causing a transistor 1146, which is normally conductive, to become non-conductive. This non-conductive condition of transistor 1146 is fed back to the base electrode of transistor 1122 by means of a diode 1148 and a conductor 1150. The non-conduction of transistor 1146 resets the flip-flop, including transistors 1120 and 1122.

During the time that the flip-flop 1102 is set, the four second time constant of the timing circuit, the conductive condition of transistor 1120 is fed forward by means of a diode 1152 and conductor 1154 to cont the timing of the fast time constant timing circuit 1110 by means of a normally conductive transistor 1158. Thus, when the normally nonconductive transistor 1120 is rendered conductive, the flip-flop is set, this conductive condition is fed forward to the normally conductive transistor 1158 to render the transistor 1158 non-conductive. This signal level on conductor 1154 permits the unijunction transistor 1166 to operate at a high frequency during the four second time unless the blink circuit periodically inhibits the transistor 1166. When the voltage on capacitor 1160 is sufficient to break over a unijunction transistor 1166, the unijunction transistor 1166 will commence conduction to cause a normally non-conductive transistor 1170 to become conductive. This will send a pulse through a pulse transformer 1172, the secondary winding 1174 of which is interconnected with the gate electrode of a controlled rectifier 1178. The anode electrode of the controlled rectifier 1178 is interconnected with a data entry indicator bulb connected to the terminal 1112 described above to cause the illumination of the bulb connected to the terminal 1112.

Reiterating the operation of the circuit of FIG. 11, the read pulse is fed to input terminal 1100 to cause the flip-flop 1102 to be set. Thus, the transistor 1120 will become conductive and the transistor 1122 will become non-conductive. The non-conductive condition of transistor 1122 will cause capacitor 1128 to charge for four seconds until the breakover potential at the unijunction transistor 1138 is reached. The conduction of unijunction transistor 1138 will reset the flip-flop 1102. The timing out of the charging circuit will cause the data entry indicator bulb to be illuminated by the controlled rectifier 1178.

Referring now to FIG. 12, there is illustrated the error portion of the data entry control circuit, the circuit again including a flip-flop circuit 1200 which is utilized to control an output transistor 1202 as will be more fully explained hereinafter. If the operator provides data to the computer, which data is unacceptable due to the fact that certain limits are being fed to the computer which are outside of the capabilities for that particular machine or the operator is trying to control a machine which is not within his jurisdiction, an error signal will be generated by the computer.

This error signal is fed to an input terminal 1204 through the interface circuit. The error signal is then fed to a normally conductive transistor 1206, the normally conductive transistor thus being rendered non-conductive. The collector electrode of transistor 1206 is connected to the source of fifteen volt potential by means of a conductor 1208 through a resistor 1210. Similarly, the emitter electrode of the transistor 1206 is connected to ground potential by means of a conductor 1212. The non-conduction of transistor 1206 is fed to a transistor 1216 by means of a resistor 1218, the transistor 1216 forming half of the flip-flop circuit 1200, the other half being formed by a transistor 1220. The transistor 1216 is normally non-conductive and is rendered conductive by the error signal at input terminal 1204. This sets the flip-flop 1200 and causes the normally conductive transistor 1220 to become non-conductive.

The collector electrode of transistor 1216 is cross-coupled to the base electrode of transistor 1220 by means of a transistor 1222 and the collector electrode of transistor 1220 is cross-coupled to the base electrode of transistor 1216 by means of a conductor 1224.

When the transistor 1216 is normally non-conductive, this will cause transistor 1202 to be continuously conductive due to the fact that the collector electrode of transistor 1216 is coupled to the base electrode of transistor 1202 by means of a diode 1230 and a resistor 1232. However, when the flip-flop 1200 is set, the transistor 1216 becomes normally conductive to cause transistor 1202 to become non-conductive if that were the only influence on transistor 1202. However, it will be noted that the base electrode of transistor 1202 also includes an input from a blink input terminal 1236, the signal level on the terminal 1236 being fed to the base electrode of transistor 1202 by means of a diode 1238 and a resistor 1240.

It will be recalled that the blink circuit connected to transistor 1235 was described in conjunction with the description of FIG. 10. In FIG. 10, there was provided an oscillator circuit which continuously generates pulses which are adapted to be fed to the input terminal 1236. Thus, when the flip-flop 1200 is set, the conductive condition of transistor 1202 is controlled by the blink circuit.

The collector electrode of transistor 1202 is fed to the fast time circuit described in conjunction with FIG. 11 by means of a conductor 1244 through a diode 1246 in FIG. 11. Thus, the blink circuit will control the timing interval of the capacitor 1160 through the blink circuit. In actuality, the blink circuit causes the lower end of resistor 1162 to be pulled down in potential by means of the diode 1246 thereby determining the off time of the timing circuit 1110 described in conjunction with the output of FIG. 11. On the other hand, if the flip-flop 1200 described in conjunction with the error circuit is not set, the signal level on conductor 1244 will enable the read light circuit.

The circuit of FIG. 12 also includes a reset circuit which is utilized to reset the error circuit in response to the entry of new data into the computer. Normally, the operator will sense that erroneous data has been fed to the computer by means of the data entry indicator light signalling an error. The operator will then provide new data for the computer and enter same with key. This will cause the system to be reset to provide a read signal except in the event that the new data provided the computer is also erroneous.

Specifically, the actuation of the data entry key switch supplies a 60 cycle signal on an input terminal 1250, the 60 cycle data being fed through a pulse transformer 1252. The primary side 1254 of the transformer is connected between ground potential at conductor 1256 and the data entry conductor 1258 connected to the terminal 1250 by means of a resistor 1264, a diode 1266, a second resistor 1268, and an input diode 1270.

The output of the transformer 1252, particularly the secondary winding 1272 thereof, is connected to the base electrode of a transistor 1276 by means of a diode 1278 and a resistor 1280. A suitable filter capacitor 1282 has been provided. The transistor 1276 is normally non-conductive, the collector electrode being connected to a source of 24 volt potential at an input terminal 1284 through a resistor 1286 and a conductor 1288. The transistor 1276 is also connected to the base electrode of an output transistor 1290 by means of a resistor 1292.

The collector electrode of transistor 1290 is fed to the base electrode of the transistor 1220 by means of a diode 1294 and a resistor 1296. The pulsing of transistor 1290 to cause transistor 1290 to become non-conductive will thus reset the flip-flop 1200 in response to the entering of new data into the computer.

The system also includes a master reset input terminal 1297 which is connected to a conductor 1298 and a conductor 1299 which is also utilized to reset both the flip-flop 1102 described in conjunction with FIG. 11 and the flip-flop 1200 described in conjunction with FIG. 12 when the system is initially started up.

Referring now to FIG. 13, printed circuit board 111-7074, there is illustrated a circuit 1300 for controlling the jaws of the welding apparatus. Particularly, the circuit includes means for closing and retracting the welding jaws and also includes an emergency stop circuit in the event that an emergency is encountered during the course of a weld. Particularly, the circuit includes a single shot multivibrator 1302 which is adapted to control a flip-flop circuit 1304, the flip-flop 1304 in turn being utilized to control the enabling of an output gate 1306. The signal level from the gate 1306 is fed to an output pulse transformer 1308 which is utilized in turn to control the conductive condition of a triac circuit 1310. The output of the triac circuit 1310 is connected across the necessary solenoids for controlling the open and closed condition of the welding jaws.

Specifically, a source of positive fifteen volt direct current potential is provided at an input terminal 1314, this potential being fed to a common conductor 1316. The condition of the retract button is sensed by a circuit which includes an input terminal 1318, the signal being fed to the circuit upon pushing the retract button. This signal is fed to a light emitting diode 1320 by means of a diode 1322 and a pair of resistors 1324, 1326. A suitable filter capacitor 1328 and a protective diode 1330 is provided. Upon illumination of the diode 1320, a normally non-conductive phototransistor 1334 is caused to conduct, the transistor 1334 being connected to the source of fifteen volt potential at conductor 1316 by means of a resistor 1336.

The conduction of diode 1334 causes a normally conductive transistor 1340 to cease conduction due to the fact that the base-emitter biasing current is removed therefrom by the conduction of the transistor 1334. This momentary non-conduction of transistor 1334 is sent to the input circuit of the single shot multivibrator circuit 1302 to cause the single shot multivibrator circuit to provide a positive going output pulse at output conductor 1334. Suitable filter capacitors 1346, 1348 have been provided as is common in the art.

The output of single shot multivibrator circuit 1302 is fed to the set input terminal of the JK flip-flop circuit 1304. The JK flip-flop circuit also includes an input by means of a terminal 1350 and a conductor 1352 to the J and K input terminals thereof and the reset terminal of the JK flip-flop 1304 is connected to a reset terminal 1356 by means of a conductor 1358 and a diode 1360. In this way, a reset signal generated by the computer may be fed to the JK flip-flop to reset the flip-flop and change the state of the welding jaws.

The output of the JK flip-flop, particularly the Q output terminal, is fed to the gate 1306 by means of a conductor 1362, this output signal also being fed to an output terminal 1364 by means of a conductor 1366.

This signal is fed to the computer to signal the computer that the JK flip-flop is set. The flip-flop 1306 also includes an input signal from the reset terminal 1356 by means of a conductor 1370, a bias input signal from a bias input terminal 1372 by means of a conductor 1374 and an oscillator signal from an oscillator input terminal 1376 by means of a conductor 1378.

Thus, if the flip-flop 1304 is set due to the fact that the button has been pushed, and the necessary biases supplied by means of conductor 1374 and a reset signal is not present on input terminal 1356, the gate 1306 will respond to the signal being fed to the oscillator signal being fed on the input terminal 1376. This will cause the output of the gate 1306 to follow the oscillator signal.

The output of the gate 1306 is fed to the primary winding 1380 of the pulse transformer 1308 by means of a capacitor 1382. The secondary winding 1384 is fed to the gate electrode of triac 1310 by means of a resistor 1386 to cause the triac 1310 to conduct. The conduction of triac 1310 will control the alternating current flowing between output terminals 1390, 1392 and 1394, these output terminals being connected to the necessary solenoids for controlling the jaws of the welding apparatus. Suitable filter capacitors 1396, 1398 have been provided as is common in the art.

Thus, when the retract button is pushed, a signal will be provided at input terminal 1318 to cause light emitting diode 1320 to be illuminated. This will cause phototransistor 1334 to commence conduction which will cause normally conducting transistor 1340 to become non-conductive. This non-conduction of transistor 1340 will provide an input pulse to single shot multivibrator 1302 to create an output setting pulse at conductor 1344. This will set flip-flop 1304 to enable the gate 1306. With signal conditions proper at input terminals 1356, 1376 and 1372 as described above, an output pulse will be produced from the gate 1306 to cause triac 1310 to conduct and control the jaws of the welding apparatus. If the button is pushed a second time, the same situation will occur to cause transistor 1340 to become non-conductive. This will again produce a positive outgoing output pulse from single shot multivibrator 1302 to reset the flip-flop 1304. This resetting of the JK flip-flop 1304 will remove the enabling signal from the gate 1306 to open the jaws of the welding apparatus to the widest point. On the other hand, a resetting pulse at input terminal 1356 could also reset the JK flip-flop 1304 by means of an input pulse being fed to the reset terminal thereof.

Figure 15:
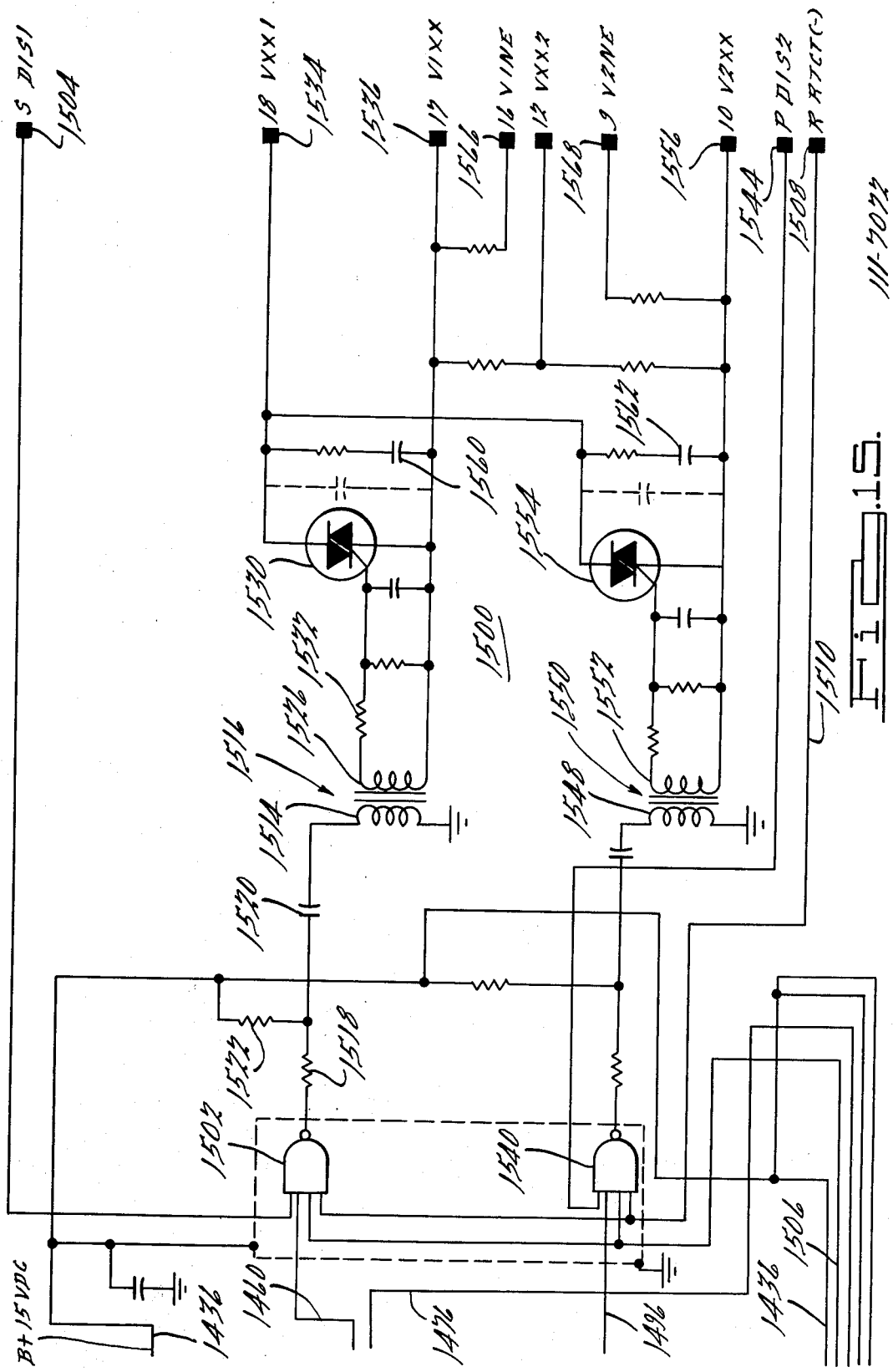
FIG. 15 is a schematic diagram illustrating another portion of the pilot and valve driver circuitry of FIG. 14.
Figure 16:
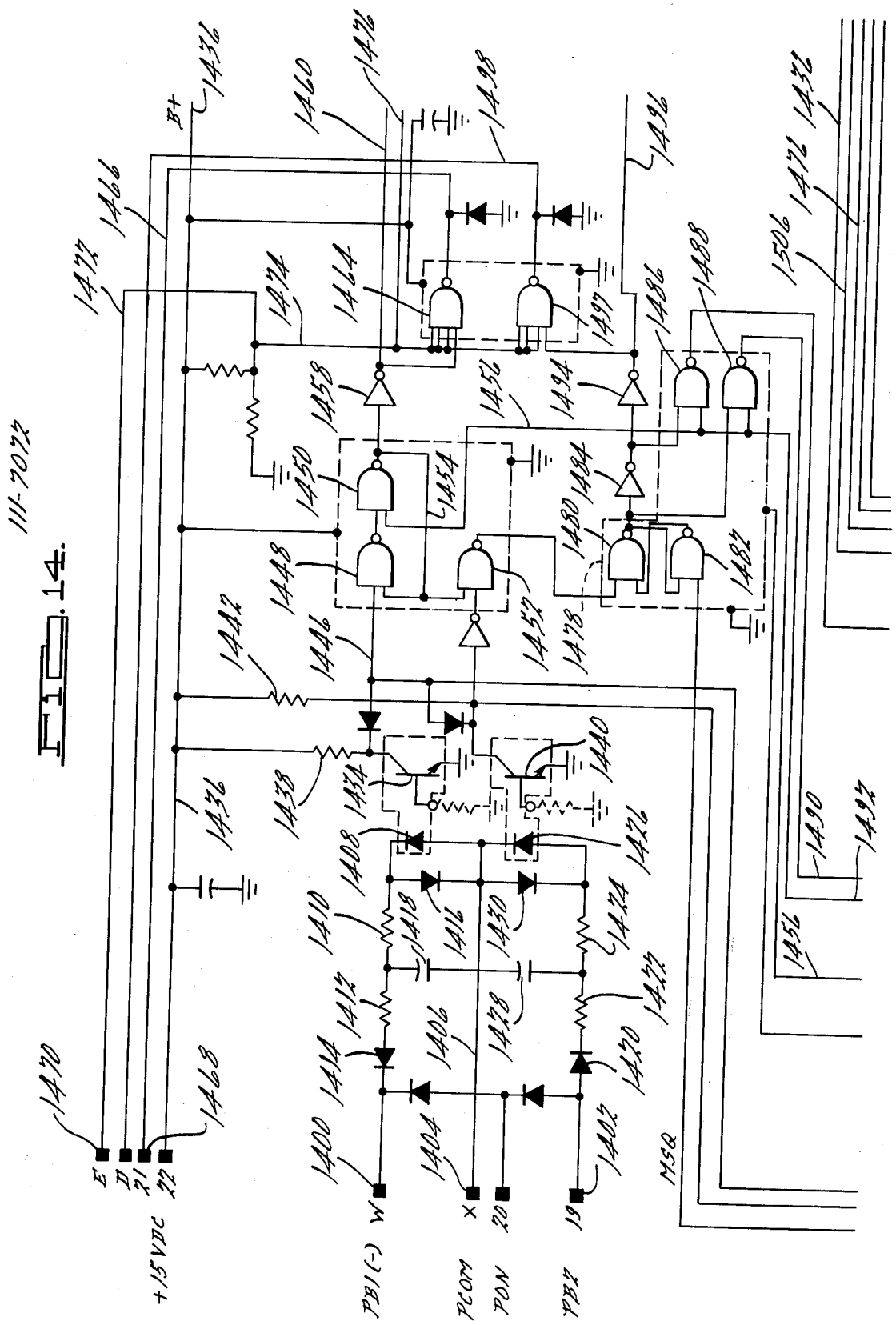
FIG. 16 is a schematic diagram illustrating the remaining portion of the circuitry of FIGS. 14 and 15.

Referring now to FIGS. 14, 15 and 16, printed circuit board 111-7072, there is illustrated the specific details of the pilot and valve driver circuits which includes a dual schedule for the pilot. In describing these circuits, it is to be noted that in the first sequence, the valve number one is controlled and valve number two is off. However, in the second sequence both valves are used wherein valve number two is always on and valve number one is controlled by the system of the present invention. In this way the operator may select one of two pressures for effecting a weld of the work. In controlling the valves, the input signal to the circuit, particularly to the circuit of FIG. 14, takes the form of positive and/or negative pulses wherein the negative pulse indicates that the first pilot is to be used and the positive pulse indicates that the second pilot is to be used. Of course, if both pilots are being used, both positive and negative signals will appear.

Referring particularly to FIG. 14, it is seen that each of the push buttons provide input signals to a first input terminal 1400 for the first pilot and to a second input push button 1402 for the second pilot. Terminal 1404 is connected to a common ground. In the event the first pilot is to be utilized, a negative going wave will be present at input terminal 1400, this signal causing current to flow from terminal 1404 through a conductor 1406, through a light emitting diode 1408, a pair of resistors 1410, 1412 and a diode 1414 to the other terminal 1400. Suitable protective devices such as diode 1416 have been provided and a smoothing capacitor 1418 is also included.

On the other hand, if a positive going pulse is sent, current flows from input terminal 1402, through a diode 1420, a pair of resistors 1422, 1424, and through a light emitting diode 1426 back to the common terminal 1404 through the conductor 1406. Again, a suitable capacitor 1428 and diode 1420 have been provided.

Light emitting diode 1408 is photoelectrically coupled to a phototransistor 1434, the collector of which is connected to a source of fifteen volt potential at conductor 1436 through a resistor 1438. Also, light emitting diode 1426 is photoelectrically coupled to a phototransistor 1440, the collector of transistor 1440 being coupled to the fifteen volt potential by means of a resistor 1442. If transistor 1434 is caused to conduct, a signal will be impressed on a conductor 1446, which signal goes from a high to a zero level, the signal being fed to the input circuit of an and gate 1448. The output of gate 1448 is sent to a gate 1450, the output of gate 1450 being fed back to the input of gate 1448 to latch gate 1448 and 1450 in the state just described to establish the schedule to be utilized.

Also, the output of gate 1450 is fed to the input circuit of a second gate 1452 by means of a conductor 1454. From a description of FIG. 16, it will be seen that the signal level on a conductor 1456 will be high if the valve is enabled. The enabling of the valve indicates the valve button has been pushed and a weld signal (the MSQ signal) is present. This signal is fed to the input circuit of gate 1450 to enable the gate 1450 when those conditions exist. If schedule one is established, the output signal from gate 1450 is set to an inverter gate 1458, this gate providing an output signal on a conductor 1460 which is fed to the circuit to be described in conjunction with FIG. 15.

The output signal level of inverter 1458 is also fed to a lamp drive circuit, including a gate 1464, the output of the gate being impressed on a conductor 1466 and ultimately an output terminal 1468. The terminal 1468 is connected to the indicator lamps to indicate which schedule has been selected. The input circuit of gate 1464 also includes an input from a bias voltage connected to an input terminal 1470 and fed thereto by means of conductors 1472 and 1474. This bias is also fed to the circuit of FIG. 15 by means of a conductor 1476.

Referring now to the schedule two circuit, it is seen that the output of gate 1452 is fed to the input circuit of a flip-flop 1478, the flip-flop circuit including a pair of gates 1480, 1482. The output of the gate 1480 is fed to an inverter circuit 1484, the output of the inverter 1484 being fed to a gate 1486 and the output of the flip-flop 1478 being fed to a gate 1488. The output of gates 1486 and 1488 are fed to the circuit of FIG. 16 and ultimately to the computer as outputs to indicate whether schedule one or schedule two has been selected. These outputs are fed by means of conductors 1490, 1492 from gates 1486, 1488 respectively.

The output from inverter circuit 1484 is also fed to a second inverter circuit 1494 and then to an output conductor 1496 connected to the circuit to be described in conjunction with FIG. 15. The output of inverter 1494 is also fed to a gate 1497, the output of gate 1497 being fed to drive indicator lamps by means of a conductor 1498. As was the case with gate 1464, a suitable bias is provided gate 1497 by means of voltage impressed on conductor 1474.

Accordingly, if either a negative going wave or a positive going wave is fed to input terminals 1400, 1402 respectively, one or the other of the diodes 1408, 1426 will be illuminated. This will cause either transistors 1434 or 1440 to conduct to set either the latch circuit including gate 1448, 1450 or flip-flop 1478, respectively. The setting of either or both gates will provide output signals on the output conductors 1460, 1496 depending on whether schedule one or schedule two has been selected. Suitable lamps will be driven by voltages impressed on output conductors 1466 or 1498. Also, the computer will be provided with information as to which schedule has been selected by the respective voltages impressed on the output conductors of gate 1486, 1488. It will be noted that these latter gates are provided with the direct and inverted output from the schedule two flip-flop which is set by a zero signal output from gate 1452.

Referring now to the details of FIG. 15, there is indicated an output circuit 1500 for controlling the pressure being applied to the weld. As was stated above, the system provides either a schedule one or a schedule two pressure wherein the second valve will modify the pressure being applied to the welding jaws. If schedule one is utilized, only the first valve is controlled. However, if the second schedule is used, then the second valve is always on and the first valve is controlled to modify the pressure.

Specifically, the schedule one output signal impressed on conductor 1460 is fed to the input circuit of an and gate 1502, the gate also including an input signal from an input terminal 1504, which terminal is always maintained at a high level to enable the gate 1502. Gate 1502 also includes an oscillator input derived from input conductor 1506, the signal generated thereon being described in conjunction with FIG. 16. Further, gate 1502 includes an input signal from a retract disable input terminal 1508, this signal being fed to the input circuit of the gate 1502 by means of a conductor 1510. The signal level on conductor 1510 is normally high. However, if it is desired to retract the jaws, thereby relieving valves one and two, the signal level on conductor 1510 will go low to disable the gate 1502.

The output signal level from gate 1502 is fed to the primary winding 1514 of a pulse transfomer 1516 by means of a resistor 1518 and a capacitor 1520. A bias level is maintained by means of a fifteen volt potential impressed on conductor 1436, this voltage being fed to the right side of resistor 1518 by means of a resistor 1522.

The pulse transformer 1516 includes a secondary winding 1526 which is connected to the gate electrode of a triac 1530 by means of a resistor 1532. The triac 1530 is utilized to control the flow of alternating current between output terminals 1534, 1536, the terminals of valve one being connected to these terminals 1534, 1536. Thus, the flow of alternating current through valve one is controlled by means of the conductive condition of triac 1530.

On the other hand, the schedule two signal on conductor 1496 is fed to a second gate 1540, the gate 1540 including substantially the same input as was described in conjunction with gate 1502. Namely, the inputs to gate 1540 are the enabling signal indicating schedule two impressed on conductor 1496, the normally high disabling signal derived from the retract board impressed on conductor 1510 to disable the second valve in the event it is desired to retract the welding jaws, a biasing signal impressed on input terminal 1544 which is correlative to the signal described in conjunction terminal 1504, and the oscillator signal impressed on conductor 1506. Thus, the operative gate 1540 will follow the oscillator signal in the event the proper enabling signals are present at the input to gate 1540.

The output from the gate 1540 is fed to the primary winding 1548 of a pulse transformer 1550, the secondary winding 1552 of which is connected to the gate electrode of a triac 1554. As was the case with triac 1530, triac 1554 controls the voltage between a pair of output terminals, including the terminal 1534 and a terminal 1556. In this way the energization of the second valve is controlled by the signal impressed on conductor 1496 through the pulse transformer 1550 and the triac 1554. As is common in the art, suitable filter capacitors 1560, 1562 are provided and the voltages at terminal 1536 and 1556 are fed to a pair of output terminals 1566 and 1568 respectively.

Referring now to FIG. 16, there is illustrated a valve enabled indicating circuit 1600, an oscillator circuit 1602 and a false weld alarm circuit 1604. The valve enabled circuit 1600 is utilized to provide a valve enabled signal to the output gates 1450, 1486, 1488 described in conjunction with FIG. 14 and also to provide an output enabled signal to the computer. The oscillator circuit 1602 is utilized to provide the oscillating signals for use by the output gates 1502 and 1540 described in conjunction with FIG. 15, and the false weld alarm signal is utilized to control a false weld alarm when a weld override signal is generated. This signal is generated from the heat control board to be described hereinafter in conjunction with the description of FIGS. 17, 18 and 19.

Referring particularly to the valve enabled circuit 1600, there is seen a flip-flop circuit including a pair of gates 1610, 1612 which are cross-coupled to form a flip-flop circuit. The gate 1610 includes an input from the computer by way of an input terminal 1614 which received the MSQ signal to indicate the weld portion of the cycle. This signal is fed to the input signal of a gate 1616 by means of a conductor 1618 and is also fed to the input circuit of the gate 1612 by means of a conductor 1620. Accordingly, except during the off period, the MSQ signal will be at a logical one level, this logical one level signal being fed to the gate 1616.

The gate 1616 also includes an input from a gate 1624, the input circuit of which is fed an input signal from the phototransistors 1434, 1440 by means of a pair of conductors 1630, 1632 respectively. These signals on conductor 1630, 1632 provide an indication to the gate 1624 whether one of the sequences has been selected. The output of gate 1624 is fed to the input circuit of gate 1616 wherein it is ended to provide an output signal at conductor 1638 to indicate that the MSQ signal is present and the pilot button for either the first or second sequence has been actuated.

Accordingly, if the flip-flop circuit, including gate 1610 of 1612, has been set, a logical one output signal will be provided on conductor 1456 for use by the latch including gates 1448, 1450 described in conjunction with FIG. 14. Also, the enabling signal is fed to an output terminal 1640 and the not true side of the flip-flop provides the inverted signal to an output signal 1642. These signals are fed to the computer to indicate the condition of the flip-flop. Also, the schedule one and schedule two selection signals are fed to the exterior circuitry, and particularly through a pair of output terminals 1644, 1646 by means of the conductors 1490, 1492 respectively, these conductors being described in conjunction with the description of FIG. 14.

Referring now to the oscillator circuit 1602, it is seen that a capacitor 1650 is supplied with a positive fifteen volt potential at conductor 1436 through a timing resistor 1652. When the voltage on the capacitor 1650 has reached a sufficient level, a unijunction transistor 1654 will commence conduction to develop a voltage across a resistor 1656. During the conduction of transistor 1654, the capacitor 1650 will discharge. The voltage across resistor 1656 is fed to the base electrode of an output transistor 1658 through a resistor 1660 and a diode 1662.

The conduction of transistor 1658 will provide a logical zero input signal to an inverter gate 1668, the output of the gate 1668 being fed to the input circuit of the gates 1502, 1540 described in conjunction with FIG. 15 by means of a conductor 1506. The output of the oscillator circuit is also fed to an oscillator output terminal 1670 by means of a conductor 1672.

Referring now to the false weld detect circuit, a false weld detect trip signal is fed to an input terminal 1676, the signal originating from the heat control board to be described hereinafter, and dropping from a logical one to a logical zero level when the weld override or false weld condition exists. This signal is fed to the input circuit of an inverter gate 1678, the inverter providing an input signal to an and gate 1680 by means of a conductor 1682. The gate 1680 is utilized to control the output circuit 1604 and includes an input signal from the oscillator circuit 1602 by means of conductor 1684 and includes a bias level signal from the bias conductor 1476 described in conjunction with FIG. 14. Also, the gate 1680 includes a second bias signal from an input terminal 1688. If all signal conditions are correct at the input circuit of the gate 1680, particularly at the weld detect trip signal is present at input terminal 1676, the oscillator circuit 1602 will feed pulses through the gate 1680 to the primary winding 1690 of a pulse transformer 1692. These pulses are fed through a secondary winding 1694 to the gate electrode of a triac 1696, the triac controlling current flow between a pair of output terminals 1697, 1698. The terminals 1697, 1698 are interconnected with an alarm to provide an indication that the weld override or false weld condition has been sensed.

Figure 17:
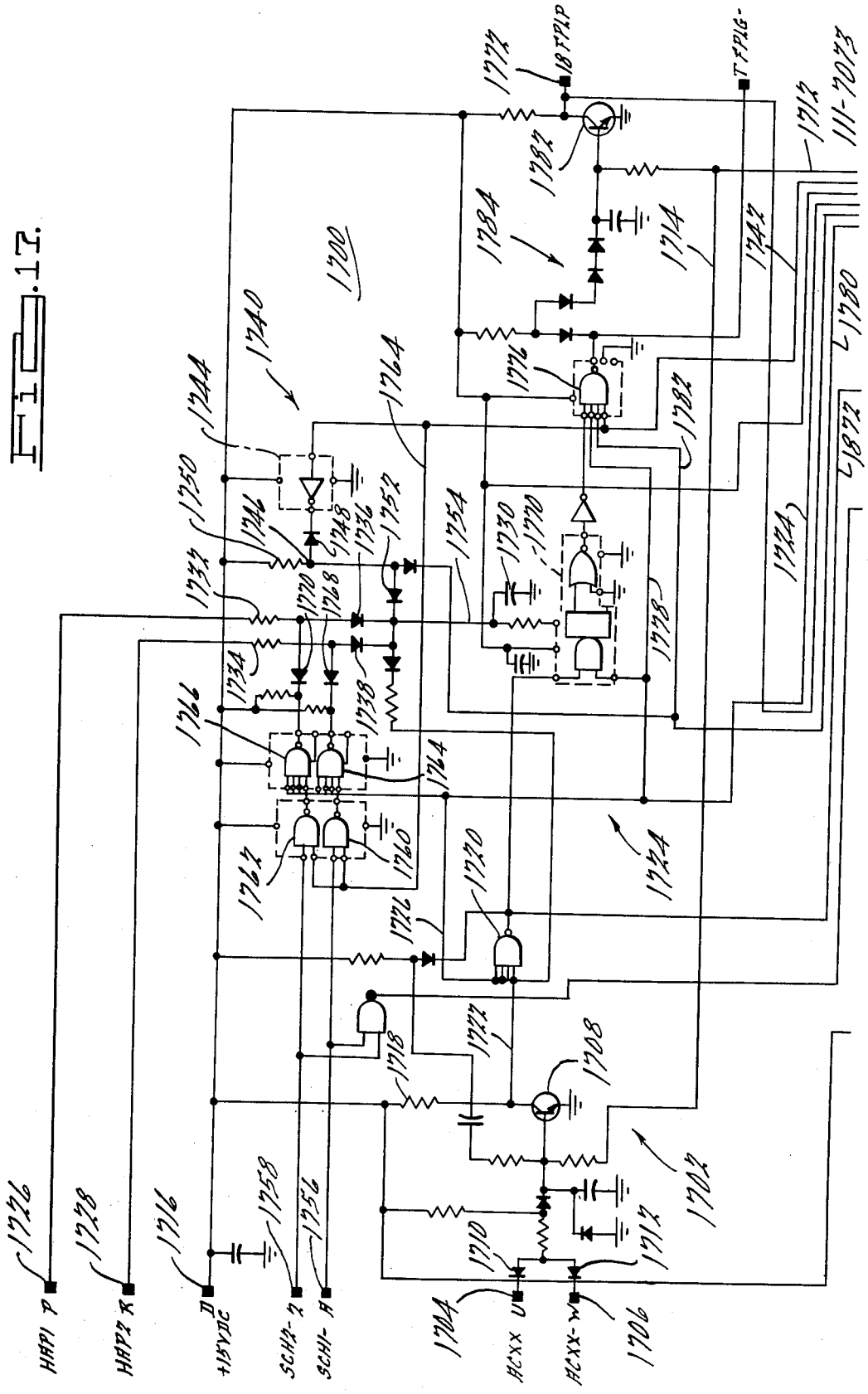
FIG. 17 is a schematic diagram illustrating a portion of the heat control circuit and includes a dual schedule with a false weld and weld override feature.
Figure 18:
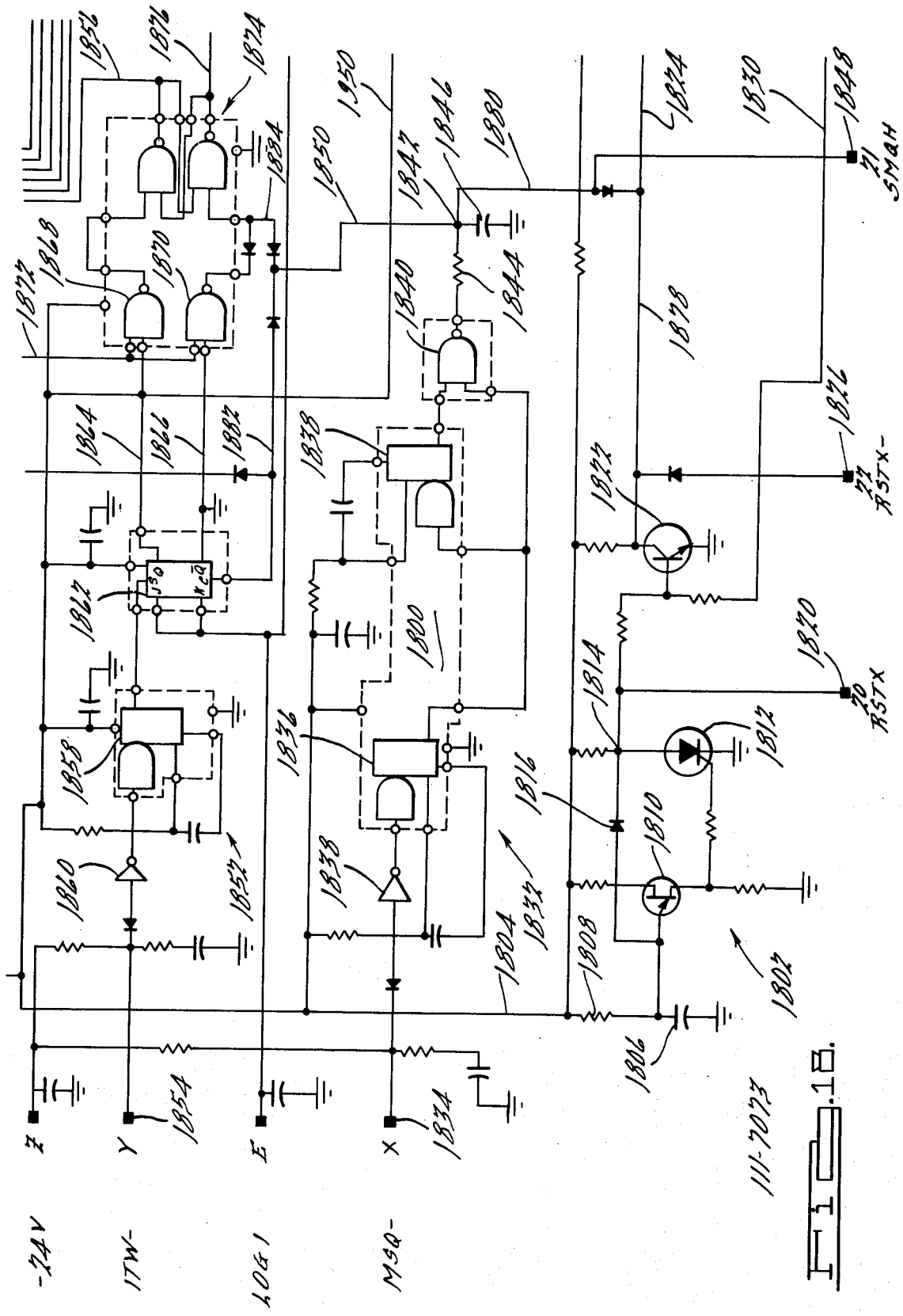
FIG. 18 is a schematic diagram illustrating another portion of the heat control and dual scheduled circuit of FIG. 17.
Figure 19:
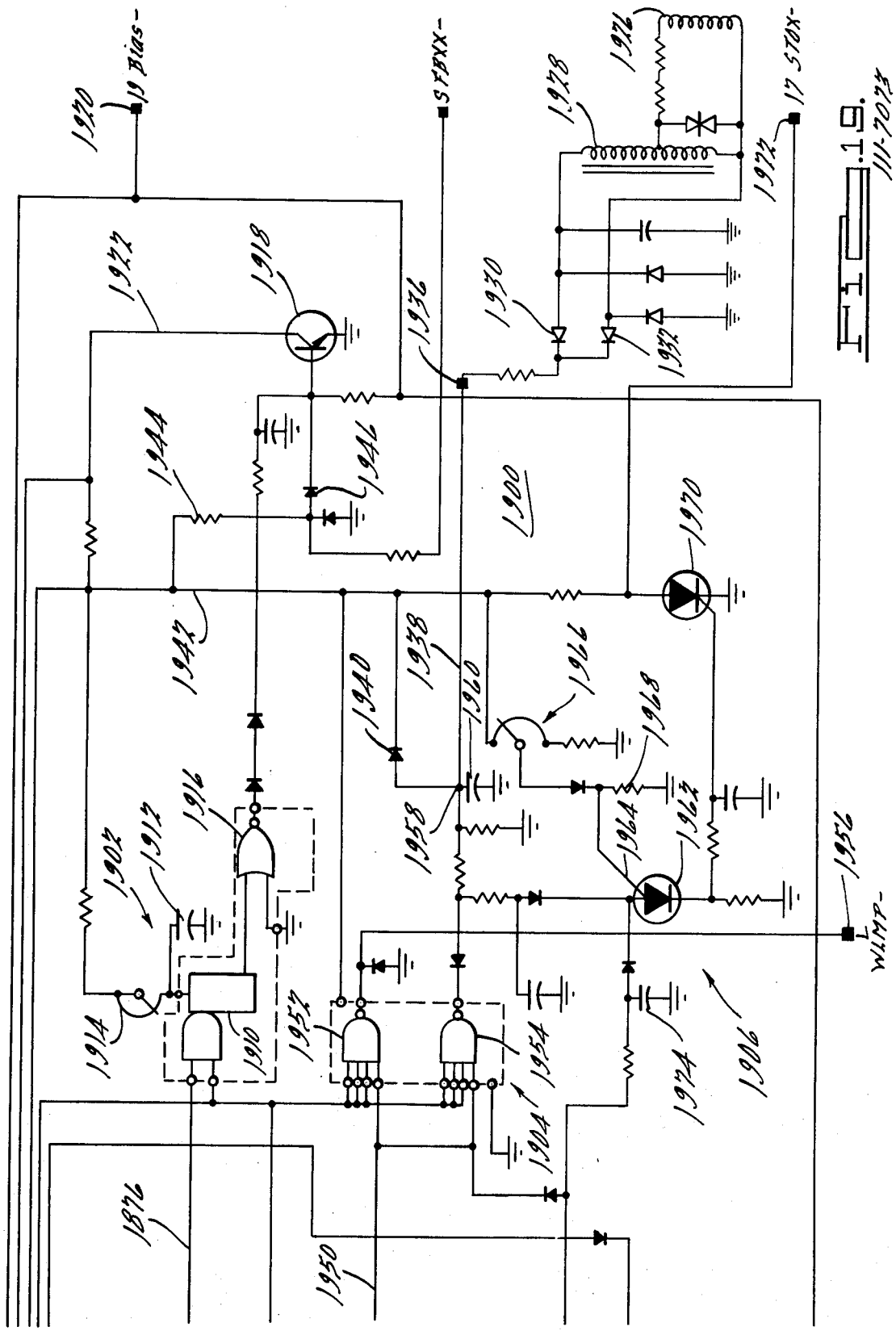
FIG. 19 is a schematic diagram illustrating the remaining portion of the heat control circuit of FIGS. 17 and 18.

Referring now to FIGS. 17, 18 and 19, there is illustrated a control circuit 1700, 1800, 1900 which is utilized to provide heat control for the various welding heads of the system of the present invention. It is to be understood that a heat control circuit such as illustrated in FIGS. 17, 18 and 19 would be provided with each welding machine to be controlled. The circuit of FIGS. 17, 18 and 19 provides, in addition to heat control, a dual schedule for the heat control, the heat control including a twenty to a hundred percent heat adjust. The system also includes a false weld sensing circuit to sense when the system is providing welding current beyond a preselected period after the weld signal has terminated. Also, the circuit includes a weld override circuit which senses the number of weld cycles which have been provided to the load and compares this sensed number of cycles to a preset number of cycles to determine if the welding gun is encountering a runaway condition.

Referring first to FIG. 18, there is illustrated a reset circuit 1802 which is utilized to reset all of the flip-flops and other circuits which must be initialized upon start up of the welding system. Particularly, the circuit is fed a positive fifteen volt potential from a power supply connnected to a conductor 1804. The energy fed to conductor 1804 is utilized to charge a capacitor 1806 through a resistor 1808. The capacitor commences charging and will cause a unijunction transistor 1810 to start conduction when the break over voltage on the capacitor has been achieved. The conduction of unijunction transistor 1810 will cause a silicone controlled rectifier 1812 to conduct, thereby causing a node 1814 to drop to very nearly ground potential. Grounding of the node 1814 will cause capacitor 1806 to discharge immediately through a diode 1816.

The node 1814 is connected to a reset output conductor 1820, the reset conductor being utilized to reset other portions of the circuit where the signal RSTX appears. The node 1814 is also connected to a normally conductive transistor 1822, the conduction of controlled rectifier 1812 causing transistor 1822 to become non-conductive. When the transistor 1822 becomes non-conductive, a reset signal is impressed on conductor 1824. The reset signal is also impressed on a second reset output terminal 1826 to be used by other portions of the system. As will be seen from a description of FIG. 19, the conductor 1830 is connected to a bias potential to bias transistor 1822 to the normally conductive state.

Referring now to the MSQ enabling signal generating circuit 1832, it is seen that the MSQ signal from the computer is fed to an input terminal 1834. The MSQ signal is generated every line frequency cycle and starts at the beginning of the welding sequence, typically squeeze delay, and ends at the end of the welding sequence, typically hold. The MSQ signal is fed to the input circuit of a single shot multivibrator circuit 1836 by means of an inverter circuit 1838. The output of single shot multivibrator 1836, particularly the $\bar{Q}$ output, is fed to the input circuit of a second single shot multivibrator circuit 1838. The multivibrator circuits 1836, 1838 are connected such that the completion of the timing of the multivibrator 1836 will initiate the timing of the multivibrator 1838. The output of the multivibrators 1836, 1838 are fed to the input circuit of a nand gate 1840, the output thereof being fed to a node 1842 through a resistor 1844.

From the foregoing description, it should be noted that the output of gate 1840 is normally low and rises to a high level when either multivibrator circuit 1836 or 1838 is timing out. Thus, a voltage level will be generated at node 1842 during the period that the MSQ signals are received from the computer. A capacitor 1846 is provided to filter out any notches which may be present due to the delay between the end of timing of multivibrator 1836 and the start of timing of multivibrator 1838. The signal level at node 1842 is fed to an output terminal 1848 to be used elsewhere in the system and is also fed to a conductor 1850 to be utilized in conjunction with the ITW circuit to be described below.

An initiate the weld (ITW) circuit 1852 is provided, which circuit takes an ITW signal at input terminal 1854 and transforms the signal into a high level at an output conductor 1856. Specifically, the ITW signal at input terminal 1854 is generated by the computer at the start of the weld portion of the welding sequence and a second signal is generated at the end of the weld portion of the welding sequence. Thus, the ITW signal consists of two pulses which are cycles apart, the n cycles being the weld time.

The ITW signal at input terminal 1854 is fed to a single shot multivibrator circuit 1858 by means of an inverter circuit 1860. The output of single shot multivibrator circuit is fed to a JK flip-flop, particularly the set input thereof, the ITW signal setting the flip-flop 1862. The Q output thereof indicates, when the flip-flop 1862 is set, that the weld signal is present, this signal being impressed on conductor 1864. The $\bar{Q}$ is connected to a not weld conductor 1866, the signal on conductor 1864 being high during the weld interval.

The conductor 1864 is fed to a input circuit of a nand gate 1866 and the signal level on the conductor 1866 is fed to the input circuit of a nand gage 1870. These signals at the inputs to gates 1868, 1870 enable the gates 1868, 1870 during the weld cycle. However, it is desired to synchronize the start of weld with the zero voltage cross-over point of the line frequency. This zero cross-over point is generated in the circuit to be described in conjunction with FIG. 17 and is impressed on input conductor 1872. Thus, when the ITW signal has been generated and fed to gage 1868, the output thereof will go true when the signal level on conductor 1872 indicates that the line frequency has reached the zero voltage cross-over point.

The output of gate 1868 is fed to the input circuit of a flip-flop 1874, the set side thereof being fed to the output conductor 1856 and the reset side being fed to an output conductor 1876.

It will be noted that the collector electrode of transistor 1822 is connected to the JK flip-flop 1862 by means of conductors 1878, 1880, 1850 and a conductor 1882. This causes flip-flop 1862 to be reset at the start up of the system. Also, the reset conductor 1850 is connected to the reset side of flip-flop 1874 by means of a conductor 1884.

Referring now to FIG. 17, and particularly to the line frequency cynchronizing circuit 1702, it is seen that a pair of input terminals 1704, 1706 are connected to a transistor 1708 through a pair of diodes 1710, 1712. The terminals 1704, 1706 are connected to a transformer which is utilized to sense the line frequency and particularly the zero cross-over point. The transformer is connected across terminals 1704, 1706 to produce a balanced condition at the base of transistor 1708 only when the voltage passes through the zero point. Thus, the transistor 1708 is normally conductive and will be momentarily rendered conductive when an exact balance occurs at the terminals 1704, 1706. The transistor 1708 is maintained non-conductive by means of a voltage level impressed on conductor 1712 and a conductor 1714, the bias input being fed to conductor 1712 to be described in conjunction with the description of FIG. 19. The transistor 1708 is provided with a positive fifteen volt potential at input terminal 1716 through a resistor 1718.

The output of transistor 1708 is fed to the input circuit of a nand gate 1720 by means of a conductor 1722.

The gate 1720 also includes a bias level being fed to the input circuit thereof by means of a conductors 1724 and 1726. Thus, when the transistor 1708 momentarily conducts, the output of gate 1720 will rise from low level to a high level at the zero voltage cross-over point. This voltage is fed to the gates 1868, 1870 as described in conjunction with FIG. 18. Thus, the weld signal is synchronized to the line, the zero voltage cross-over point being fed to the weld circuit by means of that gate 1720.

The remaining portion of FIG. 17 and all of FIG. 19 discloses a heat control circuit and a delayed firing circuit which is similar in operation to that disclosed in commonly owned U.S. Pat. No. 3,694,615 and commonly owned co-pending application of George O'-Neal, Ser. No. 58,126, Filed July 24, 1970. The disclosures of this patent and application are incorporated herein by reference and reference is made thereto for a complete description of the operation of the heat control and delayed firing circuit.

Referring particularly to the heat control circuit 1724, it is seen that the percent heat control signal is fed to the heat control circuit 1724 by means of a pair of conductors 1726, 1728. Actually, a potentiometer is connected to each of the terminals 1726, 1728 to permit the operator to set two differenc percent heats for use in connection with either Schedule 1 or Schedule 2. Both of the input terminals 1726, 1728 are connected to a capacitor 1730 through resistors 1732, 1734 respectively and a pair of diodes 1736, 1738, respectively. The potentiometer connected to terminal 1726 combines with the resistance 1732 to provide the resistance portion of the RC timing circuit including capacitor 1730.

As will be seen from a review of the above referenced co-pending application and patent, the percent heat circuit operates to start charging capacitor 1730 from a precharged circuit 1740 to charge the capacitor 1730 between the zero voltage cross-over point described above and the sensing of the zero current cross-over point, which sensing circuit will be described hereinafter. Subsequently, at the zero current cross-over point, the capacitor 1730 is charged from one or other of the circuits including either resistors 1732 or 1734 depending on which schedule has been selected by the operator. Until the description of FIG. 19, it is sufficient to say at this time that the voltage level on a conductor 1742 goes from a positive level to very nearly ground when the zero current cross-over point is sensed. This signal is fed to the input circuit of an inverter circuit 1744, the inverter circuit being connected to a node 1746 by means of a diode 1748. The capacitor 1730 is charged between the zero voltage cross-over point and the zero current cross-over point by a circuit including the fifteen volt potential at input terminal 1716, the resistor 1750, a diode 1752 and a conductor 1754. Thus, the capacitor 1730 will initially be charged to a level which is determined by the phase angle between the voltage and current wave forms.

When the zero current cross-over condition exists, the signal level on conductor 1742 will drop to a very nearly ground potential to ground the node 1746 and stop the charging of capacitor 1730 through resistor 1750. The only remaining charging circuit for capacitor 1730 is either through resistor 1732 or resistor 1734 depending on the sequence which the operator has selected. Referring now to the schedule selecting circuit, it is seen that a Schedule One input signal is fed to an input terminal 1756 and a Schedule Two input is fed to an input terminal 1758. These schedules are selected by the operator and fed to this circuit from printed circuit board 111-7072. The terminals 1756, 1758 are connected to the input circuit of a pair of nand gates 1760, 1762, respectively. The nand gates also include input signals from the conductor 1742 by means of a conductor 1764. Thus, when the voltage level on conductor 1742 drops to zero, the gates 1760, 1762 are enabled and one of the gates will provide an output signal in accordance with the schedule selected by the operator.

The output of gates 1760, 1762 are fed to the input circuit of a pair of nand gates 1764, 1766 respectively, the gates 1764, 1766 also including a bias signal from conductor 1724. The output of gates 1764, 1766 are connected to a pair of diodes 1768, 1770, which diodes are connected to the bottom of resistors 1734, 1732 respectively. Thus, the conductive condition of gates 1764, 1766 control the voltage level at the lower end of resistors 1734, 1732 to shunt current flowing through these latter resistors.

In operation, the transistor 1708 senses when the zero voltage point occurs. This zero voltage point signal is fed to the input circuit of the heat control circuit, particularly a single shot multivibrator circuit 1770. At the zero voltage cross-over point the capacitor 1730 starts the pre-charge portion of the planning cycle, the precharge on capacitor 1730 occuring from a circuit including resistor 1750 and capacitor 1730. When the zero current cross-over point is sensed, the node 1746 is grounded through the circuit 1744 and the capacitor 1730 is charged from a circuit including either input terminal 1726 and resistor 1732 or input terminal 1726 and resistor 1734. The resistance connected to either terminal 1726 or 1728 may be varied to vary the percent heat. The operator selects which circuit is to be utilized by energizing either terminal 1756 or 1758 to ground one or the other of the lower ends of resistors 1732, 1734.

The charge on capacitor 1730 creates a voltage which is fed to the input circuit of single shot multivibrator circuit 1770. The voltage level across capacitor 1730 determines the length of time which will be required for single shot multivibrator circuit 1770 to time out. When the circuit times out, the firing pulse is generated an an output terminal 1772. The output circuit of multivibrator 1770 is fed to the input circuit of a gate 1776, the gate also including a bias level from the conductor 1724 by means of a conductor 1778, the fact that the current has crossed zero as fed thereto by means of a signal level on conductor 1742 and the fact that the weld portion of the cycle has occured as fed thereto by means of a conductor 1780, 1872. The output of gate 1776 is fed to the base electrode of a transistor 1782 by means of a diode circuit 1784, the transistor 1782 being normally conductive and being rendered non-conductive when the firing pulse is to be generated.

Referring now to FIG. 19 and circuit 1900, there is illustrated the delayed firing circuit 1902, the false weld detect circuit 1904 and the weld override circuit 1906.

Referring particularly to the delayed firing circuit, the output of the weld flip-flop 1874 is fed to the input circuit of a single shot multivibrator circuit 1910 by means of the conductor 1876. When the weld signal occurs, the single shot multivibrator circuit 1910 starts timing, the timing of the circuit 1910 being dictated by the charge on a capacitor 1912. The charge on capacitor 1912 is, in turn, controlled by the resistance preset into a potentiometer 1914, the potentiometer forming a portion of the resistance of the RC timing circuit including capacitor 1912. The output of multivibrator 1910 is fed through an or circuit 1916, the output of the or circuit being utilized to control the conductive condition of a zero current cross-over sensing transistor 1918. The transistor 1918 is maintained non-conductive by means of a bias fed at an input terminal 1920. When the single shot multivibrator circuit times out, at approximately eighty seven and a half degrees for the first half wave of the welding cycle, the transistor 1918 will be rendered conductive to ground a conductor 1922. Thus, the zero current cross-over point is determined to be no earlier than the eight-seven and a half degree point for the first half wave, this signal being fed to the circuit of FIG. 17 described above.

For subsequent half waves, a current sensing coil 1926 is connected to sense current flowing through the output buss bars connected to the welding head, the current signal being fed through an auto transformer 1928 and a pair of rectifying diodes 1930, 1932. This signal is fed to the input of a current sensing terminal 1936, the current sensing terminal being connected to the base electrode of transistor 1918 by means of a conductor 1938, a diode 1940, a conductor 1942, a resistor 1944 and a diode 1946. This zero current cross-over point causes transistor 1918 to become conductive and thereby feed a signal to the circuit of FIG. 17 by means of the conductor 1922. The actual sensing of the zero current cross-over point is delayed, for the first half cycle, by the delayed firing circuit 1902.

Referring now to the false weld detector circuit, the false weld detector circuit is used to sense when current is flowing in the load after the weld signal has been terminated. However, the circuit 1904 permits current to flow for a relatively short period after the termination of the weld cycle to permit the transformer and other circuit elements to settle down. The weld signal is fed to the circuit 1904 by means of a conductor 1950, the conductor 1950 being connected to the weld flip-flop 1862 to sense when the weld portion of the cycle is occuring. This signal is fed to the input circuit of a pair of nand gates 1952, 1954, the nand gates 1952 being utilized to energize a lamp circuit connected to an output terminal 1956. The lamp will be illuminated during the period that the weld portion of the cycle occurs.

The gate 1954 is connected to a node 1958, the node being connected to the top plated of a capacitor 1960. The capacitor 1960 is connected, by conductor 1938, to the current sensing circuit, the capacitor 1960 being charged during the period that the current sensing circuit is energized by current flowing through the load busses connected to the welding head.

During the period that the weld is occuring, the gate 1954 will be rendered in such a conductive state as to ground the node 1958. Upon termination of the weld signal, the capacitor 1960 will commence to charge as long as current is flowing in the load busses. If this period becomes excessive, a sufficient voltage will be generated at node 1958 to cause a programmable unijunction transistor 1962 to commence conduction. The gate electrode 1964 of the unijunction transistor 1962 is connected to a potentiometer circuit 1966, the potentiometer circuit being used for a dual purpose in this false weld detector circuit and the weld override circuit. If the voltage on capacitor 1960 exceeds that developed across a resistor 1968, the unijunction transistor 1962 will conduct.

The conduction of transistor 1962 will cause a controlled rectifier 1970 to conduct to thereby provide an output signal an an output terminal 1972. The terminal 1972 is connected to board 111-7072 and is utilized to disconnect the control circuit from its power supply and thereby halt the welding cycle in response to the continuation of current flowing in the welding busses.

The weld override circuit 1906 includes a capacitor 1974, the capacitor 1974 being charged as long as welding cycle portion of the cycle occurs. Thus, the capacitor 1974 will count the number of pulses of weld time which is determined by the duration that the weld flip-flops is in the set condition. This voltage across capacitor 1974 is compared to the voltage developed across resistor 1968, as determined by the setting on potentiometer 1966, by unijunction transistor 1962. If the number of cycles counted by capacitor 1974 exceeds those set by potentiometer 1966, the unijunction transistor will again conjct to cause the controlled rectifier to conduct. This again will cause an output signal to be generated at terminal 1972.

Figure 20:
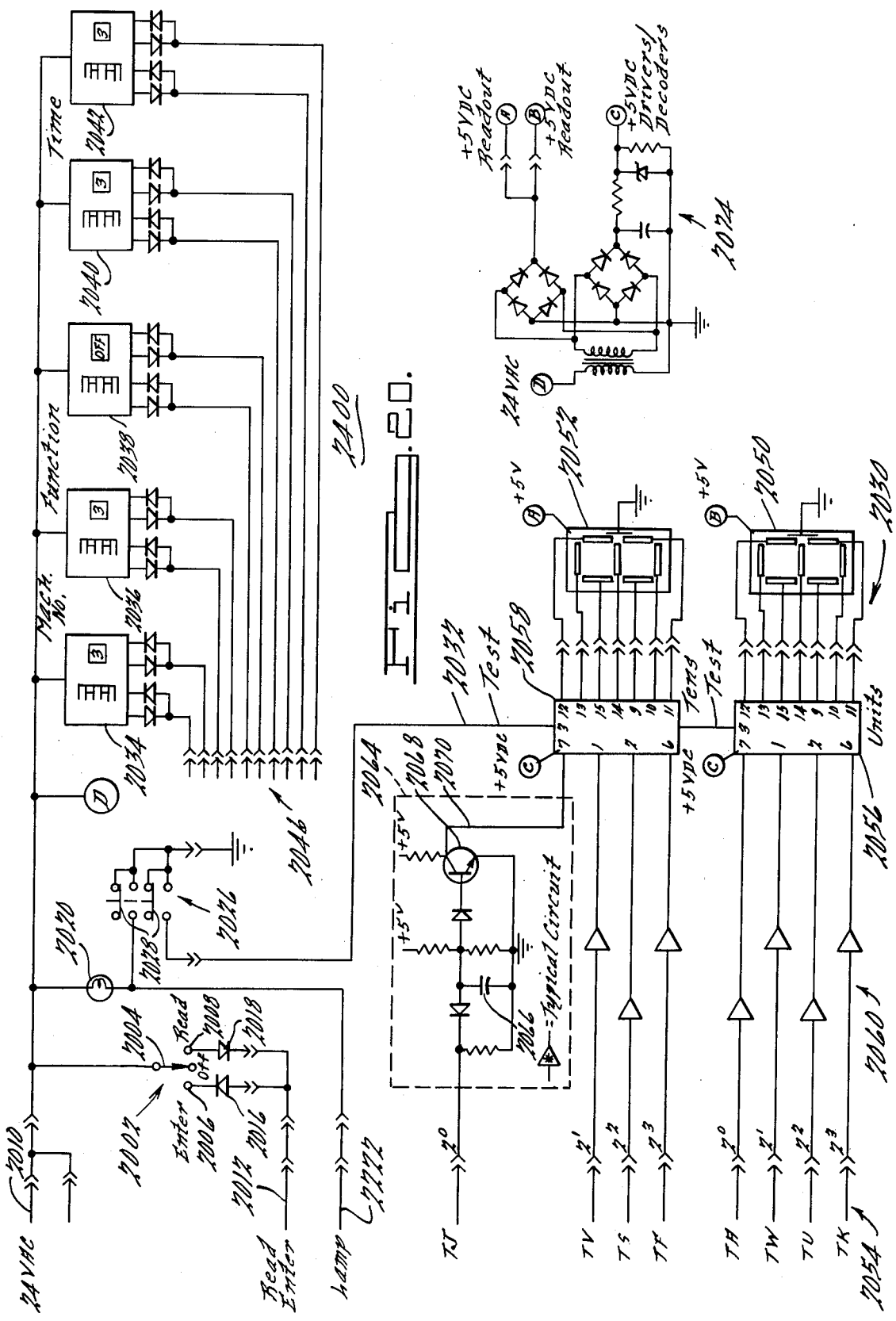
FIG. 20 is a schematic diagram illustrating a data entry circuit with its associated display for use in connection with the data entry terminal.

Referring now to FIG. 20, there is illustrated the circuitry which is utilized to sense the position of the thumb wheel switches for the data entry terminal described in conjunction with FIG. 1. Also, the circuitry of FIG. 20 is utilized to convert the binary coded decimal information derived from FIGS. 2 and 3 to seven segment signals for use in illuminating the two seven bar indicator displays mounted on the terminal box. The thumb wheel switches are utilized to feed data to the computer relative to designating a machine number and changes in the time for a particular machine function if it is desired to change the time for a particular welding function. The seven segment displays are utilized to indicate to the operator the time for a particular function which is stored in the computer when the computer is addressed.

As was described in conjunction with FIG. 1, the data entry terminal 112 includes a plurality of thumb wheel switches, a pair of thumb wheel switches being utilized to designate the machine which the operator is going to relate to the computer. A second thumb wheel switch, the thumb wheel switches being 12 position switches, is utilized to signal the computer which function of the machine in question the operator is addressing the computer, for example, the functions of squeeze, weld, hold and off. The third set of thumb wheel switches, two in number, relate to the number of cycles which the particular function is to time. For example, a weld function may have a duration of twelve cycles. These switches are utilized to change the time for a particular function for a particular machine.

The terminal 112 also includes a key operated switch having three positions, a read position, an off position and an enter position. When the switch is actuated to the enter position, a signal indicative of the positions of the various thumb wheel switches is read by the computer for entry into the memory bank of the computer. Further, when the key is operated to the read position, the computer will feed the time stored in the computer for the particular function and machine indicated in the thumb wheel switches. The terminal box also includes an affirm light which is connected to the circuit of FIGS. 11 and 12, which light is blinked in accordance with whether the computer accepts or rejects the data being entered for a particular machine and function. The data terminal 112 also includes a phone jack for addressing other stations within the factory.

Referring specifically to the details of FIG. 20, it is seen that the enter-read switch 2002 includes the three positions described above wherein a key operated switch element 2004 is capable of being operated to the off position illustrated, the enter position wherein the switch element 2004 is in contact with a terminal 2006 or the read position wherein the switch element 2004 is in contact with a terminal 2008. With the switch 2004 in either position 2006, 2008, a source of 24 volt potential at input conductor 2010 will be fed through the switch to a read and enter output conductor 2012 connected to the printed circuit board 111-7069 described in conjunction with the description of FIGS. 4 and 5.

It will be noted that the position of the switch element 2004, whether it be in contact with terminal 2006 or terminal 2008, will be differentiated by the positive or negative half wave which is fed to output conductor 2012. This is accomplished by means of a pair of diodes 2016, 2018 which are capable of passing only the negative half wave or the positive half wave, respectively. Thus, if the switch is in contact with terminal 2004, the negative half wave will be transmitted between conductors 2010 and 2012. On the other hand, the positive half wave will be conducted through diode 2018.

As was discussed in conjunction with the description of FIGS. 11 and 12, and particularly FIG. 11, the blink control circuit operates a lamp to indicate to the operator whether the data being fed to the computer is acceptable or not acceptable. This lamp is illustrated at 2020, the output conductor 2022 being connected to terminal 1113 described in conjunction with FIG. 11. A test circuit 2026 has been provided for testing the lamp wherein the test circuit includes a switch 2028 which may be closed to ground one end of lamp 2020 and illuminate the lamp on a steady basis. The power portion of the switch 2028 also is connected to a seven bar display assembly 2030 by means of a conductor 2032. When the test switch 2028 is depressed, a signal is provided to the lamp circuit 2030 to illuminate all bars of both seven bar displays. The operation of this circuit will be described hereinafter.

The system includes the five thumb wheel switches 2034, 2036, 2038, 2040 and 2042. The switches 2034 and 2036 are utilized to designate the machine number, the switch 2038 is utilized to designate the functions such as squeeze, weld, hold or off, and the switches 2040, 2042 are utilized to feed the time to the computer. The output of the thumb wheel switches is fed to a plurality of output terminals 2046, which output terminals are connected to the circuit board 111-7069 described in conjunction with FIGS. 4 and 5. Thus, the data applied to the thumb wheel switches 2034 to 2042 is fed to the computer through circuit board 111-7069.

As is stated above, the computer must be capable of feeding data from the computer to the terminal display 112 to indicate to the operator the particular time information which is stored in the computer for a particular machine and function. This data is fed to a plurality of seven bar display lamps 2050, 2052 corresponding to the units and tens digit for the time. The data is fed to the displays 2050, 2052 by means of a plurality of conductors 2054 connected to boards 111-7070 described in conjunction with FIGS. 2 and 3. The input terminals 2054 are connected to a units binary-coded-decimal to seven bar signal converter circuit 2056 and a tens converter circuit 2058 through a plurality of amplifier circuits 2060. The amplifier circuits are illustrated in the block 2064 wherein the input signal is filtered by means of a capacitor 2066 and fed to a transistor 2068 which produces a level voltage at the collector electrode thereof, the collector electrode being connected to a conductor 2070. Thus, the coded information relative to the machine function and time is fed to input conductors 2054 and displayed on seven segment display lamps 2050, 2052.

Figure 21:
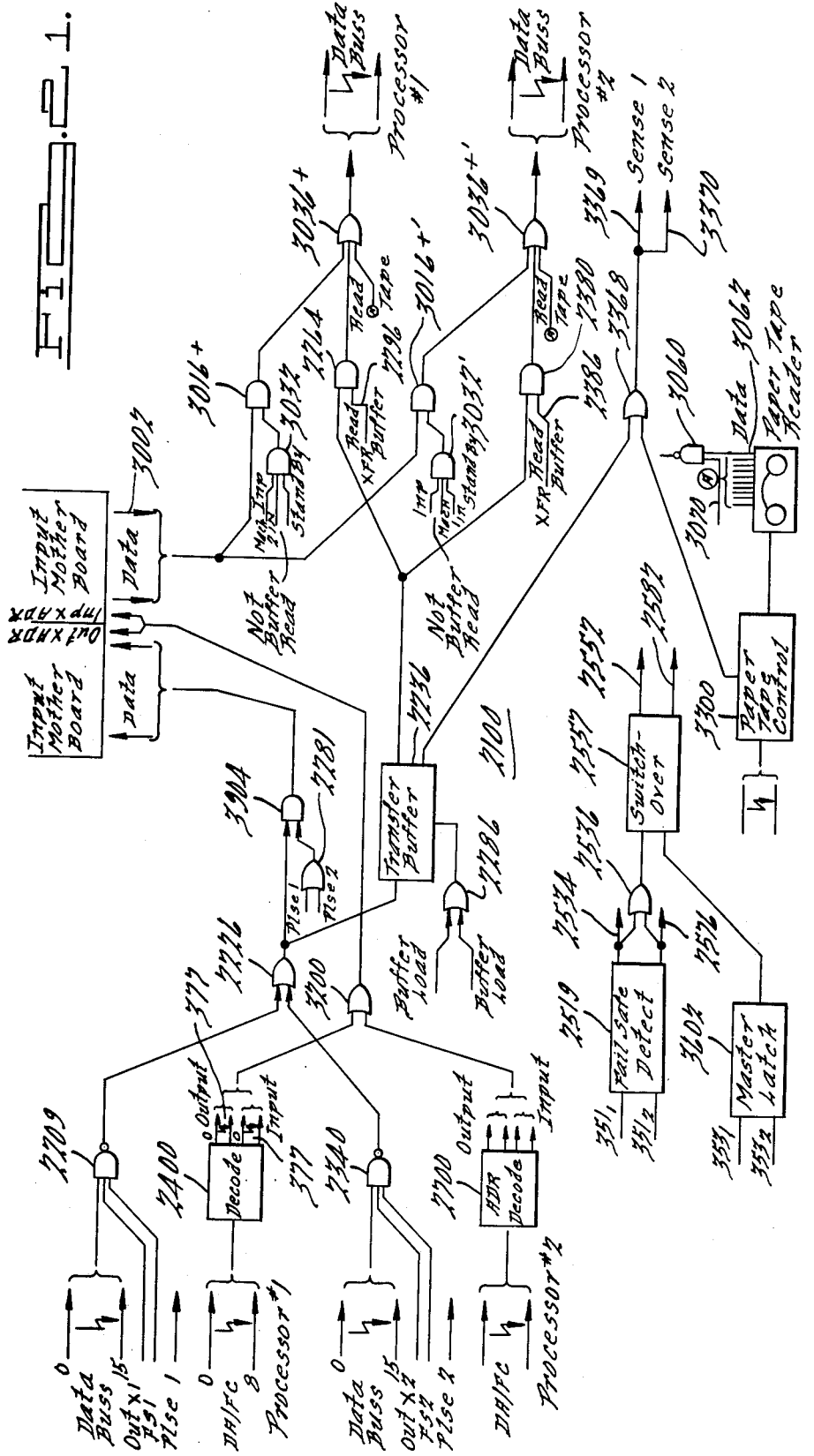
FIG. 21 is a block diagram illustrating certain details of the interface circuit adapted to be interconnected between the floor and the computer utilized in the system, the details of which are illustrated in FIGS. 22 to 40.

The lower right portion of the figures illustrates a typical power supply 2074 which is utilized in conjunction with the circuit described above. The power supply is indicated as being fed from a twenty-four volt source of alternating current, the terminal on the power supply being designated with the letter D. It will be noted that the conductor 2010 is also designated D and it is this conductor from which the power supply 2074 derives the source of power. The output terminals of the output supply are designated with the numerals A, B and C, which outputs are utilized to supply power to the seven bar displays 2052, 2050 and the converter units 2056, 2058. The connections to these units 2052, 2050, 2056, 2058 are indicated by the appropriate letter designations. Referring now to FIG. 21, there is illustrated a block diagram of the interface unit to be described in detail in connection with the description of FIGS. 22 through 40. The reference numerals utilized in the block diagram of FIG. 21 are the reference numerals used in the various detailed schematic diagrams of FIGS. 22 to 40. In connection with these reference numerals, it should be noted that the first two digits of the reference numeral refer to the figure on which the details appear and the diagram of FIG. 21 may be correlated with the specific diagrams of FIGS. 22 through 40 in this manner.

Referring to the details of FIG. 21, it is seen that the data buss from processor number one is fed to the input circuit of an and gate 2209, the and gate 2209 also including an input from an output signal generated within the computer and a fail safe signal which is generated in the fail safe circuit to be described in conjunction with the description of the circuit of block 2519. The fail safe signal indicates that the computer program is operating properly and the output signal indicates that the data to be transferred through the gate 2209 is data which is to be outputted from the computer. The output of gate 2209 is fed to the input circuit of an or gate 2226, the or gate 2226 also including an input from the processor number two data buss through an and gate 2340. The gate 2340 is identical to that described in conjunction with the gate 2209 and includes the data buss input plus the output signal plus a fail safe signal generated by processor number two.

The or gate 2226 provides output data which may be fed to the floor through and gate 3904 to a plurality of output data busses connected to the output mother board. The output mother board is not disclosed in detail in the FIGS. 22 to 44 but is a typical mother board utilized in systems of this type. Thus, the data buss is provided at the floor where the machinery to be controlled and sensed is located. The gate 3409 also includes an input from an or gate 2281 which is fed input signals from the computer designated pulse one and pulse two. These are the clocking signals which are utilized to clock data through the and gate 3904. The pulse signals will be described more in detail in conjunction with the description of FIG. 22.

The output of gate 2226 is also fed to a transfer buffer 2236 which stores and transfers the data being fed from the processor one or processor two. The transfer buffer is controlled in accordance with a buffer load signal generated in processor one or processor two and transferred to the buffer circuit 2236 by means of an or gate 2286. The signal level at the output terminal of gate 2286 will load data from or gate 2226 into the buffer 2236.

Figure 33:
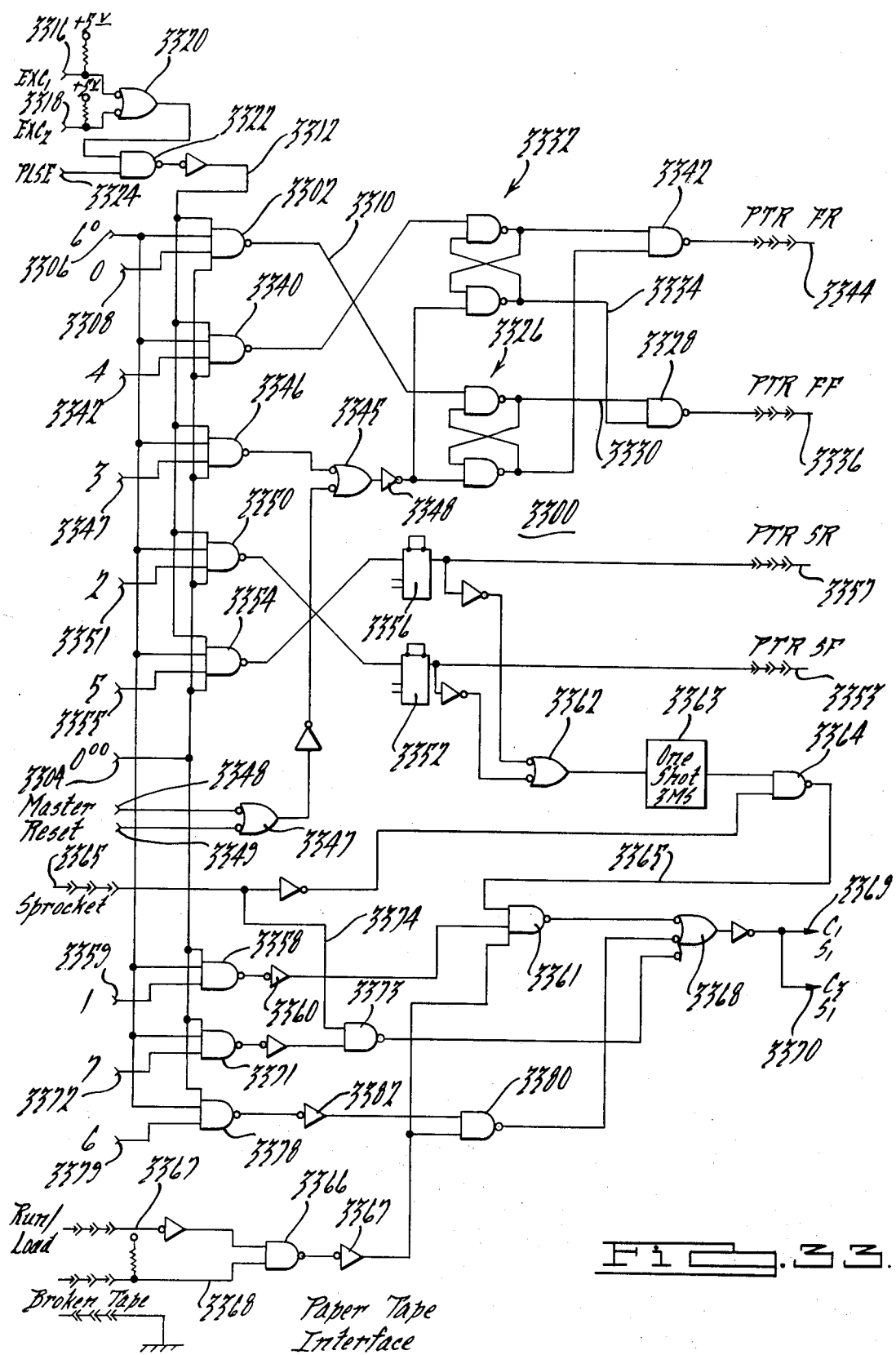
FIG. 33 is a schematic diagram illustrating the details of a paper tape reader interface circuit which is adapted to interconnect the paper tape reader with the computer to provide the computer with data from the paper tape reader.

The transfer buffer provides output data stored in the buffer to a sense one and sense two line 3369, 3370 respectively, these lines to be described in detail in conjunction with the description of FIG. 33. The data is fed through an or gate 3368, the or gate also including input data from the paper tape control 3300. The system also includes a paper tape reader 3062 which provides output data through a nand gate 3060, the nand gate 3060 being controlled in response to a signal on conductor 3070. Thus, data is fed to the sense one, sense two line 3369, 3370 through the or gate 3368 either from the transfer buffer 2236 or from the paper tape unit 3300.

The output of the transfer buffer 2236 is also fed to the input section of processor one and processor two through a pair of nand gates 2264, 2380, the nand gates 2264, 2380 being responsive to read buffer signals on input conductors 2296, 2386. The read buffer signals are generated in the computer by generating an address of 352 to signal the transfer of data stored in the transfer buffer to the data buss of processor one and processor two. The output of gate 3060 is also fed to the input circuit of or gate 3036 through the conductor designated re-tape, the data from the tape being transferred through the or gate 3036 to the processor one in the case of gate 3036.

Gate 3036 also includes input data from the input mother board connected to the floor, the data conductors being designated 3002. The data conductors 3002 are connected to the input circuit of nand gate 3016, plus the other gates associated with gate 3016, the data being transferred therethrough in response to an enabling signal generated by gate 3032. The data 3032 includes input control signals which designate that the processor two is in the standby mode, the system is not reading the buffer, and the fact that the signals are input signals. This enabling signal will transfer the data from the floor to the processor one data buss.

The data from the input mother board is fed to a second nand gate 3016', the output of the gate 3016' being fed to the input circuit of an or gate 3036'. The gates 3016' and 3036' are not shown in detail in the drawings of FIGS. 22 to 40 but it is to be understood that these gates are substantially identical to those to be described in conjunction with the description of gates 3016 and 3036. As was the case with gate 3016, the gate 3016' is enabled in response to processor one being in the standby mode, the fact that the buffer is not being read, and the fact that it is an input signal. These input signals are generated at the input to nand gate 3032', the output thereof being connected to the input of gate 3016' to enable that gate. Gate 3036' also includes an input from the transfer buffer 2236, the data being fed through an and gate 2380 in response to the enabling of the gate 2380 by a read buffer signal generated on conductor 2386.

The processor number two also generates the same data as was generated in conjunction with processor one, this data being fed through gate 2340 to the input circuit of or gate 2226. The data is then transferred through the system as described above. Processor one and processor two also have data address and control signals which are fed to a pair of decode circuits 2400, 2700, the outputs of which are joined at an or gate circuit 3200. The output of the or gate 3200 is fed to the input and output mother boards to feed data and control signals to the floor.

The remaining circuit is the fail safe and master latch circuits which are utilized to switch the processors from processor one to processor two or vice-versa to establish a master processor. The fail safe signal is generated in a fail safe detect circuit 2519, the output of which is fed to a fail safe one output conductor 2534 and a fail safe two output circuit 2576. The fail safe signals are also fed to an or gate 2536 to control a switchover circuit 2557, the output of the switch-over circuit being fed to a pair of output conductors 2552, 2532 corresponding to the control conductors for processor one and processor two respectively. The switch-over circuit is controlled in response to signals generated within a master latch circuit 3602, the master latch circuit being controlled in response to the generation of a 353 address code either in processor one or processor two. In this way the switch-over is accomplished if the fail safe signal indicates that the computer is not operating in a specific manner and the address code 353 is generated by one of the processors.

Figure 22:
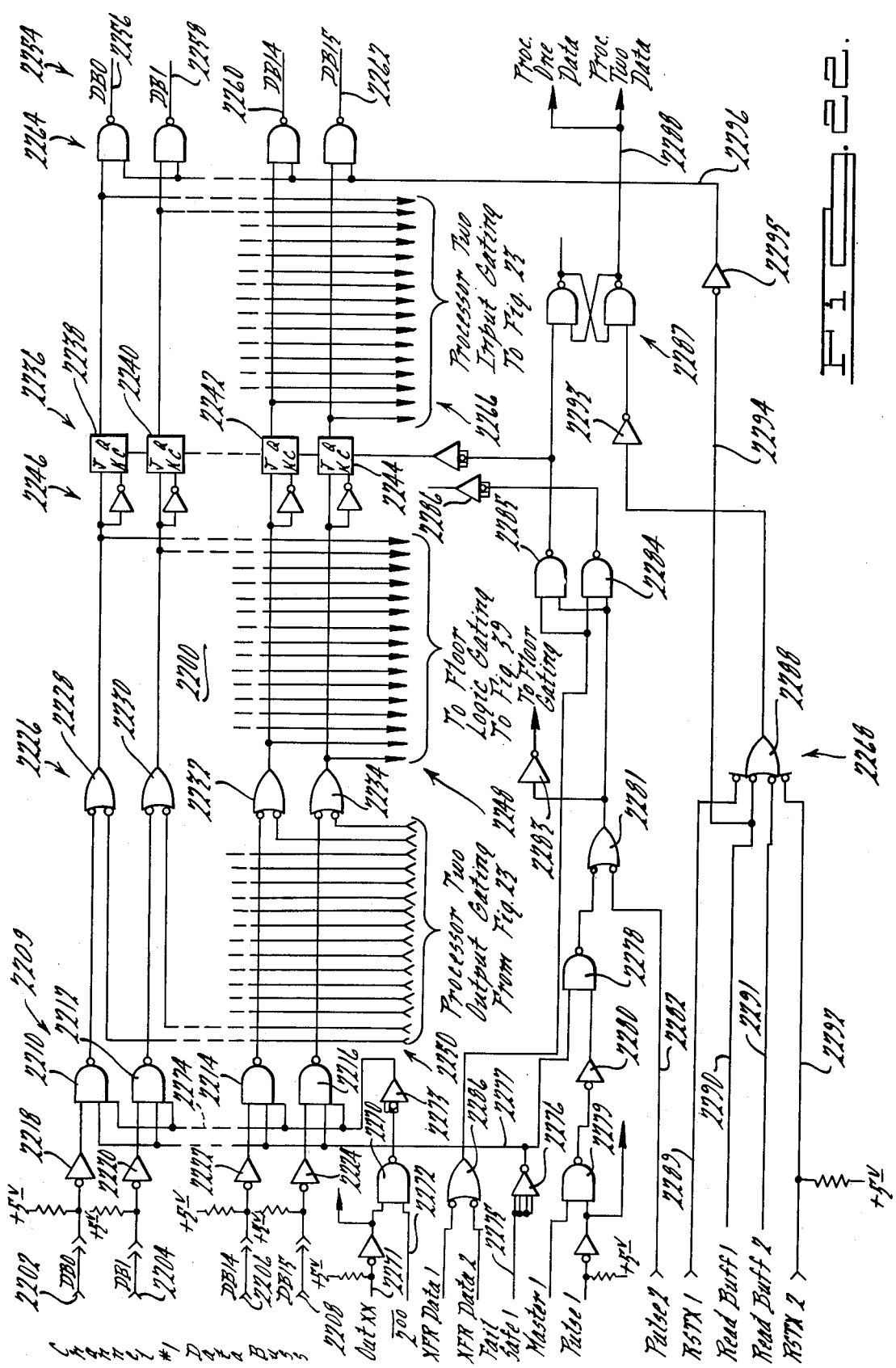
FIG. 22 is a schematic diagram illustrating the input circuit and buffer for processor number one of the interface system.

Referring now to FIG. 22, there is illustrated a circuit 2200 which is utilized to transfer date from the channel one data buss to the processor one input date buss, the processor two input gating circuit and to the floor logic gating circuits from the processor one. Also, the circuit includes means for providing input data from the processor two input gating circuit to input data from processor two to processor one when processor two is collecting that data. The circuit also includes control functions to route the data through the circuit and to insure that certain conditions are present in the system. These conditions will become more apparent from the description of FIG. 22. It will be noted that FIG. 22 has been reduced in the number of elements illustrated in that all of the data busses have not been illustrated. However, it is to be understood that the system further includes data buss 2 (DB2) through data buss 15 (DB15) which are connected in a manner identical to that illustrated in connection with data buss 0 (DB0), data buss 1 (DB1), data buss 14 (DB14), and data buss 15 (DB15). A similar situation exists with the output data busses in that the output circuit also includes data buss 2 (DB2) through data buss 13 (DB13).

Referring to the specific details of the system, it is seen that a plurality of input terminals 2202, 2204, 2206, 2208 are illustrated corresponding to data buss 0, data buss 1, data buss 14, and data buss 15, respectively. These input terminals 2202, 2204, 2206, 2208 are connected to a plurality of nand gates 2210, 2212, 2214, 2216 through a plurality of inverter gates 2218, 2220, 2222, and 2224, respectively. The gates 2210, 2212, 2214 and 2216 also include other input enabling signals which will be described in more detail when the control circuitry at the bottom of FIG. 22 is described.

The output of gates 2210 to 2216 are fed to a plurality of nand gates 2226, which includes a plurality of individual gates 2228, 2230, 2232 and 2234. The output of gates 2226 are fed to a plurality of flip-flop units 2236 which include individual flip-flops 2238, 2240, 2242 and 2244 which are utilized to store the data being fed through gates 2226. It will be noted that the data being fed from gates 2226 are also fed to the K input of the flip-flops 2236, as is common in the art, the inverter gates being indicated by reference numeral 2246. However, before the data is fed to the set of flip-flops 2236, the output data from the gates 2226 are fed to a plurality of output conductors 2248 which are interconnected to the floor logic gating system to be described in conjunction with FIG. 39.

The gates 2226 also include input data from the processor two output gating circuit by means of a plurality of input conductors 2250. Thus, data being stored in the processor two memory may be transferred to processor one for storage therein so that all of the data stored in processor two is also stored in processor one to permit complete interchangeability of the two processors as master units in the event of the failure of one processor. Thus, data in processor two is fed through the gates 2226 to the output conductors 2246 which go to the floor logic gating system on FIG. 9 and also are utilized to set the system of flip-flops 2236.

The output of flip-flops 2236 are fed to the processor one input data buss gating represented by input terminals 2254 and including individual data input conductors 2256, 2258, 2260, 2262 corresponding to data buss 0, data buss 1, data buss 14 and data buss 15. This data is fed through a plurality of nand gates 2264, the nand gates also including an input enabling signal from the read buffer circuit to be described in conjunction with the description of the lower half of FIG. 22. The data set into flip-flops 2236 is also fed to a plurality of output conductors 2266 which are interconnected with the processor two input gating circuit to be described in conjunction with FIG. 23. Thus, data being fed to and from processor one is also available to processor two.

Referring now to the lower half of FIG. 22, there is illustrated a control circuit 2268 which is utilized to control the transfer of data through the upper portion of FIG. 22. Specifically, gates 2210, 2212, 2214, and 2216 include a first input signal from an output gate 2270 which is fed an input signal from the computer by means of a conductor 2271 to indicate that the data is output data. Also, gate 2270 includes an input signal from a 200 address input conductor 2272, this signal being utilized to insure that the process number two is not performing some automation function. As will be seen from a further description of the system, any address which has a 200 series address involves the automation portion of the functions being performed. Thus, if the 200 address signal is not present, the circuit indicates that the processor two is not being utilized for automation.

The signal from gate 2270 is inverted through gate 2273 and fed to the gates 2210, 2212, 2214 and 2216 by means of a conductor 2274. Thus, the gates 2210, 2212, 2214, and 2216 will be enabled in response to the generation of an output signal and a signal indicating the fact that the second processor is not operating on the automation portion of the system.

The gates 2210, 2212, 2214, 2216 also include an input from a fail safe input conductor 2275, which signal is inverted by means of an inverter 2276 and fed to the input circuit of gates 2210, 2212, 2214, 2216 by means of a conductor 2277. Thus, the above referenced gates are also enabled in response to the sensing of a fail safe signal, the fail safe signal to be described in greater detail in conjunction with a description of FIG. 25.

The fail safe signal on conductor 2277 is also fed to the input circuit of a gate 2278, the gate including a second input signal from a master one and pulse gate 2279. The master one signal enables gate 2279 when the processor number one is designated the master and the pulse signals is then fed through the gate 2279, an inverter 2280 to the input circuit of gate 2278. This pulse signal is fed from the output circuit of gate 2278 to the input of an or gate 2218, which also includes an input signal from the pulse two input conductor 2282. These signals are fed to the floor gating circuit by means of an inverter 2283 to gate the floor gating circuit to be described in conjunction with FIG. 39.

The output signal from or gate 2281 is also fed to a pair of and gates 2284, 2285, the and gates also including an input signal from a transfer data one or transfer data two or gate 2286. The input signals to or gate 2286 are fed from the computer to signal the system to transfer the data stored in the flip-flops 2236 in the case of gate 2285 or to transfer the data in the system to be described in conjunction with FIG. 23 in the case of gate 2284. Thus, when the fall safe signal and the master one signal appear at the input terminals, and one of the data signals is present at the input to gate 2286, a pulse signal at the input to gate 2279 will cause data to be transferred to the flip-flops 2236 through the gate 2285. The gate 2284 has an output signal which is inverted by means of an inverter gate 2286 and fed to an output conductor for use elsewhere in the system. The output of gate 2285 is also utilized to set a flip-flop circuit 2287, the reset side of which is connected to an output conductor 2288 to provide a processor one data output signal and a processor two data output signal to be utilized in signalling the receiving processor that there is data to be transferred. For purposes of this disclosure, the suffix or subscript one or two designates the processor with which the signal is associated, i.e., pulse 1 is a clock signal generated in processor one. Processor two also generates a like signal but it is designated pulse 2.

The flip-flop 2287 is reset by means of an or gate 2288, the gate 2288 including four inputs, the first of which is a reset input from the first processor which is connected to the gate by means of a conductor 2289, a read buffer input signal which is connected thereto by means of a conductor 2290, a read buffer two which is connected to the input terminal by means of a conductor 2291 and a reset two which is connected to the input thereof by means of a conductor 2202. The output of gate 2288 is fed to the reset side of flip-flop 2287 through an inverter gate 2293 to reset the flip-flop in response to input signals fed to the or gate 2288. Thus, flip-flop 2287 is reset in response to a reset signal generated in the computer of processor one or processor two and fed to the gate 2288 by means of conductors 2289, 2292 or during the period that the output buffers 2264 are being read or the buffer of processor two is being read. Obviously, it is desired that the data not be transferred during the period that the data is being read. The read buffer conductor 2290 is also connected to the input terminals of and gates 2264 by means of a conductor 2294, an inverter gate 2295 and a conductor 2296. This signal on conductor 2296 is utilized to enable gates 2264 when it is desired to read the data stored in the flip-flops 2236. Thus, when a read buffer one signal is generated on conductor 2290, this signal will enable gates 2264 to transfer data through the gates 2264.

Figure 23:
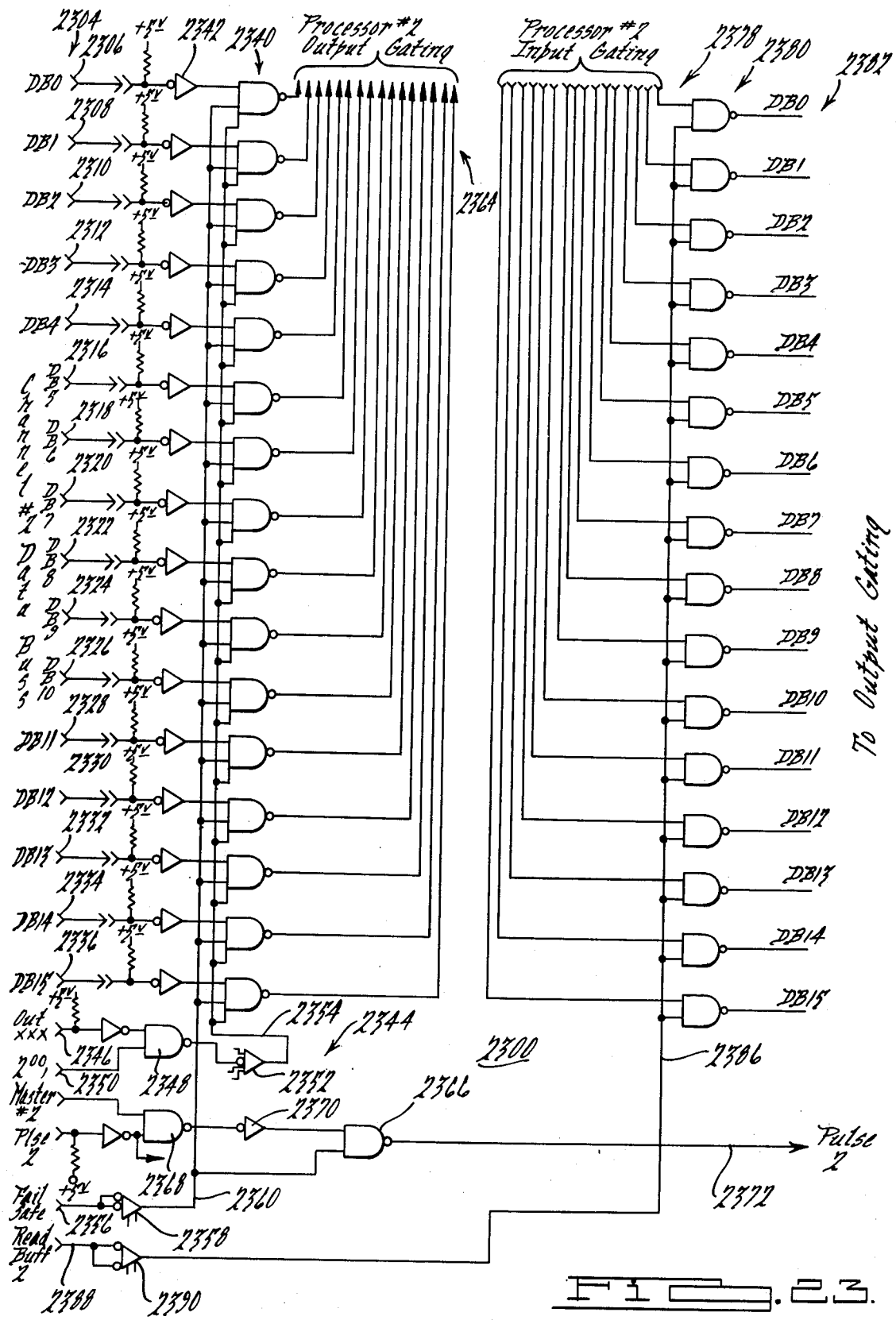
FIG. 23 is a schematic diagram illustrating the input and buffer circuit for the second processor associated with the interface of FIG. 21.

Referring now to FIG. 23, there is illustrated the channel two input buffers and gating system 2300 which is utilized to control the transfer of data from the input data buss to the processor two output gating circuit and also to control the flow of data between processors. Specifically, the circuit of FIG. 23 controls the flow of data from the channel two data buss to the processor two output gating circuit which ultimately feeds data to the floor or the buffer circuits. Also, input data from the circuit of FIG. 22 is fed to the circuit of FIG. 23 to be fed to the input circuit of the processor two computer.

Specifically, a plurality of input terminals 2304 is provided with coded input data corresponding to data buss 0 through data buss 15, designated by reference numerals 2306 to 2336. The data is fed to a plurality of nand gates 2340 through a plurality of inverter gates 2342 which inverts the input signal prior to the signal being fed to the gates 2340. Also, the gates 2340 include enabling input signals from a control circuit 2344.

Referring specifically to the control circuit, an output designating signal is fed to an input terminal 2346 and then fed to a gate 2348. The gate 2348 also includes an input signal from a 200 address input terminal 2350, the presence of a signal on input terminal 2350 indicating that the processor number one is not controlling an automation operation. This is similar to the situation described in conjunction with FIG. 22. The output of gate 2348 is fed to the input circuit of the gates 2340 through an inverter gate 2352 and a conductor 2354.

The gates 2340 also includes an input signal from fail safe terminal 2356, which signal is fed to the gates 2340 by means of an inverter circuit 2358 and a conductor 2360. The fail safe signal is that signal generated in FIG. 25 to be described hereinafter and briefly described in conjunction with the description of FIG. 22. The fail safe signal is generated each machine cycle and indicates that the computer and program is operating in a normal manner. The combination of two signals on conductors 2354 and 2360 will enable gates 2340 to transfer data through the gates 2340. The output data is fed to a plurality of output conductors 2364 which are interconnected with the circuit described in conjunction with FIG. 22.

The fail safe signal is also fed to a pulse two output gate 2366 which is further fed with an input signal from a gate 2368, the gate 2368 being enabled by a signal from the computer designating that the processor number two is the master. Gate 2368 also includes an input signal from the pulse two signal generator in the computer, which signal is generated each machine cycle. The output of gate 2368 is fed to the input circuit of the gate 2366 through an inverter gate 2370. When the fail safe signal is present and the second processor is designated as the master, a pulse two output signal will be generated on a pulse two output conductor 2372. It is the signal on conductor 2372 which is fed to the input circuit designated pulse two on FIG. 22.

The system of FIG. 23 receives processor two data from FIG. 22 by means of input conductors 2378, the data on conductors 2378 being derived from the data being fed to processor one. This data is fed through a plurality of output gates 2380 to output terminal 2382 which are connected directly to the output gating circuit to be described in conjunction with FIG. 30.

The gates 2380 are enabled by means of a read signal generated on a conductor 2386, the read signal being generated by the computer to transfer data from the processor input gating circuit to the output gating circuit connected to the computer. The read signal is generated at an input terminal 2388 and fed to the conductor through an inverter gate 2390. Thus, when the data has been transferred to the buffer units, and is desired to read the data stored in the buffer units, the read buffer two signal will be generated to enable gates 2380.

Figure 24:
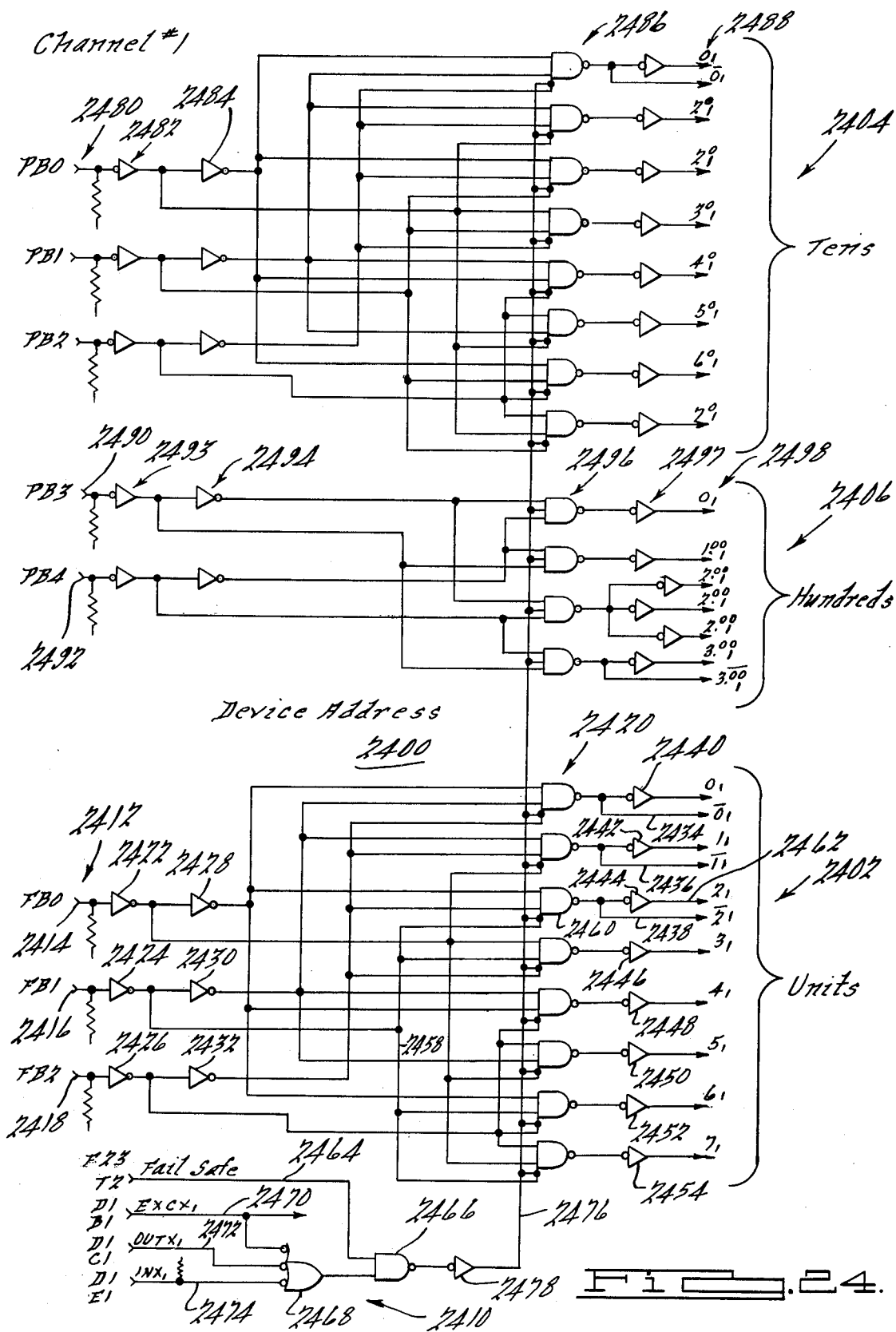
FIG. 24 is a schematic diagram illustrating the function code and device address decode circuits which form a portion of the interface system.

Referring now to FIG. 24, there is illustrated a binary to octal converter circuit 2400 which is utilized to convert binary addresses generated by the computer to octal addresses which are utilized by the external system. Particularly, the system is divided into a units section 2402, a tens section 2404, and a hundredths section 2406. The system is controlled by a plurality of signals, including a fail safe signal, an exclude signal, an output signal and an input signal, which are found in an or circuit 2410.

Referring now to the specific details of the circuit 2400, the computer generates a binary units address on a plurality of input terminals 2412 which include a binary one input terminal 2414, a binary two input terminal 2416 and a binary four input terminal 2418. These signals are fed to a plurality of output gates 2420 through a first group of inverter circuits 2422, 2424, 2426, and a second group of inverter circuit 2428, 2430, 2432. The input terminals 2412, and the gates 2422 to 2432, are connected in a common configuration to provide the octal output through the connections to the output gate 2420. Specifically, input terminal 2412 is connected to all of the gates in group 2420 either directly from the output of inverter 2422 or directly from the output of inverter 2428. The outputs of gate 2420 are fed either directly a plurality of output conductors 2434, 2436, 2438, or through a plurality of inverter circuits 2440, 2442, 2444, 2446, 2448, 2450, 2452 and 2454.

Referring specifically to a particular units address, and assuming that the binary one input terminal 2414 is not energized, the binary two input terminal 2416 is energized and the binary four input 2418 is not energized. It will be seen that the signal from input terminal 2416 will be fed through gate 2424 to the input terminal of a gate 2456 by means of a conductor 2458. The not true input, as generated at the output of inverter 2430, is fed to certain other gates in the system. It will be noted that the remaining inputs to the gate 2450 are from the not true side of the binary one input terminal 2414 and the not true signal from the input terminal 2418. Thus, the gate 2450 will be energized to provide an output of an octal two at an output terminal 2462. This is a common configuration in a binary to octal conversion.

Referring now to the enabling circuit 2410, it is seen that the fail safe signal from FIG. 25 is generated on input conductor 2464 and fed to the input circuit of an and gate 2466. The and gate also includes an input from an or gate 2468, which or gate includes input signals from the exclude input conductor 2470, the output/input conductor 2472, and the input/input conductor 2474. Thus, if the fail safe signal is present on conductor 2464, and one of the signals on conductors 2470, 2472, 2474 is present, the gate 2466 will provide an output signal to an enabling conductor 2476 through an inverter circuit 2478.

A similar situation occurs in the tens section 2404 wherein a plurality of input terminals 2480 is provided a binary one, binary two or binary four tens signal. These signals are fed through inverter gates 2482, 2484 to provide the proper input signals to and gate 2486. As was the case below, the gates 2486 include an enabling signal connection from conductor 2476 to enable the gates 2486 when the proper signal conditions exist at control circuit 2410. The output signals from 2486 are fed to output conductors 2488 to provide the decimal address indicated for the tens section 2404.

Referring now to the hundredths section 2406, a binary one hundred input terminal 2490 and a binary two hundred input terminal 2492 are provided, which signals are fed through inverter circuits 2493, 2494 to output and gate 2496. These signals are fed either directly or through inverter circuit 2497 to a plurality of output terminals 2498. Thus, the hundredths portion of the address is converted from binary to octal configuration in the circuit 2406. It will be noted that the 200 address is provided with a large number of output terminals. This is due to the fact that the 200 address is widely used in this system and requires a large amount of driving current to accommodate the circuits from which it is driven.

Referring now to FIG. 25, there is illustrated the fail safe and manual switch circuit 2500 which is utilized to generated a fail safe signal in response to sensing a particular code being generated within the computer for each machine cycle. This particular code is address 351 and is generated by the computer as long as the program is operating properly. The circuit of FIG. 25 is utilized to sense the code 351 for each machine and an output signal is generated to signal that the program is operating properly for each. Also, an audio signal or visual signal is provided to indicate a healthy condition of the program and a manual switch is included to switch the master from one processor to the other or to place the switch-over operation in the automatic mode of operation.

Specifically, the code 351 for processor one is generated on a group of input terminals 2502, 2504, 2506 corresponding to the units, tens and hundreds digits for the address 351. These codes are fed to the input circuit of an and gate 2510, the coincidence of the three numerals 300, 50 and 1 providing an output signal at the gate 2510. This output signal is inverted by means of an inverter circuit 2512, the output of which is connected to the input circuit of an integrating single shot multivibrator circuit 2516.

Particularly, the signal from gate 2512 is fed to an input and gate 2518 which also includes an input signal from a manual switching circuit 2520. The manual switching circuit includes a three position switch which is adapted to be connected to ground potential at 2522. The three position switch includes a processor two switch element 2524, an automatic switch element 2526, and a processor one switch element 2528. If the selection of a processor has been made manually and the processor two is selected to be tha master, the processor two switch 2524 will be in the position shown which will provide an inhibiting signal to the input circuit 2518. Thus, the signal shot multivibrator circuit 2516 will be disabled when the second processor is selected.

Assuming that processor one is the master, the integrating single shot multivibrator circuit 2516 will produce an output signal at the true side thereof on an output conductor 2530 and an output signal on the not true side at an output conductor 2532. The signal on conductor 2530 is fed to an output conductor 2534 to be utilized as the fail safe signal for the remaining portion of the system. Also, the signal on conductor 2530 is fed to the input circuit of an or gate 2536, which signal is inverted twice by a pair of inverter circuits 2538, 2540 to supply energizing current to a relay coil 2542. The relay coil is energized in response to a fail safe signal occurring on conductor 2530 to indicate that the computer is not operating properly. When the coil of the relay 2542 is energized, a switch 2544 is closed to energize a second relay 2546 which is utilized to control a system of indicator lights.

Referring back to the signal shot multivibrator circuit 2516, the output conductor 2532 is also connected to an output gate 2550 which provides an output signal on an output conductor 2552 in the event that the single shot multivibrator circuit 2516 indicates that the computer is operating properly. However, in order for the signals to appear on conductor 2552, the gate 2550 must be enabled by means of a master one input signal on a conductor 2554. If the processor one has been selected to be the master, the gate 2550 will be enabled by a signal on conductor 2554. The signal level on conductor 2532 is also fed to a ready indicator light 2556 through an inverter circuit 2558, an amplifier circuit 2560 and a resistor 2562. Thus, a further indication of the fail safe condition is generated at lamp 2556.

An identical situation occurs for the second processor wherein a plurality of input terminals 2564 are fed with the same 351 address from processor two. These signals are fed to the input circuit of an and gate 2566, the output signal level of which is inverted by means of an inverter gate 2568. This signal is again fed to the input circuit of an and gate 2570 connected to a single shot multivibrator circuit 2572, the multivibrator circuit 2572 being of the integrating type. Also, the processor one manual switch 2528 is connected to the input circuit of the and gate 2570 to disable the and gate 2570 in the event that the processor one is selected for operation. The output of the true side of single shot multivibrator 2572 is fed to the input circuit of or gate 2536 by means of a conductor 2574. Thus, if either single shot multivibrator 2516 or 2572 indicates that the computer is not operating properly, the output signal at the output circuit of or gate 2536 will be such as to energize the coil 2542 and close the switch 2544. The output signal on conductor 2574 is also fed to a fail safe output conductor 2576 for use by the remaining portions of the system.

The output of the not true side of single shot multivibrator 2572 is fed to an output gate 2578 by means of a conductor 2580. The output gate 2578 will provide an output signal on conductor 2582 if an enabling signal is present at input conductor 2584 to indicate that the second processor has been chosen as a master. This is a situation identical to that described in conjunction with gate 2550. Also, the signal level on conductor 2580 is fed to an indicator light 2586 by means of an inverter circuit 2588, an amplifier 2590, and a resistor 2592. If the signal level is proper on conductor 2580, the indicator light 2586 will be illuminated to provide a further indication of the fact of whether the computer program is operating properly.

Thus, a system has been provided to sense a particular address within both processor one and processor two to provide an indication to the outside system as to whether the program is operating properly. The system is inhibited in response to the selection of the opposite processor as a master.

Referring now to FIG. 26, there is illustrated a circuit 2600 for enabling a digital clock in response to the sensing of a particular address within the computer. In the system chosen, the address selected for enabling the clock is the address 310 for the first digit of the clock, 311 for the second digit of the clock and 320 for the third digit.

Specifically, the system includes a set of input or gates 2602, 2604, 2606 which provide input signals to an and gate 2608. The first or gate 2602 is provided input signals from processor one to indicate that the signal is an input by means of an input terminal 2610. Also, the or gate 2602 includes an input signal from the second processor by means of a terminal 2612 to feed an input signal from the process number two. The second gate 2604 includes the 300 address from both processor one and processor two by means of a pair of input terminals 2618, 2620 respectively. The third or gate 2606 is provided the 10 address of both processor one and processor two by means of input terminals 2622, 2624 respectively.

When either processor one or processor two generates a set of signals which indicate an input signal, the three hundred address and the ten address, a coincidence of signals will occur at the input circuit of and gate 2608 which will provide an output signal from the gate 2608. This output signal is inverted by means of an inverter gate 2626 and fed to the input circuit of a plurality of and gates 2628, 2630, 2632.

The gate 2628 also includes an input signal for the third digit of the address 310 from an input or gate 2640, the or gate including an input signal for the zero units digit from both processor one and processor two by means of input terminal 2642, 2644 respectively. When either of these signals occur, the gate 2628 will be provided with the proper signals to provide an output signal on output terminal 2646 through an inverter circuit 2648. Thus, when the computer generates the address three hundred ten plus the fact that it is an input signal, the output terminal 2646 will be energized.

A similar situation occurs with the units address of one and two wherein these addresses are fed to the input terminals of or gates 2650, 2652 by means of input terminals 2654, 2656 corresponding to the ones address from processor one and processor two, respectively, and the twos address as fed to input terminals 2658, 2660 corresponding to the twos address from processor one and processor two, respectively. These signals are fed to the input circuits of gates 2630, 2632 to provide a three eleven address at output terminal 2666 through an inverter circuit 2668 and the address 312 at output terminal 2670 through inverter circuit 2672. Thus, whenever the 300 address, the ten address and the one address is generated by the computer of either processor, and an input signal is generated, the output terminal 2666 will be energized to indicate the three hundred eleven address to actuate the second digit of the digital clock. A similar situation occurs with the two address wherein the output signal corresponding to the address three hundred twelve is generated if the gate 2608 is energized.

The output circuits of each of the gates 2628, 2630 and 2632 are also connected to the input circuit of an or gate 2676 by means of conductors 2678, 2680, 2682. These conductors provide input signals to or gate 2676 when the addresses are being read. The output circuit of or gate 2676 is fed to a clock hold output terminal 2684 through an inverter circuit 2686. The output terminal 2684 is further connected to a disable circuit which will disable the clock from changing time during the period that the clock is being read. In this way, a false reading will not be provided.

Figure 27:
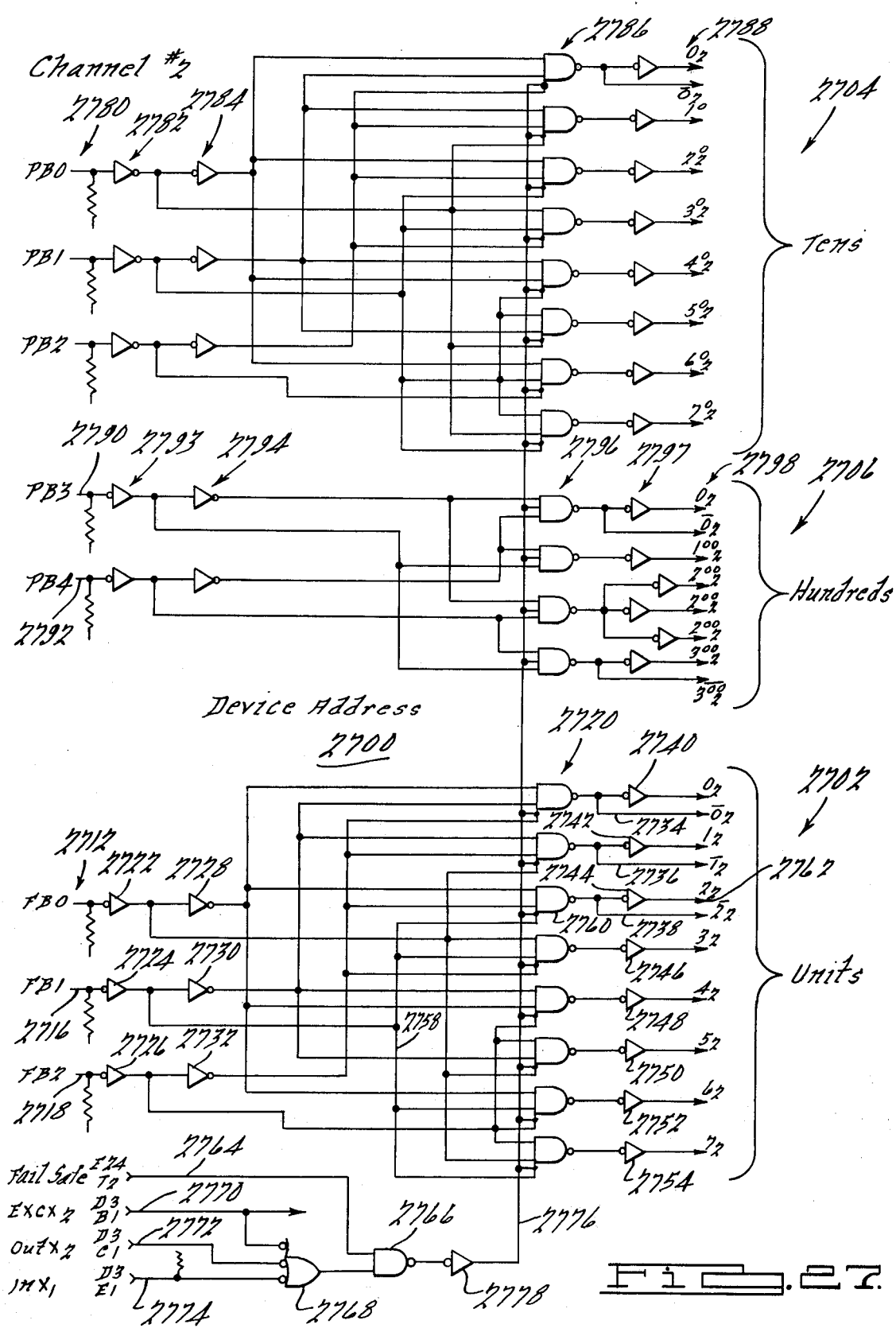
FIG. 27 is a schematic diagram illustrating the details of a function code and device address decode circuit which is similar to the circuit oF FIG. 24 but associated with the second processor of the system of the present invention.

Referring now to FIG. 27, there is illustrated a binary to octal converter circuit 2700 which is utilized to convert binary addresses generated by the computer to octal addresses which are utilized by the external system. Particularly, the system is divided into a units section 2702, a tens section 2704, and a hundredths section 2706. The system is controlled by a plurality of signals, including a fail safe signal, an execute signal, an output signal and an input signal, which are found in an or circuit 2710.

Referring now to the specific details of the circuit 2700, the computer generates a binary units address on a plurality of input terminals 2712 which include a binary one input terminal 2714, a binary two input terminal 2716 and a binary four input terminal 2718. These signals are fed to a plurality of output gates 2720 through a first group of inverter circuits 2722, 2724, 2726, and a second group of inverter circuits 2728, 2730, 2732. The input terminals 2712, and the gates 2722 to 2732, are connected in a common configuration to provide the octal output through the connections to the output gate 2720. Specifically, input terminal 2712 is connected to all of the gates in group 2720 either directly from the output of inverter 2722 or directly from the output of inverter 2728. The outputs of gate 2720 are fed either directly a plurality of output conductors 2734, 2736, 2738, or through a plurality of inverter circuits 2740, 2742, 2744, 2746, 2748, 2750, 2752 and 2754.

Referring specifically to a particular units address, and assuming that the binary one input terminal 2714 is not energized, the binary two input terminal 2716 is energized and the binary four input 2718 is not energized. It will be seen that the signal from input terminal 2716 will be fed through gate 2724 to the input terminal of a gate 2756 by means of a conductor 2758. The not true input, as generated at the output of inverter 2730, is fed to certain other gates in the system. It will be noted that the remaining inputs to the gate 2750 are from the not true side of the binary one input terminal 2714 and the not true signal from the input terminal 2718. Thus, the gate 2750 will be energized to provide an output of an octal two at an output terminal 2762. This is a common configuration in a binary to decimal conversion.

Referring now to the enabling circuit 2710, it is seen that the fail safe signal from FIG. 25 is generated on input conductor 2764 and fed to the input circuit of an and gate 2766. The and gate also includes an input from an or gate 2768, which or gate includes input signals from the execute input conductor 2770, the output/input conductor 2772, and the input/input conductor 2774. Thus, if the fail safe signal is present on conductor 2764, and one of the signals on conductors 2770, 2772, 2774 is present, the gate 2766 will provide an output signal of an enabling conductor 2776 through an inverter circuit 2778.

A similar situation occurs in the tens section 2704 wherein a plurality of input terminals 2780 is provided to provide a binary one, binary two or binary four tens signal. These signals are fed through inverter gates 2782, 2784 to provide the proper input signals to and gate 2786. As was the case above, the gates 2786 include an enabling signal connection from conductor 2776 to enable the gates 2786 when the proper signal conditions exist at control 2710. The output signals from 2786 are fed to output conductors 2788 to provide the octal addresses indicated for the tens section 2704.

Referring now to the hundredths section 2706, a binary one hundred input terminal 2790 and a binary two hundred input terminal 2792 are provided, which signals are fed through inverter circuits 2793, 2794 to output and gate 2796. These signals are fed either directly or through inverter circuits 2797 to a plurality of output terminals 2798. Thus, the hundredths portion of the address is converted from binary to octal configuration in the circuit 2706. It will be noted that the 200 address is provided with a large number of output terminals.

This is due to the fact that the 200 address is widely used in this system and requires a large amount of driving current to accommodate the circuits from which it is driven.

Figure 28:
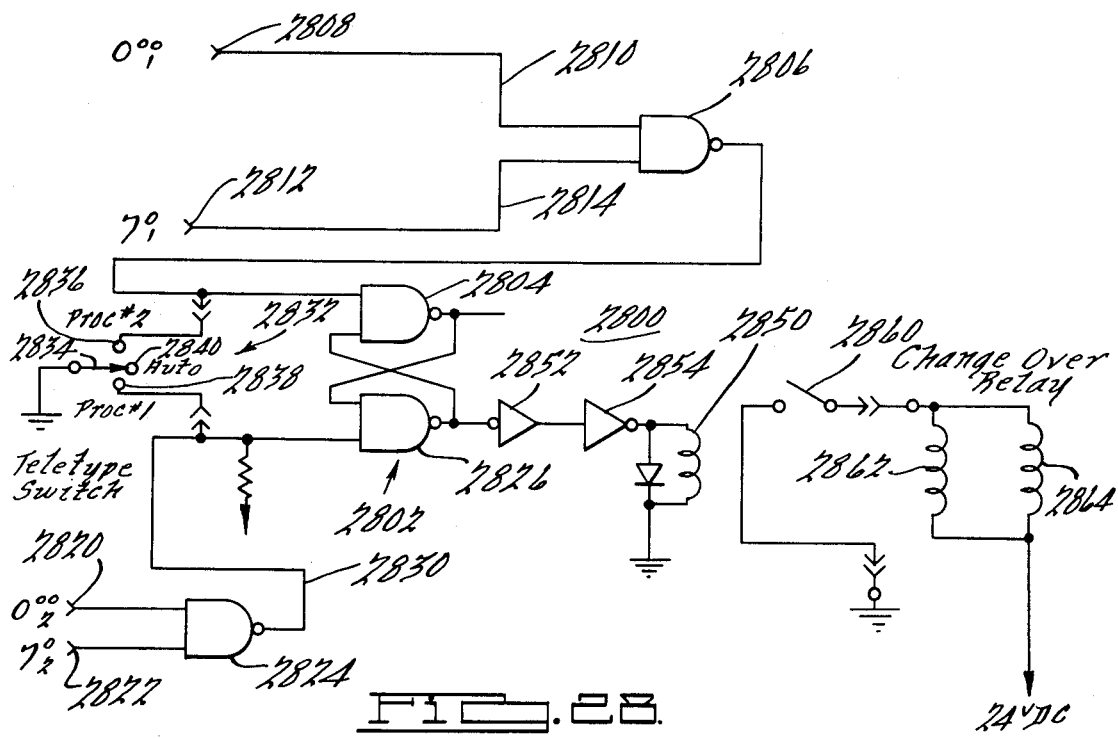
FIG. 28 is a schematic diagram illustrating the details of a teletype change-over circuit which is utilized to change the teletype from processor one to processor two.

Referring now to FIG. 28, there is illustrated a system 2800 for switching the teletype unit from one processor to the other. Specifically, the teletype unit may be changed by addresses generated within the computer or the teletype unit may be changed manually by means of a manual switch.

Specifically, a flip-flop unit 2802 is provided when a set side 2804 is connected to the output circuit of an and gate 2806. The and gate 2806 includes input signals from a zero hundred address by means of an input terminal 2808 and a conductor 2810. The and gate 2806 also includes a second input from a seventy input terminal 2812 by means of a conductor 2814. Thus, if a zero hundreds address and a seven tens address is generated within the processor one, the gate 2806 will be provided with a coincidence of signals which will set the flip-flop 2802.

On the other hand, the second processor could generate the same address on input terminals 2820 and 2822, which signals are fed to the input circuit of an and gate 2824. If the proper signal levels are present at the input circuit to gate 2824, the reset side 2826 will be provided with an input signal to reset the flip-flop 2802. This signal is fed by means of a conductor 2830.

The flip-flop 2802 may also be set and reset by means of a manual switch 2832 which includes three positions, position number one wherein the switch blade 2834 is in contact with a terminal 2836 corresponding to the processor two selection. The switch blade 2834 may also be in contact with a terminal 2838 corresponding to the processor one position or may be in contact with the automatic terminal 2840 to indicate the selection of the automatic mode of operation for switching the teletype unit. When the automatic mode of operation is selected, the computer will switch the unit back and forth automatically without inhibiting signals fed from the output terminals of gates 2806 or 2824.

The reset side of the flip-flop 2802 is connected to a relay coil 2850 through a pair of inverter gates 2852, 2854. When the reset side generates the proper signal, the coil 2850 will be energized to close a switch 2860. The closure of switch 2860 will energize a pair of relay coils 2862, 2864 to effect the transfer of the teletype unit from one processor to the other. The relays 2862, 2864 are selected to effect the proper change of the teletype unit from one processor to the other.

Figure 29:
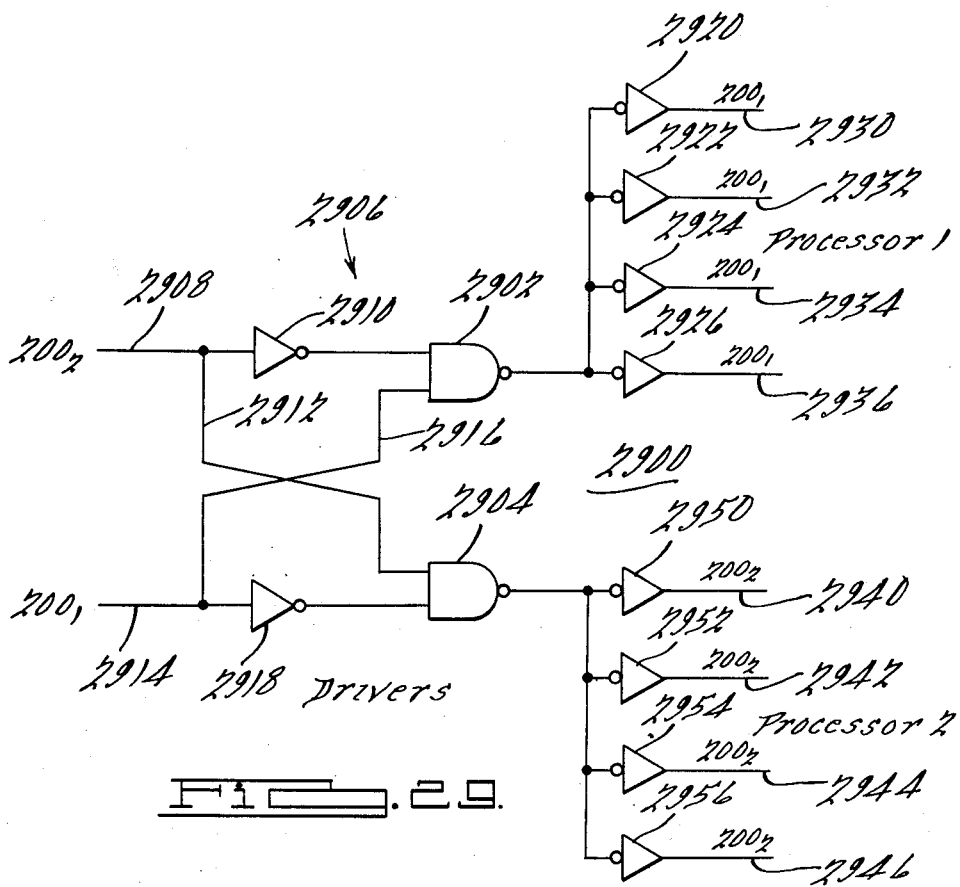
FIG. 29 is a schematic diagram illustrating the details of an address driver circuit which is utilized in conjunction with certain addresses which must drive a large number of circuits.

Referring now to FIG. 29, there is illustrated a drive circuit 2900 which is utilized to provide driver current for the 200 block of address codes. As was explained above, the 200 series addresses are widely utilized throughout the system for driving a large number of circuits. Accordingly, an excessive amount of driver current is required to provide sufficient current for the circuits utilized in the 200 address and this additional driver current is provided by the driver circuit 2900.

Specifically, the driver circuit includes a pair of gates 2902, 2904 which are cross-coupled in accordance with the inverted signal to form the driver circuit 2906. Specifically, the 200 address from the processor two is fed to an input terminal 2908, the signal being fed directly to the input circuit of gate 2904 and indirectly, throught an inverter circuit 2910 to the input circuit of gate 2902. On the other hand, the 200 address from processor one is fed directly from input terminal 2914 to the input of gate 2902 by means of conductor 2916 and, indirectly, through inverter circuit 2918 to the input circuit of gate 2904.

The output circuit of gate 2902 is connected to a plurality of inverter circuits 2920, 2922, 2924, 2926 which, in turn, are connected to output conductors 2930, 2932, 2934, 2936 corresponding to four sets of 200 address circuits. A similar situation is true with gate 2904, the output circuit of which is connected to a plurality of output terminals 2940 to 2946 through a plurality of inverter circuits 2950 to 2956. These output terminals are utilized in other portions of the system to provide the sufficient driving current for the circuits connected thereto.

Referring now to FIG. 30, there is illustrated a circuit 3000 which is utilized to transfer data from the floor to processor number one. Also, the circuit 3000 includes input data from the reader which is inputted to processor one. Further, data from the transfer buffer of FIG. 23 is also fed to the output gates connected to processor number one.

Specifically, the circuit 3000 includes a plurality of input terminals 3002 which correspond to four of sixteen data conductors connected to the floor machines. For purposes of clarity, only four of the sixteen circuits have been illustrated on the input as well as the output section. The output section, as will be noted, is designated data buss 0, data buss 1, data buss 14, data buss 15. However, it is to be understood that data buss 2 through 13 also exist. The data at input terminal 3002 is fed through a pair of inverter gates 3004, 3006 to provide the proper polarity signal.

Specifically, input terminals 3008, 3010, 3012 and 3014 are connected, through inverter 3004, 3006, to a plurality of and gates 3016, 3018, 3020, 3022 respectively. The gates 3016, 3018, 3020, 3022 are provided with an enabling signal by means of conductor 3024, the enabling signal being provided an input signal in response to the sensing of the input signal from processor one, the address 352 from processor two which signifies the reading of the buffer which means that the signal is not from the floor, and the zero address from the hundreds unit from processor one. Specifically, the input signal appears on conductor 3026, the read buffer address on input terminal 3028 and the zero hundreds address on input conductor 3030. The three signals are then fed to the input circuit of an and gate 3032 and fed to the conductor 3024 by means of an inverter circuit 3034.

Thus, when it is desired to read data from the floor, the signals at the input terminal to gate 3032 are such that the computer signals the transfer of data from the floor to processor one. The output of gates 3016, 3018, 3020, 3022 are fed to the input circuit of or gates 3036, 3038, 3040, 3042, the upper gates 3036, 3038 (plus data buss two through seven) are three input or gates whereas data buss eight through fifteen are two input or gates.

The gates 3036, 3038, 3040, and 3042 are also fed input data from the transfer buffer described in conjunction with the description of FIG. 23, the data being fed thereto by means of input terminals 3050. These input terminals are connected to the inputs of all of the or gates 3036 to 3042 to transfer data from the buffer to the processor number one. The output of gates 3036 to 3042 are connected to a plurality of output terminal data buss connections 3052 corresponding to data buss zero through data buss fifteen. These signals are fed through a plurality of inverter gates 3054 prior to being connected to the output terminal 3052.

The upper eight or gates 3036, 3038 (including data buss gates corresponding to data buss two through seven) are also provided inputs from a plurality of input gates 3060 corresponding to the eight channels of a tape reader. The tape reader is connected to the plurality of input terminals 3062 wherein any data sensed in the tape reader is fed from the terminals 3062 through the gates 3060 to the input terminals of input circuits of or gates 3036, 3038 and the or gates corresponding to data buss two through seven which are not illustrated. The gates 3060 are enabled by a reader address enable nand gate 3064 which is provided input signals from a zero hundred input terminal 3066 which is fed a zero hundred address and a 60 address by input terminal 3068 which is provided a sixty address input signal. These signals are anded by gate 3064 to provide an enable signal on conductor 3070 to enable gates 3060 in response to the read tape signal.

In the system of the present invention, a second circuit corresponding to the system 3000 is provided in parallel with the circuit of FIG. 30, the second circuit being connected to the input of processor number two. Accordingly, 16 input terminals are connected in parallel with the input terminal 3002. The circuit connected to the parallel input conductors (not shown) is identical to the circuit described in conjunction with FIG. 30 and includes inputs from the transfer buffer and inputs from the tape reader. Also, the enabling circuit corresponding to gate 3032 for the floor data and the enabling circuits corresponding to gate 3064 for the reader data is also provided. Thus, the data being supplied from the floor, from the transfer buffer, or from the reader is also fed to the input circuit of processor number two.

Referring now to FIG. 31, there is illustrated a circuit 3100 which is utilized to decode the address gating signals for the system of the present invention. For purposes of simplification, only a small portion of the address gating circuit has been illustrated.

Particularly, a gate 3102 is provided to generate the 200 address, the input to gate 3102 including an input conductor 3104 corresponding to the zero units address and an input conductor 3106 corresponding to the zero hundreds address. As discussed previously, the 200 address is generated elsewhere in the system and is fed to an input terminal 3110, the terminal 3110 being utilized to supply an enabling signal to a plurality of gates 3112, 3114, 3116. As was stated above, the 200 address is used extensively throughout the system and thus the requirement for the increased current to drive the large number of gates utilizing the 200 address. The 200 address is used primarily for the automation portion of the system.

The gates 3112, 3114, 3116 are used to generate the 201, 216 and 217 address, respectively. Also, for purposes of simplification, the processor two address gating has been illustrated. It is to be understood that a similar situation exists for the processor one. Other 200 address input terminals 3120, 3122, 3124 are utilized to enable a plurality of gates 3126, 3128, 3130 corresponding to the addresses indicated at the output terminals thereof.

Referring specifically to the gates 3126, a gate 3132 includes a pair of input terminals which receive the zero and 20 addresses from the processor number two. With the signal at input terminal 3120, the output of gate 3132, when it goes true, will signify that an address of 220 has been sent. This condition is common to all of the gates illustrated in system 3100.

Referring now to FIG. 32, there is illustrated a driver circuit 3200 which is utilized to designate whether a particular address is to be an input or an output signal. Accordingly, the desired address from either processor is gated with a signal which indicates whether that address is to be utilized for an input or an output function.

Specifically, the computer generates, for example, a 250 address from either processor one or processor two and feeds that address to the input circuit of an or gate 3210. These signals are fed to input conductors 3212, 3214 connected to the input circuit of or gate 3210. The output of gate 3210 is fed to an output and gate 3220 and an input and gate 3222.

Referring specifically to the output and gate, the 250 address is fed to the gate 3220 by means of a conductor 3226, the gate 3220 also including an input from an output conductor 3228. Accordingly, when the processor generates a 250 address and an output signal, the gate 3220 will go true. This true output will be inverted by means of an inverter 3232, the output of the inverter being fed to a pair of parallel output conductors 3234, 3236 through inverters 3238, 3240 respectively.

On the other hand, if the 250 address is generated by either processor, and the processor also generates an input signal, the gate 3222 will be rendered true at its output terminal thereof, this true signal being fed to an output conductor 3240. It will be noted that the output conductor 3240 is not provided with additional driver circuits whereas the output from gate 3220 is provided with additional output driver circuits. This is due to the fact that the gate 3222 is a higher power device making more than one driver unnecessary.

Referring now to FIG. 33, there is illustrated a reader interface circuit 3300 which is utilized to control the operation of the reader and also to feed information to the computer relating to the position of the tape relative to the sprocket holes. It will be noted that the reader codes are the 060 codes with the units digit providing a specific information as to which function is to be performed. These paper tape codes are received from the circuit to be described in conjunction with FIG. 35.

Specifically, the tape is controlled in accordance with four modes of operation, fast reverse, fast forward, step reverse, and step forward. The fast forward code is designated code 060, the code being decoded by a gate 3302 which is fed an input signal from the zero hundreds input terminal 3304, a six tens input terminal 3306, and a zero units input terminal 3308. Thus, with these input codes to gate 3302, an output signal will be provided on output conductor 3310 if the enabling signal is present on input conductor 3312. The conductor 3312 is provided with the proper signal if an execute code is received from the computer and a pulse code is generated, the pulse code being generated ever machine cycle.

The execute pulses are fed to a pair of input terminals 3316, 3318 corresponding to execute codes from the processor one or processor two, respectively. These codes are fed to an or gate 3320, the output of which is connected to the input circuit of a nand gate 3322. The nand gate 3322 also includes an input signal from a pulse input terminal 3324, the pulse terminal being the clocking signal for the system. Accordingly, an output signal is generated from gate 3302 to set a fast forward flip-flop 3326. The output of the set side of flip-flop 3326 is fed to the input circuit of a nand gate 3328 by means of a conductor 3330. The gate 3328 also includes an input signal from the reset side of a fast reverse flip-flop 3332 by means of a conductor 3334. Accordingly, if the flip-flop 3326 is set and the flip-flop 3332 is not set, an output signal is provided on the fast forward output conductor 3336 to latch the reader in a fast forward mode of operation.

The fast reverse mode of operation involves an identical type circuit wherein the zero hundreds and 60 tens codes are fed to the input circuit of a nand gate 3340. The nand gate also includes an input signal from a four units code input terminal 3342 as well as the enabling signal on conductor 3312. This will cause nand gate 3340 to provide a setting signal for fast reverse flip-flop 3332. The set side of flip-flop 3332 is connected to the input terminal of the nand gate 3342, which gate 3342 also includes an input signal from the reset side of flip-flop 3326. With flip-flop 3332 set and flip-flop 3326 reset, an output signal will be provided on output 3334 to cause the reader to operate in a fast reverse mode of operation.

The flip-flops 3326, 3332 are reset by means of a reset or gate 3345, the reset or gate receiving an input signal from a gate 3346 and an or gate 3347. The or gate 3347 receives a master reset signal generated by the master computer, whether it be processor one or processor two, connected to input terminals 3348, 3349. Thus, the master processor may reset flip-flops 3326, 3332 directly. On the other hand, a reset code, taking the form of the address zero six three, may provide a resetting signal through the or gate 3345. This reset address is generated at the input of gate 3346 which includes an input signal from the zero hundreds terminal 3304, the sixty tens terminal 3306 and a three units terminal 3347. This reset code is fed to the input circuit of or gate 3345.

The output of or gate 3345 is connected to the reset side of each of the flip-flop units 3326, 3332 through an inverter circuit 3348. Thus, if the code zero six three is generated by the computer or the computer generates a master reset signal, a signal will be fed from the output of either gate 3346 or 3347 to provide a reset signal to the reset side of the flip-flops 3326, 3332.

The reader operates also in a step forward/step reverse mode of operation which is the normal mode for operating the reader. Referring particularly to the step forward mode, a step forward nand gate 3350 is provided, the input circuit to the nand gate 3350 including the zero six hundreds and tens codes from terminals 3304 and 3306. Also, the gate 3350 includes the clocking signal from conductor 3312. Additionally, the gate 3350 is provided a two units signal at input terminal 3351 to provide a stepping signal to a single shot multivibrator circuit 3352. The output of the single shot multivibrator circuit is connected to a step forward output conductor 3353 to step the reader in a forward direction.

The step reverse circuit includes a step reverse nand gate 3354 which receives, in addition to the signal described in conjunction with all of the reader gates, an additional five units signal at input terminal 3355. Thus, the code for step reverse is zero six five. This code will provide an output signal at gate 3354 to trigger a single shot multivibrator circuit 3356. This will provide a step reverse output signal at output conductor 3357 to step the reader in the reverse direction.

The lower portion of the circuit of FIG. 33 is utilized to provide the computer with information relative to three particular characteristics of the reader. The first information which is provided to the computer is whether a sprocket hole has been sensed in response to the feeding of a step forward or step reverse signal. The second information fed to the computer is to count the sprocket holes in response to a count sprocket hole code generated by the computer. The third piece of information fed the computer is whether the head is in position or whether there is a piece of broken tape in the reader.

Specifically, if the computer desires to sense the tape position, a zero six one code in generated, this code being fed to the input circuit of an and gate 3358, the gate being fed the same common signals that were fed to the input gates described above. Additionally, a one units code is generaed at input terminal 3359 and fed to the gate 3358. The output of gate 3358 is inverted by means of an inverter circuit 3360 is fed to the input of a second nand gate 3361. The nand gate also includes an input signal from either the step forward or step reverse single shot multivibrator circuits 3352, 3356 respectively.

These latter two signals are fed to the input circuit of an or gate 3362, the output of which triggers a single shot multivibrator circuit 3363. The output of the single shot multivibrator circuit enables a gate 3364, the gate 3364 also including an input signal from a sprocket hole sensing circuit connected to input terminal 3365. Thus, when a step forward or step reverse signal is generated, the single shot multivibrator circuit 3363 will be triggered to disable the gate 3364 for three milliseconds. If the sprocket hole is sensed during that period, the gate 3364 will inhibit an output signal on conductor 3365 for the remainder of the three milliseconds giving the mechanical parts of the reader time to complete their function.

The gate 3361 includes a third input signal from a broken tape circuit which includes a nand gae 3366, the nand gate 3366 receiving an input signal from a conductor 3367 which signals that the head of the reader is in position. If the tape is broken, an additional signal will be generated on conductor 3368 to provide an output signal from gate 3366 to gate 3361 through an inverter circuit 3367.

Thus, if the head is in position as signalled by the signal on conductor 3367 and the tape is not broken as signalled by the signal level on conductor 3368, and additionally the sense tape position gate 3358 is enabled, an output signal will be generated at the output terminal of gate 3361 in response to the sprocket holes being sensed at terminal 3365. This signal fill be fed from gate 3361 through an or gate 3368 to a pair of output terminals 3369, 3370, which are ultimately connected to the computer. Thus, the computer is fed information relative to the tape position and condition.

The second mode of operation of the computer information circuit involves counting the sprocket holes being sensed by the circuit connected to the conductor 3365. If the sprocket holes are to be counted, a code of zero six seven will be generated at the input terminals to gate 3371. As is seen from the drawing, this gate includes the normal reader input codes plus a seven code in the units position as generated on input terminal 3372. The output of gate 3371 is fed to a nand gate 3373, the gate 3373 also including an input signal from the sprocket sensing conductor 3365 by means of a conductor 3374. Thus, if the computer commands the counting of sprocket holes as signalled by the output of gate 3371, the gate 3373 will provide an output signal each time that the sprocket hole is sensed at input terminal 3365.

The output of gate 3373 is also fed to the input of or gate 3368 to provide the proper output signal to the computer output conductors 3369 and 3370.

If the computer signals that it wishes to sense whether the head is in position or whether the tape is broken, a code of zero six six will be generated at the input circuit to gate 3378, the six unit code being generated at an input terminal 3379. The output circuit of gate 3378 is connected to the input of nand gate 3380 through an inverter circuit 3382. The nand gate 3380 also includes an input signal from the broken tape circuit, including gate 3366, which senses when the head is in position and whether the tape is broken. The combination of these two signals is fed to the input circuit of gate 3380. The signal will be fed through gate 3380 if the gate 3380 is enabled in response to the zero six six code. The output of gate 3380 is fed to the input circuit of or gate 3368 to provide the head in position or broken tape information to output conductors 3360, 3370.

Referring now to FIG. 34, there is illustrated a circuit 3400 which is utilized to decode the enabling signals for the buffer to either load the buffer or to read the buffer. In the system of the present invention, the code 350 has been selected to load the buffer and the code 352 has been selected as the enabling signal to read the buffer. The individual codes are generated by the computer and fed to the input circuit of circuit 3400 and the output conductors thereof are connected to the various portions of the interface circuit where there codes are required.

Referring particularly to the load buffer code, a lead buffer gate 3402 is provided with an input signal from a three hundreds code an input terminal 3404, this terminal being connected to the input circuit of gate 3402. A five tens code is generated at input conductor 3406 and fed to the input circuit of gate 3402 through an invertor gate 3408. Further, a zero units code is generated at input conductor 3410 and fed to the input circuit of the gate 3402 by means of an inverter 3412. Thus, when the code three five zero is generated, the gate 3402 will provide an output signal corresponding to the code three fifty at output conductor 3414. This code is utilized in conjunction with the processor one when it is a master.

A similar code is generated for the load buffer signal when processor two is master. This signal is generated by a nand gate 3420, the output of gate 3420 being connected to an output conductor 3422. The gate 3420 includes a three hundreds code at input conductor 3424, a five tens code at input conductor 3426, and a zero units code at input conductor 3428. The five and zero codes are fed to the input circuit of gate 3420 through a pair of inverter gates 3430, 3432. Thus, when processor two generates the code three fifty, an output signal will be generated at the output terminal of gate 3420.

In the case where the computer generates an enable signal to enable the read buffer gates, a three fifty-two code is generated by either processor one or processor two, depending on which processor is being used as the master. Specifically, a read buffer gate 3450 is provided with an input signal from the three hundred conductor 3404, from the fifty conductor 3406 and from a two units conductor 3452 through an inverter circuit 3454. Thus, when processor one generates a three fifty-two code, an output signal will be generated at output conductors 3456, 3458 from the gate 3450.

When the second processor is being utilized as a master, the three fifty-two code is generated by a gate 3460, the output of which is connected to a plurality of output conductors 3462. The gate 3460 is fed a three hundred input signal from conductor 3424, a fifty input signal from converter 3430 and a two input signal from an input conductor 3464, this latter signal being fed through an inverter circuit 3466. In this way, the processor two generates the three fifty-two code at output conductors 3462 for use by the buffer circuits described above.

FIG. 35 illustrates a plurality of nand gates which are utilized to generate the paper tape reader codes. These gates include a pair of input signals from both processor one and processor two to generate the specific code required. The zero hundreds code is generated by a gate 3500, the gate 3500 including a zero hundreds input code from processor one by means of a terminal 3502 and the same code from processor two by means of a terminal 3504. The zero hundreds output code is generated at output terminal 3506.

Similarly, the sixty code utilized by the reader circuit is generated by a sixty address gate 3510, the gate including an input signal corresponding to the processor one sixty code by means of a terminal 3512 and a sixty code corresponding to processor two by means of a terminal 3514. The output code is generated at an output terminal 3516 and fed to the common circuits described in conjunction with the described in conjunction with the description of FIG. 33.

The zero one, two, three, four, five, six and seven codes are generated by gates 3518, 3520, 3522, 3524, 3526, 3528, 3530 and 3532, respectively. Each of these gates receive input signals from processor one and processor two corresponding to the particular code to be generated. The output codes are generated at output conductors 3538, 3540, 3542, 3544, 3548, 3550, 3552 corresponding to output codes zero, one, two, three, four, five, six, seven, respectively, for the units portion of the reader address.

Referring now to FIG. 36, there is illustrated a circuit 3600 which is utilized to generate the master one and master two codes and provide an output indication as to which processor is operating as the master. In generating the master code, the address 353 has been selected to transfer the master function from one processor to the other. The function is transferred in response to the sensing of the 353 code, the select code and the generation of a clocking pulse.

Referring specifically to the circuit 3600, it is seen that a flip-flop 3602 is utilized to generate the master one signal on an output conductor 3604 connected to the set side of flip-flop 3602 and an output conductor 3606 connected to the reset side of the flip-flop 3602. The flip-flop is controlled in response to the sensing of certain input signals at input circuit 3610.

Specifically, a three is generated for the hundreds portion of the address at an input conductor 3612, this signal being fed to the input circuit of a nand gate 3614. The gate 3614 also includes a five address for the tens portion thereof at an input conductor 3616 and a three for the units portion of the address, the three being generated on an input conductor 3618 and fed to gate 3614 through an inverter circuit 3620.

The gate 3614 also includes an input signal from a select or gate 3624, the select or gate including input signals from processor one and processor two corresponding to the select code. The select code signifies that a function is to be performed within the system of the present invention rather than a data transfer either in or out of the processor. The output of or gate 3624 is fed to the input circuit of a nand gate 3626, the nand gate 3626 also including an input signal from an or gate 3630.

The or gate 3630 is provided pulse input signals from processor one and processor two, the pulse signal occuring at each machine cycle. The output of gate 3626 is fed to the input of gate 3614 through an inverter circuit 3632. The gate 3614 is operative in response to all high input signals to the input circuit thereof. With the input signals high, the output of gate 3614 will drop to a low to set flip-flop 3602 and thus produce an output signal at output conductor 3604.

On the other hand, a second nand gate 3640 is provided, the gate 3640 including input signal from the three hundred address from processor two by means of a conductor 3642, a five for the tens portion of the address on input conductor 3644, and a three units address on input conductor 3646. Each of these latter signals are fed from processor two, the units address being fed to the gate 3640 through inverter circuit 3648. The gate 3640 also includes an input signal from gate 3632, the inverted signal from gate 3626. With all high signals occuring at the input circuit to gate 3640, an output low signal will be generated to reset flip-flop 3602 to provide an output signal on conductor 3606 designating the processor two as the master.

The set side of flip-flop 3602 also feeds an indicator lamp 3650 through an inverter circuit 3652 and an amplifier 3654. This lamp 3650 will signal when the processor one is the master. Similarly, the processor two master signal will illuminate a lamp 3660 from the reset side thereof, the reset signal being fed through an inverter circuit 3662 and an amplifier 3664. Thus, an indication of which units is operating as master will be provided.

Referring now to FIG. 37, there is illustrated a circuit 3700 which is utilized to enable the circuits described previously which require an input or output signal from either the processor one or processor two. These signals are generated at input terminals 3702, 3704 corresponding to processor one and processor two input signals. Also, a pair of output signals are generated on output conductors 3706, 3708 corresponding to output signals generated by the processor one or processor two, respectively.

The input signal from processor one is generated by a nand gae 3710 which is provided with an input signal from an input terminal 3712 through an inverter circuit 3714. The gate 3710 includes a master one signal from an input terminal 3716, which signal enables the gate 3710 when processor one is the master.

The output signal corresponding to processor one is generated by a nand gate 3720, the gage 3720 including an output signal from terminal 3722 and an inverter 3724. The gate 3720 also includes the master one enabling signal from the terminal 3716 to enable the gate 3720 and permit the output signal to be fed to the output terminal 3706.

A similar situation occurs with the processor two acting as a master wherein an input gate 3730 is provided with an input signal from terminal 3732 through an inverter circuit 3734. The gate 3730 also includes a master signal from processor two by means of an input terminal 3736 to enable the gate 3730 when the processor two is the master. Further, an output signal is generated at the output conductor 3708 by a nand gate 3740, the nand gate 3740 including an input signal from an output terminal 3742 and an inverter circuit 3744. The combination of the output signal at terminal 3742 and the master two signal at terminal 3736 will cause the output signal to be generated at output conductor 3708.

FIG. 38 illustrates a circuit 3800 which is utilized to generate the paper tape pulse gating address of zero six X to gate the reader in response to the generation of the zero six X signal plus a unit signal generated within the computer. Specifically, a gate 3802 is provided with input signals from the zero hundreds address as fed to input terminal 3804. This terminal is connected to processor one as is the tens input terminal 3808 which is utilized to feed the six tens address through an inverter circuit 3810. When the zero hundreds and six tens address is generated, the gate 3802 will provide a true output signal, which signal is fed to a nand gate 3812 through an inverter circuit 3814. This will enable gate 3812 to pass a pulse signal generated by processor one at input terminal 3816. This pulse is fed to an output or gate 3820 to provide an enabling signal at output conductor 3822.

A similar situation occurs with the processor number two wherein a zero hundreds address is generated at input terminal 3830 and a six tens address is generated at input terminal 3832. These signals are fed to gate 3838, the output of which is connected to a gate 3840 through an inverter circit 3842. Thus, the generation of the address zero hundred and six ten will provide an enabling signal to gate 3840. This will pass a pulse signal generated of input terminal 3846 by processor two, which pulse signal is fed to the or gate 3820 for impressing on output conductor 3822.

Referring now to FIG. 39, there is illustrated a circuit 3900 which is utilized to place a terminal for each of the computer data busses at the floor where the units being controlled are mounted. Accordingly, each of the data buss bits is fed a plurality of input, terminals 3902, these terminals being connected to each of the various locations of the floor where the equipment is located. The locations at the floor could include as many as 16 circuit cards per location, therefore, to have available sufficient power to operate this plurality of terminals, this plurality of amplifiers in FIG. 39 is necessary. Accordingly, each card will have bits zero through seven or eight through F located at the location.

Specifically, the input terminals 3902 are connected to a plurality of gates 3904, including gates 3906, 3908, 3910, 3912 corresponding to bits zero, one, fourteen and fifteen respectively. It is to be understood that only a portion of the circuit has been illustrated and correlative circuits for bits two through thirteen are also included and connected in a manner identical to that illustrated for bits zero, one, fourteen and fifteen.

Referring specifically to bit zero, the output gate 3906 includes a signal from the bit zero on a conductor 3916 and also includes an input signal a pulse input conductor 3918 through an inverter circuit 3920. The signal level at the output terminal of inverter 3920 is common to all of the gates 3904. Bit zero is fed to each of pairs of inverter gates 3922-3924, 3926-3028, 3930-3932, 3934-3936 and a final output inverter circuit 3938. Each of the gates 3922, 3926, 3930, 3934 and 3936 provide the zero bit to one group of cards at the location and the gates 3924, 3928, 3932, 3936 and 3938 provide the zero bit to the other cards at the location.

The remaining gates 3908, 3910, 3912 are connected in a similar manner to provide bits 1, E and F at each of the locations on the floor. Thus, the circuit of FIG. 39 is utilized to fan out the data buss to all machines and provide drive current for the cards present at each machine location.

Referring now to FIG. 40, there is illustrated a circuit 4000 which is utilized to gate the addresses generated at FIG. 24 and designate whether the particular address is an input or an output signal. This provides an enabling signal for the cards described in conjunction with FIG. 39.

Specifically, the processor one generates a 300 hundreds address at an input terminal of gate 4002 and a zero tens address at the input of gate 4002. This signal is inverted by means of an inverter circuit 4004 and fed to the input circuit of a plurality of gates 4006.

The gate 4006 thus responds to a 30X signal, each of the gates 4006 then including a further input signal which generates a specific units address for each of the gates. Specifically, a gate 4008 includes an input signal from the output of gate 4004 by means of a conductor 4010 and an input signal from the zero units address by means of a conductor 4014. Thus, the gate 4008 generates an output signal corresponding to the 300 address. Similarly, a gate 4016 includes an input signal from a one units address by means of a conductor 4018 to respond to the address 301. The remaining gates in the group 4006 respond to the various signals indicated at the output terminals of the respective gates corresponding to addresses 302 to 307.

The processor two decode circuit includes a second plurality of gates 4022 which includes an input signal from a 300 hundreds address, and a zero tens address by means of a gate 4024, an inverter circuit 4026 and a conductor 4028. Thus, all of the gates in the group 4022 respond to the 30X address. The gates 4022 also includes individual unit addresses specific to each gate. For example, a gate 4028 responds to a zero units address generated by processor two on an input conductor 4030. Similarly, a gate 4032 responds, addition to the signal generated the output terminal of gate 4024, to a one units address generated on input conductor 4034. The remaining gates in the group 4022 respond to unit addresses two through seven corresponding to complete addresses of 302 to 307.

The output of the groups of gates 4006 and 4022 are fed to the input circuit of a plurality of or gates 4040 to 4054 corresponding to the 300 through 307 addresses from both processor one and processor two. Accordingly, the 300 address from processor one is fed to or gate 4040 as is the 300 address from processor two.

The output of gate 4040 is fed to the input circuit of a pair of and gates 4060, 4062 corresponding to the output and input signals to designate whether the address 300, whether generated by processor one or processor two, is to be an output or an input signal. If this address is to be an output signal, an output signal will be generated on output conductor 4064 on enable gate 4060 to pass the 300 address through to an output terminal 4066 through an inverter circuit 4068. A similar condition exists with the input signal fed to the input circuit of gate 4062 by means of an input conductor 4070. The input signal enables gate 4062 to pass the 300 address through to the output conductor 4072. The remaining circuits 4074 to 4086 also provide enabling signals for the output and input modes for each of the addresses 301 through 307.

Figure 41:
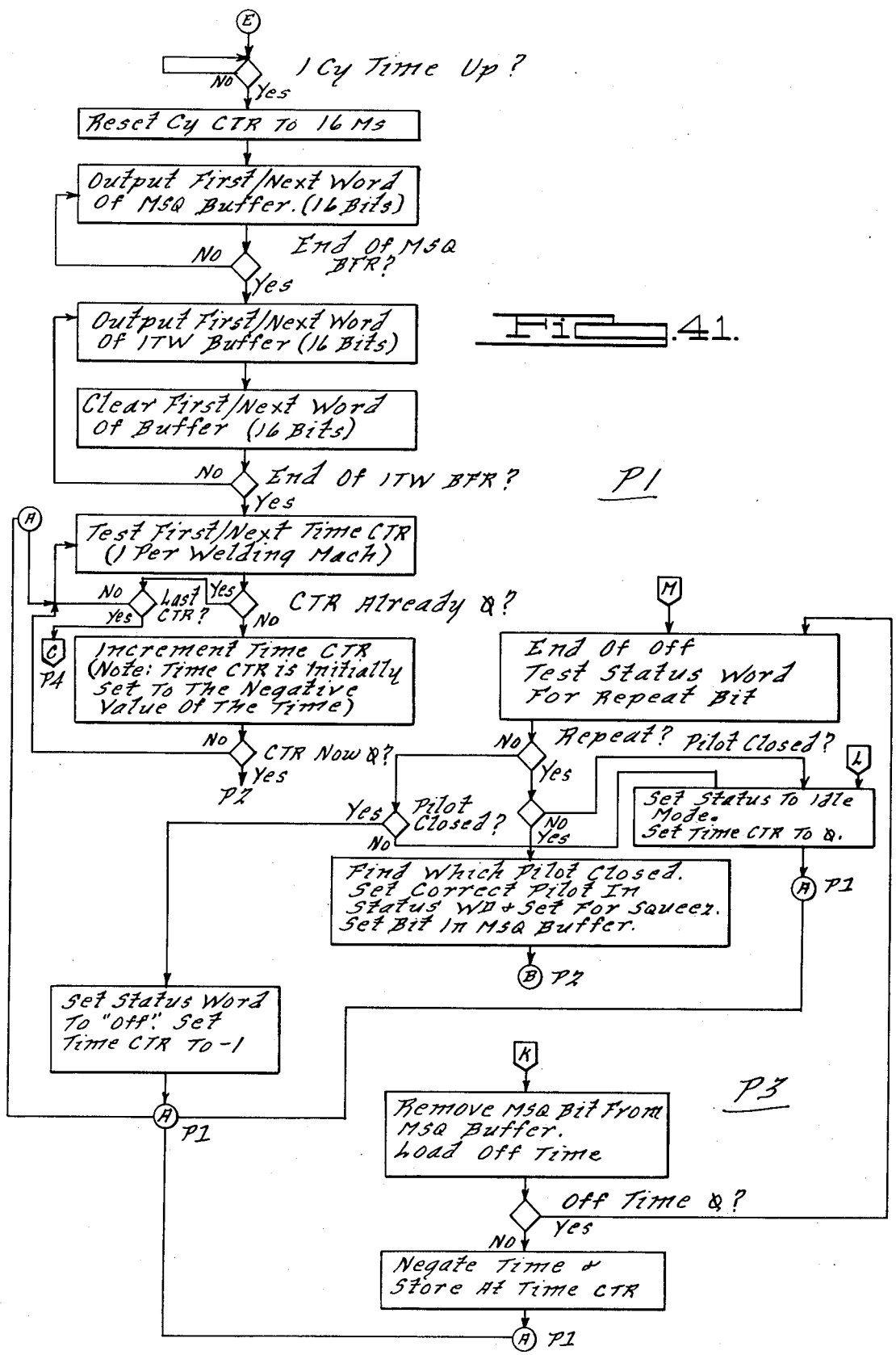
FIGS. 41-44 illustrate the software for the above system.
Figure 42:
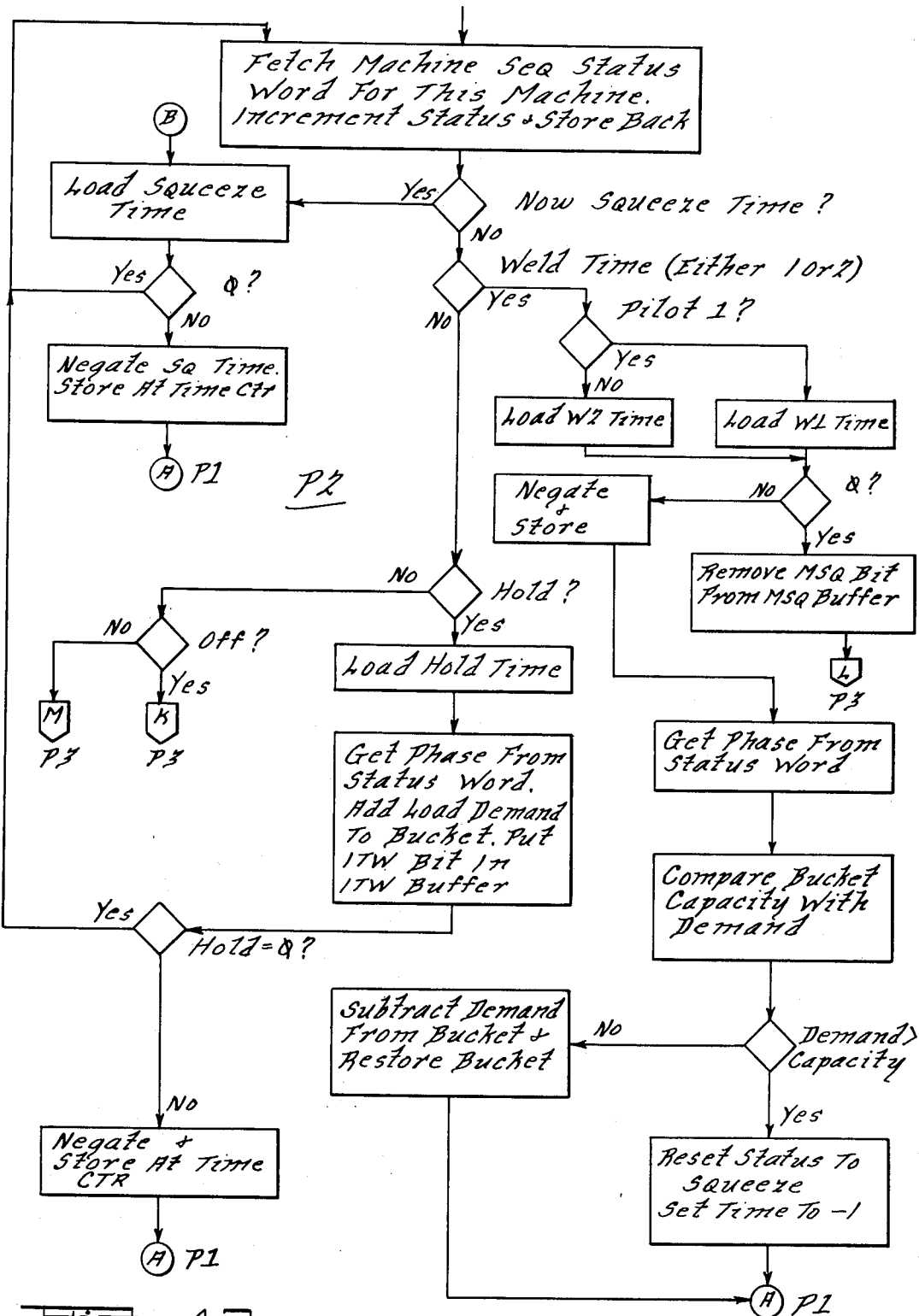
Figure 43:
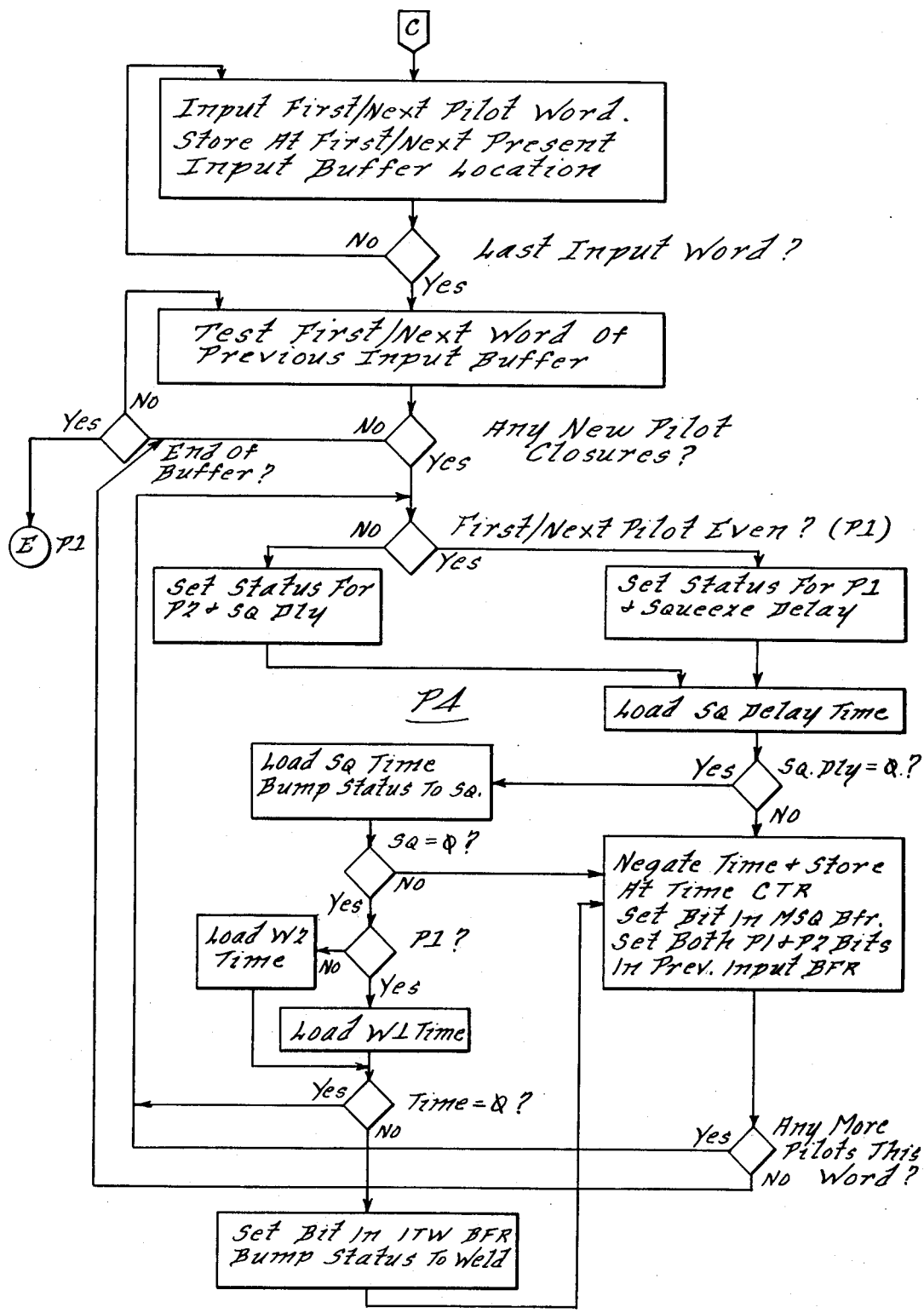

FIGS. 41 to 43 illustrate a flow chart, the steps of which are capable of operating the general purpose computers involved in the system of the present invention and will derive data from the system for storage in the computer and processing thereby, the program further being capable of providing timing signals for the various portions of a welding sequence. The flow chart is devised to be obvious to one familiar with the welding art, familar with the system of the present invention and familiar with programming techniques. Particular attention is directed to the designations P1 and P3 in FIG. 41, P2 in FIG. 42 and P4 in FIG. 43 which are utilized as reference indicators for cross referencing the various portions of the flow chart.

Further attention is directed to the lower right hand portion of FIG. 42 which describes the capability of the program to sense the load requirements of a particular welding head and comparing these load requirements with the welding load being used from the power supply by the other welding heads being in the weld portion of the sequence. At this point, the program compares the load requirement of the head requesting welding energy with a total KVA bucket (reservoir) to determine if the new requirement will reduce the quantity in the bucket below a preselected level. In this way, the system of the present invention maintains the KVA drain on the power supply above a preselected minimum to insure the most economical use of the power supply.

Figure 44:
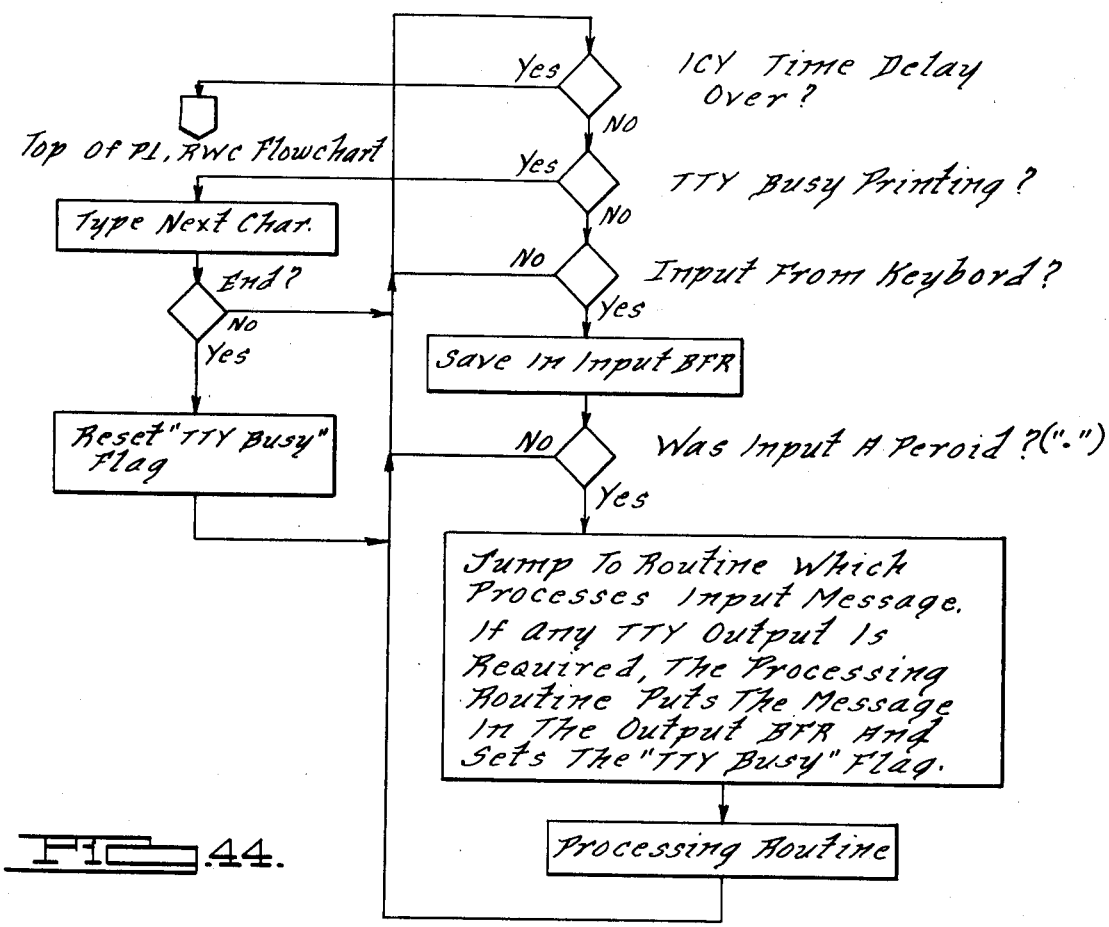

FIG. 44 is a flow chart of an executive program which may be used in executing the program described in conjunction with FIGS. 41 through 43. Again, the executive program is illustrated to be sufficiently obvious to one skilled in the welding art, familiar with the system of the present invention and familiar with programming techniques. Thus, further discussion of the program is unnecessary.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a welding control system including a general purpose computer having computer cycles and programmed, to provide timing signals for the various portions of a welding sequence, and a hardware control system for the welder, the improvement comprising circuit means for enabling the hardware controller in response to a signal generated by the computer, said computer having an output data buss, said enabling signal being generated at least once for each computer cycle during the operation of said computer and said control system.

2. The improvement of claim 1 wherein said hardware control system is disabled in response to the absence of said enabling signal.

3. The improvement of claim 1 wherein said hardware control system includes a weld signal producing means, said enabling means being connected to said weld signal producing means.

4. The improvement of claim 3, wherein said welded signal producing means includes a bistable circuit, said bistable circuit being reset in response to the absence of said enabling signal, said weld signal being absent during the reset condition of said bistable circuit.

5. The improvement of claim 4 wherein said enabling signal indicates to said weld signal producing circuit the operative condition of said computer and the continuity of said connected means.

6. The improvement of claim 5 wherein said weld signal producing means is disabled during the production of said weld signal in the event said enabling signal is discontinued.

* * * * *

UNITED STATES PATENT AND TRADEMARK OFFICE
CERTIFICATE OF CORRECTION

PATENT NO. : 4,063,075
DATED : December 13, 1977
INVENTOR(S) : Donald J. Collom

It is certified that error appears in the above-identified patent and that said Letters Patent are hereby corrected as shown below:

Column 2, line 36, after "controlling" insert --the--.
Column 8, line 35, after "computers", "with" should be --when--.
Column 8, line 55, "welded" should be --weld--.
Column 9, line 50, "supplied" should be --supplies--.
Column 12, line 49, "of" should be --a--.
Column 20, line 53, "cpacitor" should be --capacitor--.
Column 21, line 16, "conductor" should be --conductors--.
Column 24, line 14, "geneation" should be --generation--.
Column 25, line 33, "connection" should be --connections--.
Column 26, line 40, "multivobrator" should be --multivibrator--.
Column 27, line 14, "timed" should be --times--.
Column 27, line 15 "legthening" should be --lengthening--.
Column 29, line 9, "cont" should be --control--.
Column 35, line 13, after "conjunction" insert --with--.
Column 38, line 48, "cynchronizing" should be --synchronizing--.
Column 39, line 26, "differenc" should be --different--.
Column 40, line 46, the first occurrence of "an" should be --on--.
Column 41, line 14, "eight-seven" should be --eighty-seven--.
Column 42, line 3, the first occurrence of "an" should be --on--.
Column 42, line 19, "condjct" should be --conduct--.
Column 43, line 67, "inthe" should be --in the--.
Column 44, line 22, "Referring" should begin a new paragraph.

UNITED STATES PATENT AND TRADEMARK OFFICE
CERTIFICATE OF CORRECTION

PATENT NO. : 4,063,075

DATED : December 13, 1977

INVENTOR(S) : Donald J. Collom

It is certified that error appears in the above-identified patent and that said Letters Patent are hereby corrected as shown below:

Column 45, line 38, after "the", "data" should be --gate--.
Column 46, line 14, "2532" should be --2582--.
Column 46, line 26, "date" should be --data--.
Column 46, line 27, "date" should be --data--.
Column 47, line 15, "2246" should be --2248--.
Column 48, line 4, "2218" should be --2281--.
Column 48, line 43, "2202" should be --2282--.
Column 50, line 50, "input/input" should be --output/input--.
Column 50, line 56, after "provided" insert --to provide--.
Column 51, line 47, "tha" should be --the--.
Column 52, line 62, "320" should be --312--.
Column 54, line 42, "input/input" should be --output/input--.
Column 55, line 65, "throught" should be --through--.
Column 58, line 57, "ever" should be --every--.
Column 60, line 14, "generaed" should be --generated--.
Column 60, line 16, after "3360" insert --and--.
Column 60, line 36, "gae" should be --gate--.
Column 60, line 49, "fill" should be --will--.
Column 61, line 19, "3360" should be --3369--.
Column 61, line 33, "an" should be --at--.

UNITED STATES PATENT AND TRADEMARK OFFICE
CERTIFICATE OF CORRECTION

PATENT NO. : 4,063,075
DATED : December 13, 1977
INVENTOR(S) : Donald J. Collom

It is certified that error appears in the above-identified patent and that said Letters Patent are hereby corrected as shown below:

Column 62, line 27 and 28, after "the" delete "described in conjunction with the".
Column 63, line 47, "gae" should be --gate--.
Column 64, line 36, after "input" delete ",".
Column 64, line 38, "of" should be --on--.
Column 64, line 59, "3926-3028" should be --3926-3928--.
Column 65, line 36, after "responds," insert --in--.
Column 65, line 53, second occurrence of "on" should be --to--.
Column 66, line 55, "welded" should be --weld--.

Signed and Sealed this

Twenty-third Day of May 1978

[SEAL]

Attest:

RUTH C. MASON
Attesting Officer

LUTRELLE F. PARKER
Acting Commissioner of Patents and Trademarks